(12) United States Patent
Lee

(10) Patent No.: US 10,650,781 B2
(45) Date of Patent: May 12, 2020

(54) INPUT DEVICE AND AIR CONDITIONER INCLUDING THE SAME

(71) Applicant: LG ELECTRONICS INC., Seoul (KR)

(72) Inventor: Hongku Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 15/388,948

(22) Filed: Dec. 22, 2016

(65) Prior Publication Data

US 2017/0184322 A1 Jun. 29, 2017

(30) Foreign Application Priority Data

Dec. 23, 2015 (KR) ........................ 10-2015-0184711

(51) Int. Cl.
| | |
|---|---|
| F24F 11/00 | (2018.01) |
| G09G 5/02 | (2006.01) |
| G05B 15/02 | (2006.01) |
| H05B 37/02 | (2006.01) |
| F24F 11/30 | (2018.01) |
| G06F 3/0488 | (2013.01) |
| G06F 3/0481 | (2013.01) |

(Continued)

(52) U.S. Cl.
CPC ............... *G09G 5/02* (2013.01); *F24F 11/30* (2018.01); *G05B 15/02* (2013.01); *G06F 3/0488* (2013.01); *G06F 3/04817* (2013.01); *G06F 3/04847* (2013.01); *H05B 37/0245* (2013.01); *F24F 11/52* (2018.01); *F24F 11/56* (2018.01); *F24F 2110/10* (2018.01); *G05B 2219/2614* (2013.01); *G06F 3/0482* (2013.01); *G06F 3/04883* (2013.01); *G06F 3/04886* (2013.01); *G06F 2203/0383* (2013.01); *G09G 2330/027* (2013.01); *G09G 2354/00* (2013.01)

(58) Field of Classification Search
CPC combination set(s) only.
See application file for complete search history.

(56) References Cited

U.S. PATENT DOCUMENTS

| | | | |
|---|---|---|---|
| 9,423,145 B2* | 8/2016 | Kawai | ...................... F24F 11/30 |
| 2006/0053313 A1* | 3/2006 | Lodolo | ................. G06F 1/3203 |
| | | | 713/300 |

(Continued)

FOREIGN PATENT DOCUMENTS

| | | |
|---|---|---|
| CN | 101382330 A | 3/2009 |
| EP | 2 835 593 A1 | 2/2015 |

(Continued)

*Primary Examiner* — Charles R Kasenge
(74) *Attorney, Agent, or Firm* — Dentons US LLP

(57) ABSTRACT

An input device and an air conditioner including the same, wherein the input device receives operation input of an air conditioner including an outdoor unit and an indoor unit, and the input device includes a display unit, a communication unit to communicate with the indoor unit, an interface unit to provide an interface for exchanging data with an external device, and a controller to perform control such that a home screen including a plurality of icon items is displayed on the display unit and to perform control such that temperature information set through a temperature setting item in the home screen is transmitted to the external device through the interface unit.

20 Claims, 110 Drawing Sheets

(51) Int. Cl.
*G06F 3/0484* (2013.01)
*F24F 11/52* (2018.01)
*F24F 11/56* (2018.01)
*F24F 110/10* (2018.01)
*G06F 3/0482* (2013.01)

(56) References Cited

U.S. PATENT DOCUMENTS

| | | | | |
|---|---|---|---|---|
| 2012/0062796 A1* | 3/2012 | Roberts | | H04N 5/4403 |
| | | | | 348/569 |
| 2012/0131504 A1* | 5/2012 | Fadell | | F24D 19/1084 |
| | | | | 715/810 |
| 2012/0154307 A1* | 6/2012 | Nunomaki | | G06F 1/3203 |
| | | | | 345/173 |
| 2012/0310418 A1* | 12/2012 | Harrod | | G05B 19/042 |
| | | | | 700/276 |
| 2015/0074569 A1 | 3/2015 | Hirayama | | |
| 2015/0094861 A1* | 4/2015 | Choi | | G06F 3/04847 |
| | | | | 700/276 |
| 2015/0094862 A1* | 4/2015 | Choi | | G06F 3/04847 |
| | | | | 700/276 |
| 2015/0094863 A1* | 4/2015 | Choi | | G06F 3/0488 |
| | | | | 700/276 |
| 2015/0094865 A1* | 4/2015 | Choi | | G06F 3/0488 |
| | | | | 700/278 |
| 2015/0330649 A1 | 11/2015 | Nishii | | |
| 2016/0138820 A1* | 5/2016 | Saiki | | F24F 11/30 |
| | | | | 236/1 C |
| 2016/0209907 A1* | 7/2016 | Han | | G06F 1/3209 |
| 2017/0102723 A1* | 4/2017 | Smith | | H04L 12/28 |

FOREIGN PATENT DOCUMENTS

| | | | |
|---|---|---|---|
| JP | 2009-229019 A | | 10/2009 |
| JP | 2014-216835 A | | 11/2014 |
| JP | 2014216835 A | * | 11/2014 |
| KR | 10-2007-0030409 A | | 3/2007 |
| KR | 10-2009-0043878 A | | 5/2009 |
| KR | 10-2009-0080745 A | | 7/2009 |

* cited by examiner

INPUT DEVICE AND AIR CONDITIONER INCLUDING THE SAME

CROSS-REFERENCE TO RELATED APPLICATION

This application claims the priority benefit of Korean Patent Application No. 10-2015-0184711, filed on Dec. 23, 2015 in the Korean Intellectual Property Office, the disclosure of which is incorporated herein by reference.

BACKGROUND OF THE INVENTION

1. Field of the Invention

An input device and an air conditioner including the same, and more particularly, to an input device that is capable of remotely controlling an external device and an air conditioner including the same.

2. Description of the Related Art

An air conditioner is an apparatus that discharges cool or hot air into a room in order to adjust room temperature, thereby providing a comfortable room environment to users. Generally, the air conditioner includes an indoor unit installed in the room, the indoor unit including a heat exchanger, and an outdoor unit for supplying refrigerant to the indoor unit, the outdoor unit including a compressor and a heat exchanger.

SUMMARY OF THE INVENTION

It is an object of the present disclosure to provide an input device that is capable of remotely controlling an external device and an air conditioner including the same.

It is another object of the present disclosure to provide an input device that allows a user to easily and conveniently input a desired operation and an air conditioner including the same.

In accordance with one embodiment of the present disclosure, the above and other objects can be accomplished by the provision of an input device for receiving operation input of an air conditioner including an outdoor unit and an indoor unit, the input device including a display unit, a communication unit to communicate with the indoor unit, an interface unit to provide an interface for exchanging data with an external device, and a controller to perform control such that a home screen including a plurality of icon items is displayed on the display unit and to perform control such that temperature information set through a temperature setting item in the home screen is transmitted to the external device through the interface unit.

In accordance with another embodiment of the present disclosure, there is provided an air conditioner including an outdoor unit and an indoor unit and an input device connected to the indoor unit, wherein the input device includes a display unit, a communication unit to communicate with the indoor unit, an interface unit to provide an interface for exchanging data with an external device, and a controller to perform control such that a home screen including a plurality of icon items is displayed on the display unit and to perform control such that temperature information set through a temperature setting item in the home screen is transmitted to the external device through the interface unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 28H illustrates another reference view of the input device in the operation mode.

DETAILED DESCRIPTION OF THE PREFERRED EMBODIMENTS

Advantages and features of the present disclosure and methods for achieving the merits and characteristics will be more clearly understood from embodiments described in detail later in conjunction with the accompanying drawings. However, the present disclosure is not limited to the disclosed embodiments, but may be implemented in various different ways. The embodiments are provided to only complete the disclosure of the present disclosure and to allow a person having ordinary skill in the art to which the present disclosure pertains to completely understand the category of the invention. The present disclosure is only defined by the category of the claims. The same reference numbers are used to refer to the same or similar elements throughout the specification.

The terms "module" and "unit," when attached to the names of components are used herein to help the understanding of the components and thus they should not be considered as having specific meanings or roles. Accordingly, the terms "module" and "unit" may be used interchangeably.

Figure 1:
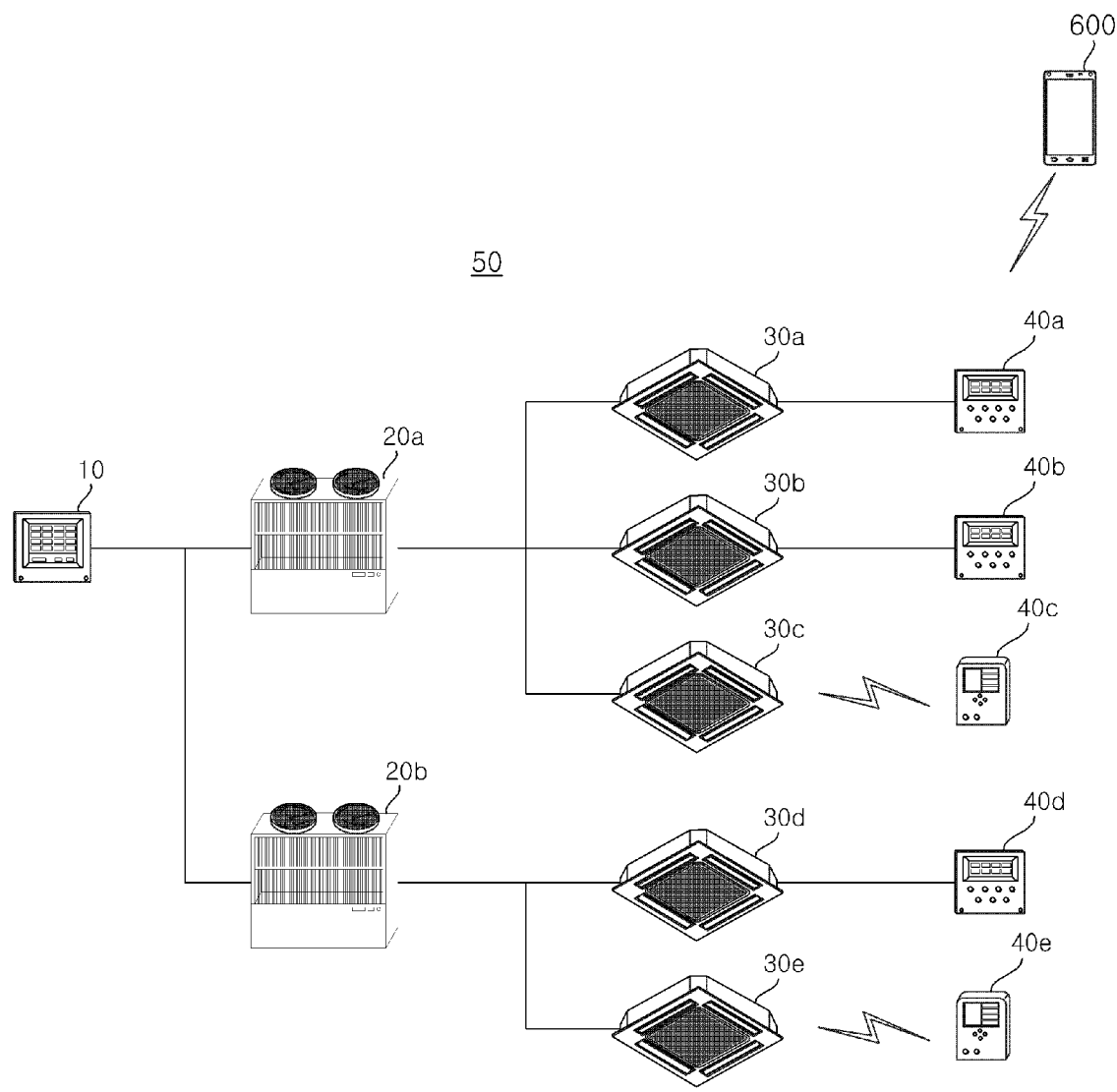
FIG. 1 is a view showing an air conditioner according to an embodiment of the present invention.
Figure 2:
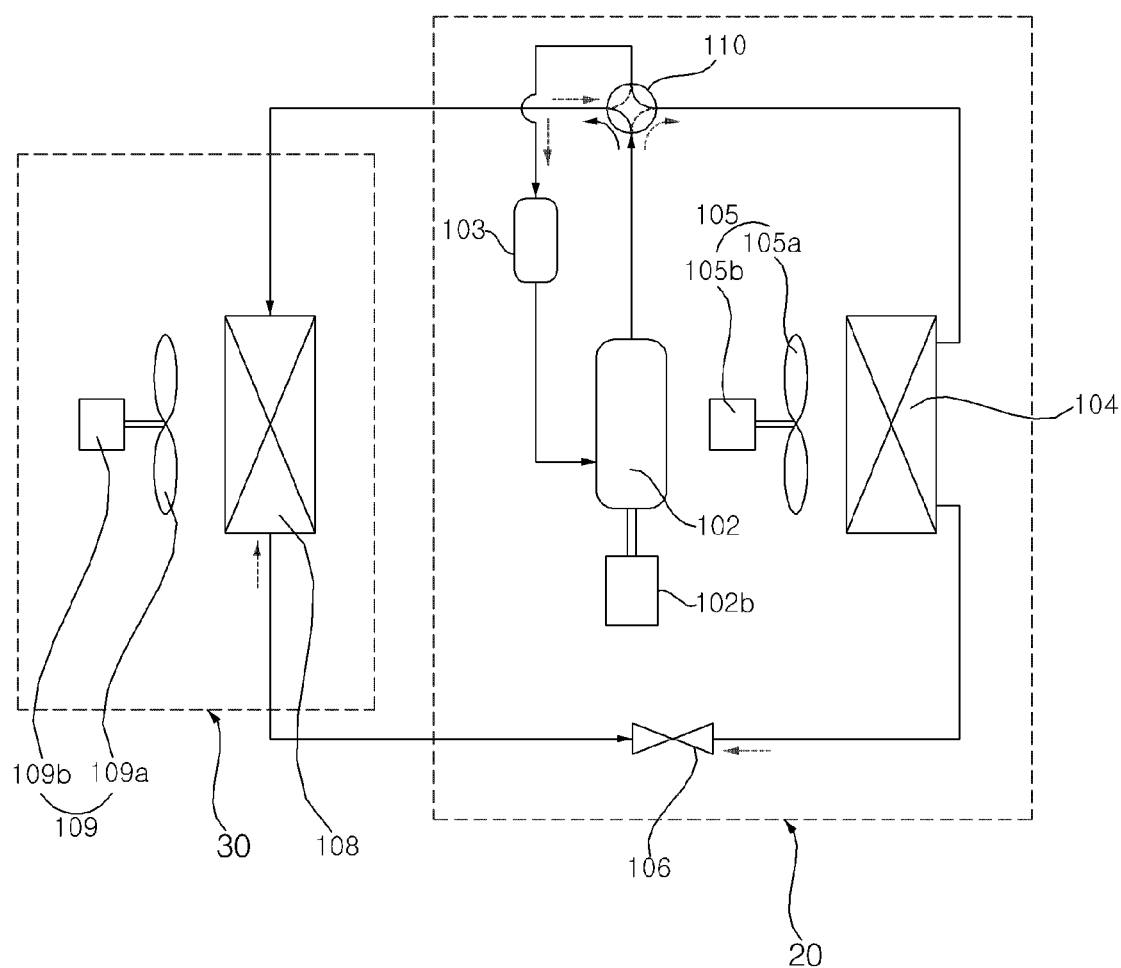
FIG. 2 is a schematic view showing an outdoor unit and an indoor unit of FIG. 1.

FIG. 1 is a view showing the construction of an air conditioner according to an embodiment of the present disclosure. FIG. 2 is a schematic view showing an outdoor unit and an indoor unit of FIG. 1.

Referring to FIGS. 1 and 2, the air conditioner may include a plurality of indoor units 30a to 30e, a plurality of outdoor units 20a and 20b connected to the indoor units 30a to 30e, input devices 40a to 40e respectively connected to the indoor units 30a to 30e, and a remote controller 10 for controlling the indoor units 30a to 30e and the outdoor units 20a and 20b. It is understood that any number of indoor and outdoor units may be employed and that the invention is not limited to indoor units 30a to 30e and outdoor units 20a and 20b.

The remote controller 10 may be connected to the indoor units 30a to 30e and the outdoor units 20a and 20b to monitor and control the operations thereof. The remote controller 10 may perform numerous operations, such as, inter alia, operation setting, locking setting, schedule control, and group control.

A stand type air conditioner, a wall mount type air conditioner, or a ceiling type air conditioner may be used as the air conditioner according to the present disclosure. Hereinafter, for convenience purposes, a ceiling type air conditioner will be described. The air conditioner may further include at least one selected from among a ventilator, an air purifier, a humidifier, and a heater, which may be operated in response to the operations of the indoor units and the outdoor units.

As shown, an outdoor unit 20 may include a compressor 102 for compressing refrigerant, a compressor motor 102b for driving the compressor, an outdoor heat exchanger 104 for cooling the compressed refrigerant, an outdoor blower 105 including an outdoor fan 105a disposed at one side of the outdoor heat exchanger 104 for accelerating the cooling of the refrigerant and a motor 105b for rotating the outdoor fan 105a, an expansion device 106 for expanding the condensed refrigerant, a cooling/heating switch valve 110 for changing the path of the compressed refrigerant, and an accumulator 103 for temporarily storing the gaseous refrigerant, removing moisture and foreign matter from the refrigerant, and supplying the refrigerant to the compressor under a predetermined pressure.

As shown, an indoor unit 30 may include an indoor heat exchanger 109 disposed in a room for performing cooling/heating, an indoor blower 109 including an indoor fan 109a disposed at one side of the indoor heat exchanger 109 for accelerating the cooling of the refrigerant, and a motor 109b for rotating the indoor fan 109a.

At least one indoor heat exchanger 109 may be installed. The compressor 102 may comprise an inverter compressor or a fixed speed compressor.

The air conditioner 50 may be configured as a cooler for cooling a room or as a heat pump for cooling or heating a room.

A single indoor unit 30a and a single outdoor unit 20 are shown in FIG. 2. However, it is understood that the present invention is not limited thereto. The present invention may be applied to a multi-type air conditioner including a plurality of indoor units and a plurality of outdoor units as shown in FIG. 1 or an air conditioner including a single indoor unit and a plurality of outdoor units.

The indoor units 30a to 30e and the outdoor units 20a and 20b may be connected to each other via a communication line so as to transmit and receive data therebetween. The indoor units 30a to 30e and the outdoor units 20a and 20b may be connected to the remote controller 10 via another communication line such that the indoor units 30a to 30e and the outdoor units 20a and 20b can be operated or controlled by remote controller 10.

The input devices 40a to 40e may be connected to the respective indoor units to transmit control commands to the indoor units or to receive and display information about the state of the indoor units. The input devices may communicate with the indoor units in a wired or wireless fashion depending on the manner in which the input devices are connected to the indoor units. In some embodiments, a single input device may be connected to a plurality of indoor units such that settings of the indoor units can be changed through the single input device.

Each of the input devices 40a to 40e may be provided therein with a temperature sensor.

Each of the input devices may be referred to herein as a remote control device or a remote controller.

The compressor 102 in the outdoor unit 20 may be driven by a motor driving device 200 for driving the compressor.

Figure 3A:
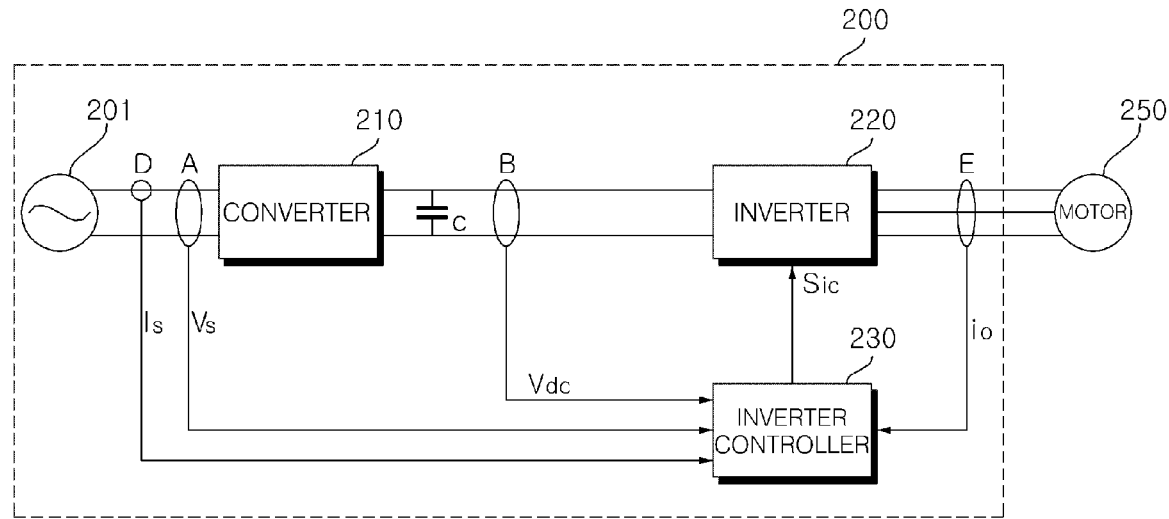
FIG. 3A is a block diagram showing an embodiment of a motor driving device for driving a compressor in the outdoor unit of FIG. 1.
Figure 3B:
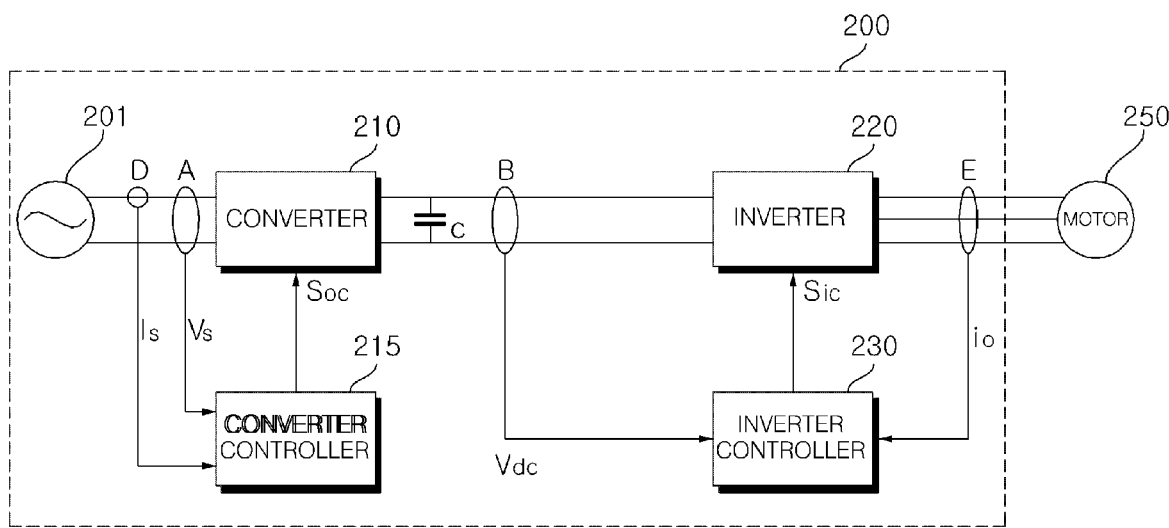
FIG. 3B is a block diagram showing another embodiment of a motor driving device for driving a compressor in the outdoor unit of FIG. 1.

FIGS. 3A and 3B are block diagrams showing different embodiments of the motor driving device for driving the compressor in the outdoor unit of FIG. 1.

The motor driving device 200 of FIG. 3A may include an inverter 220 for outputting three-phase alternating current (AC) current to a compressor motor 250, an inverter controller 230 for controlling the inverter 220, a converter 210 for supplying direct current (DC) power to the inverter 220, and a converter controller 215 for controlling the converter 210.

The motor driving device 200 receives AC power from a system, converts the power, and supplies the converted power to the compressor motor 250. Thus, the motor driving device 200 may also be referred to as a power converter or a compressor driving device.

The converter 210 may include only a diode element, which is a passive element, without a switching element, which is an active element. That is, the converter 210 may be a rectifier. The converter 210 may further include a reactor (not shown).

The converter 210 of FIG. 3A, which serves as a rectifier, rectifies input AC power 201 and outputs rectified power. In the case in which the input AC power 201 is three-phase AC power, the converter 210 of FIG. 3A may rectify and output the three-phase AC power.

A capacitor C may be connected to the output terminal of the converter 210 so as to store power output from the converter 210. Since the power output from the converter 210 is DC power, the capacitor C may be referred to as a DC terminal capacitor.

Meanwhile, an electrolytic capacitor or a film capacitor may be used as the capacitor C.

For example, the film capacitor, which has a smaller capacitance than the electrolytic capacitor, may have a low capacitance of about several tens of μF. A motor driving device having a DC terminal capacitor C having a low capacitance of about several tens of μF may be referred to as a capacitor-less motor driving device.

Meanwhile, in the case in which a low-capacitance capacitor C is used, the DC terminal pulsates. Thus, DC terminal voltage may be referred to as DC voltage. Specially, the DC terminal capacitor C may have capacitance of about 10 μF to 70 μf.

An input voltage detector A may detect input voltage $V_s$ from the input AC power 201. The input voltage detector A may be located at the front end of the rectifier 210.

To detect voltage, the input voltage detector A may include a resistor and an OP amplifier. The detected input voltage $V_s$ may be applied to the inverter controller 230 as a pulse-type discrete signal.

The input voltage detector A may also detect a zero-crossing point of the input voltage.

An input current detector D may detect input current $I_s$ from the input AC power 201. The input current detector D may be located at the front end of the rectifier 210.

To detect current, the input current detector D may include a current sensor, a current transformer CT, and a shunt resistor. The detected input current $I_s$ may be supplied to the inverter controller 230 as a pulse-type discrete signal.

A DC voltage detector B detects DC terminal voltage $V_{dc}$ of the DC terminal capacitor C.

To detect the DC terminal voltage $V_{dc}$, a resistor and an operational amplifier (OP amplifier) may be used. The detected voltage $V_{dc}$ of the DC terminal capacitor C may be applied to the inverter controller 230 as a pulse-type discrete signal. An inverter switching control signal $S_{ic}$ may be generated based on the DC voltage $V_{dc}$ of the DC terminal capacitor C.

The inverter 220 may include a plurality of inverter switching elements. The inverter 220 may convert the DC power $V_{dc}$, smoothed by the on/off operation of the switching elements, into three-phase AC power having a predetermined frequency, and may output the three-phase AC power to the motor 250, which is a three-phase motor.

The inverter 220 may include a plurality of inverter switching elements. For example, upper arm switching elements Sa, Sb, and Sc and lower arm switching elements S'a, S'b, and S'c may be connected in series to each other in pairs. As a result, three pairs of upper and lower arm switching elements Sa & S'a, Sb & S'b, and Sc & S'c may be connected in parallel to each other. A diode may be connected in reverse parallel to each of the switching elements Sa, S'a, Sb, S'b, Sc, and S'c.

The inverter controller 230 may output an inverter switching control signal $S_{ic}$ to the inverter 220 to control the switching operation of the inverter 220. The inverter switching control signal $S_{ic}$, which is a pulse width modulation (PWM)-based switching control signal, may be generated and output based on output current $i_o$ flowing in the motor 250 or DC terminal voltage $V_{dc}$ applied across two terminals of the DC terminal capacitor C. The output current $i_o$ may be detected by an output current detector E, and the DC terminal voltage $V_{dc}$ may be detected by the DC terminal voltage detector B.

The output current detector E may detect output current $i_o$ flowing between the inverter 220 and the motor 250. That is, the output current detector E may detect current flowing in the motor 250. The output current detector E may detect all three-phase output currents $i_a$, $i_b$, and $i_c$. Alternatively, the output current detector E may detect two-phase output currents using three-phase equilibrium.

The output current detector E may be located between the inverter 220 and the motor 250. To detect current, a current transformer (CT) or a shunt resistor may be used as the output current detector E.

The motor driving device 200 of FIG. 3B is similar to the motor driving device 200 of FIG. 3A except that the motor driving device 200 of FIG. 3B further include a converter controller 215 for controlling the converter 210.

The converter 210 of FIG. 3B may also include a switching element, which is an active element, unlike the converter 210 of FIG. 3A.

For example, the converter 210 of FIG. 3B may include an inductor (not shown) and a diode (not shown) connected to each other in series and a switching element (not shown) connected between the inductor and the diode. When the switching element is turned on, energy may be stored in the inductor. When the switching element is turned off, the energy stored in the inductor may be output via the diode.

Particularly, in the case in which the motor driving device 200 uses a low-capacitance DC terminal capacitor C, voltage that has been boosted to a predetermined voltage, i.e. offset voltage, may be output from the converter 210.

The converter controller 215 may control turn-on timing of the switching element in the converter 210. Consequently, the converter controller 215 may output a converter switching control signal $S_{cc}$ for turn-on timing of the switching element.

To this end, the converter controller 215 may receive input voltage $V_s$ and input current $I_s$ from the input voltage detector A and an input current detector D, respectively.

Figure 4A:
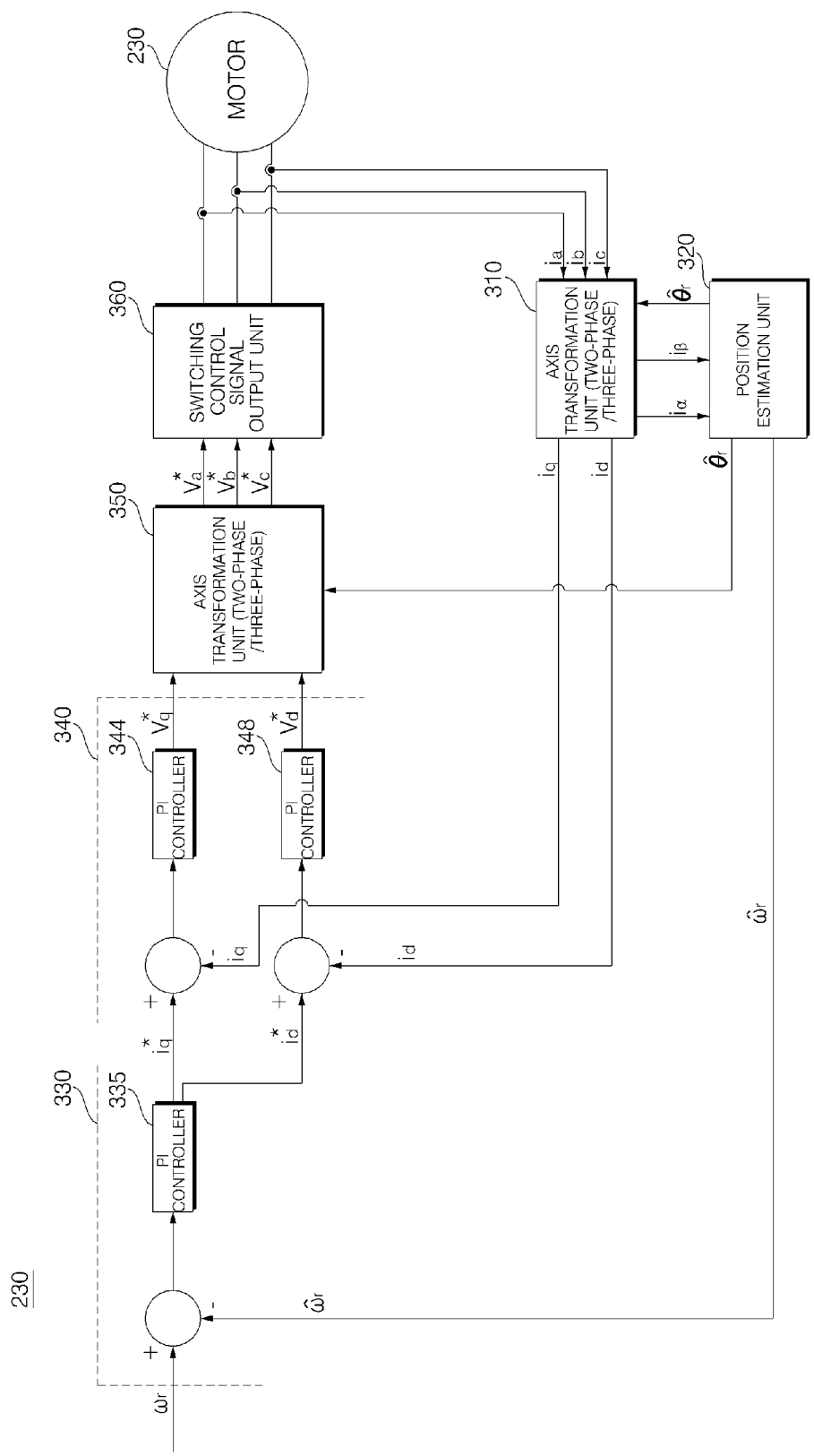
FIG. 4A is an internal block diagram showing an inverter controller of FIGS. 3A and 3B.

FIG. 4A is an internal block diagram showing the inverter controller of FIGS. 3A and 3B.

Referring to FIG. 4A, the inverter controller 230 may include an axis transformation unit 310, a position estimation unit 320, a current reference generation unit 330, a voltage reference generation unit 340, an axis transformation unit 350, and a switching control signal output unit 360.

During operation, for example, the axis transformation unit 310 receives the three-phase output currents $i_a$, $i_b$, and $i_c$ detected by the output current detector E and transforms the received output currents $i_a$, $i_b$, and $i_c$ into two-phase currents $i_\alpha$ and $i_\beta$ of a stationary coordinate system.

The axis transformation unit 310 may transform the two-phase currents $i_\alpha$ and $i_\beta$ of the stationary coordinate system into two-phase currents $i_d$ and $i_q$ of a rotating coordinate system.

The position estimation unit 320 may estimate a rotor position $\hat{\theta}_r$ of the motor 250 based on the two-phase currents $i_\alpha$ and $i_\beta$ of the stationary coordinate system, transformed by the axis transformation unit 310. In addition, the position estimation unit 320 may estimate speed $\hat{\omega}_r$ calculated based on the estimated rotor position $\hat{\theta}_r$.

The current reference generation unit 530 may calculate a speed reference value $\omega^*_r$ based on the calculated speed $\hat{\omega}_r$ and a target speed co, and generates a current reference value $i^*_q$ based on the speed reference value $\omega^*_r$. For example, a PI controller 335 of the current reference generation unit 330 may perform PI control based on the speed reference value $\omega^*_r$, which is the difference between the calculated speed $\hat{\omega}_r$ and the target speed co, to generate a current reference value $i^*_q$. Although a q-axis current reference value $i^*_q$ is shown as the current reference value in the figure, it is possible to generate a d-axis current reference value $i^*_d$ together with the q-axis current reference value $i^*_q$. The d-axis current reference value $i^*_d$ may be set to 0.

The current reference generation unit 330 may further include a limiter (not shown) for limiting the level of the current reference value $i_q$ such that the current reference value $i^*_q$ does not exceed an allowable range.

The voltage reference generation unit 340 may generate d-axis and q-axis voltage reference values $V^*_d$ and $V^*_q$ based on d-axis and q-axis currents $i_d$ and $i_q$ axis-transformed into a two-phase rotating coordinate system by the axis transformation unit and the current reference value $i^*_d$ and $i^*_q$ generated by the current reference generation unit 330. For example, a PI controller 344 of the voltage reference generation unit 340 may perform PI control based on the difference between the q-axis current $i_q$ and the q-axis current reference value $i^*_q$ to generate a q-axis voltage reference value $V^*_q$. In addition, a PI controller 348 of the voltage reference generation unit 340 may perform PI control based on the difference between the d-axis current $i_d$ and the d-axis current reference value $i^*_d$ to generate a d-axis voltage reference value $V^*_d$. The d-axis voltage reference value $V^*_d$ may be set to 0 in the case in which the d-axis current reference value $i^*_d$ is set to 0.

The voltage reference generation unit 340 may further include a limiter (not shown) for limiting levels of the d-axis and q-axis voltage reference values $V^*_d$ and $V^*_q$ such that the d-axis and q-axis voltage reference values $V^*_d$ and $V^*_q$ do not exceed allowable ranges.

The generated d-axis and q-axis voltage reference values $V^*_d$ and $V^*_q$ may be input to the axis transformation unit 350.

The axis transformation unit 350 may receive the calculated position $\hat{\theta}_r$ and the d-axis and q-axis voltage reference values $V^*_d$ and $V^*_q$ from the position estimation unit 320 so as to perform axis transformation.

First, the axis transformation unit 350 may perform transformation from a two-phase rotating coordinate system $\hat{\theta}_r$ to a two-phase stationary coordinate system. The position calculated by the position estimation unit 320 may be used for this operation.

Subsequently, the axis transformation unit 350 may perform transformation from the two-phase stationary coordinate system to a three-phase stationary coordinate system. As a result, the axis transformation unit 350 outputs three-phase output voltage reference values V*a, V*b, and V*c.

The switching control signal output unit 360 may generate and output a PWM-based inverter switching control signal $S_{ic}$ based on the three-phase output voltage reference values V*a, V*b, and V*c.

The output inverter switching control signal $S_{ic}$ may be converted into a gate driving signal by a gate driving unit (not shown), and may then be input to a gate of each switching element of the inverter 220. As a result, the respective switching elements Sa, S'a, Sb, S'b, Sc, and S'c of the inverter 220 perform switching operations.

Figure 4B:
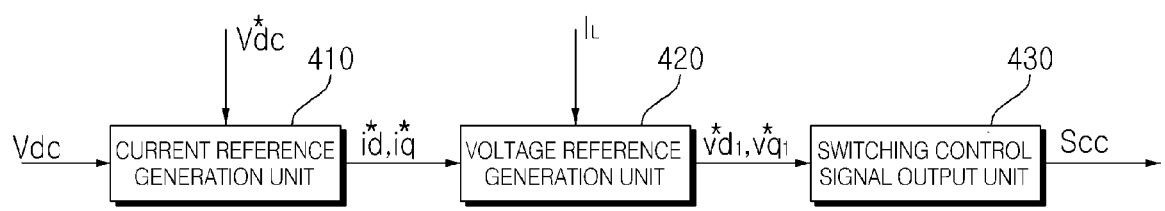
FIG. 4B is an internal block diagram showing a converter controller of FIG. 3B.

FIG. 4B is an internal block diagram showing the converter controller of FIG. 3B.

Referring to FIG. 4B, the converter controller 215 may include a current reference generation unit 410, a voltage reference generation unit 420, and a switching control signal output unit 430.

The current reference generation unit 410 may generate d-axis and q-axis current reference values $i^*_d$ and $i^*_q$ through a PI controller based on the DC terminal voltage $V_{dc}$ detected by the output voltage detector B, i.e. the DC terminal voltage detector B, and a DC terminal voltage reference value $V^*_{dc}$.

The voltage reference generation unit 420 may generate d-axis and q-axis voltage reference values $V^*_d$ and $V^*_q$ through a PI controller based on the d-axis and q-axis current reference values $i^*_d$ and $i^*_q$ and detected input current $i_L$.

The switching control signal output unit 430 may output a converter switching control signal $S_{cc}$ for driving a converter switching element S in the converter 210 to the converter 210 based on the d-axis and q-axis voltage reference values $V^*_d$ and $V^*_q$.

Figure 5:
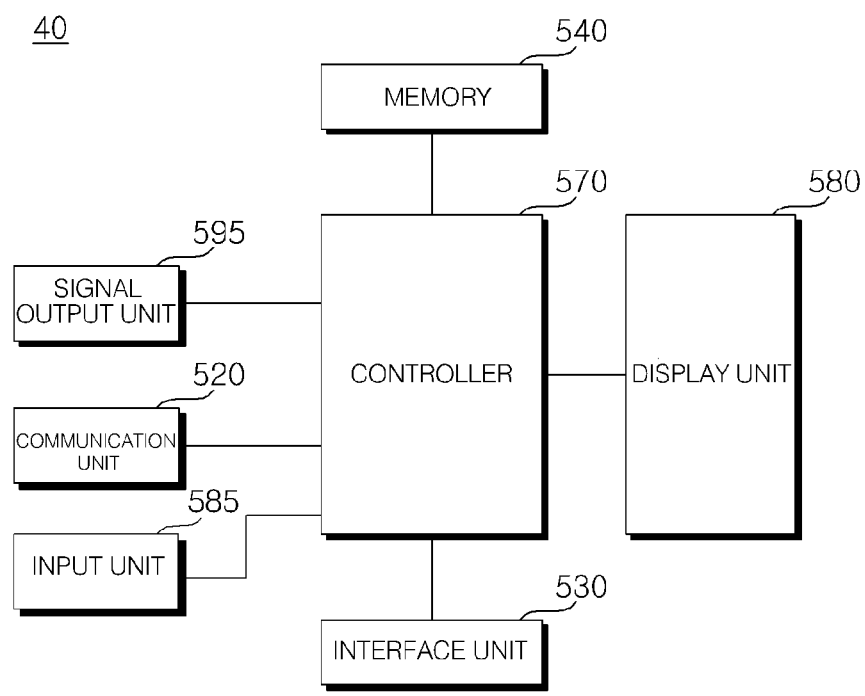
FIG. 5 is an internal block diagram showing an example of an input device according to an embodiment of the present disclosure.

FIG. 5 is an internal block diagram showing an example of an input device according to an embodiment of the present disclosure.

Referring to FIG. 5, the input device 40 may include, inter alia, a communication unit 520, an interface unit 530, a memory 540, a display unit 580, an input unit 585, and/or a power supply unit 595.

The communication unit 520 may exchange data with the indoor unit 30 or the outdoor unit 20.

For example, the communication unit 520 may exchange data with the indoor unit through wired communication.

The communication unit 520 may instead exchange data with the indoor unit through wireless communication, such as ZigBee communication, Wi-Fi communication, or Bluetooth communication.

The communication unit 520 may receive, from the indoor unit 30, information such as, inter alia, current temperature, target temperature, current humidity, or whether the indoor unit 30 is operating.

The controller 570 may perform control such that the information about current temperature, target temperature, current humidity, or whether the indoor unit 30 is operating, received by the communication unit 520, is displayed. In particular, the controller 570 may perform control such that temperature information is displayed when a temperature setting item in a home screen is focused.

The interface unit 530 may provide an interface for exchanging data with an external device.

For example, the interface unit 530 may include a connection part 530a (see FIG. 6) for controlling contact with a heater or a lighting device.

The memory 540 may store various data for the overall operation of the input device 40, such as a program for processing or controlling the controller 570.

The display unit 580 may display the operation state of the input device 40. The display unit 580 may also exchange data with the outdoor unit 20 and the indoor unit 30.

The input unit 585 may include a plurality of buttons, controls, or a touchscreen attached to the input device 40. The input device 40 may be powered on and operated using the buttons or the touchscreen. Numerous input operations may be performed through the input unit 585. For example, the operation of the air conditioner 50 may be input through the input unit 585.

The power supply unit 595 may supply power to the respective components of the input device 585, and be controlled by the controller 570.

The controller 570 may perform control such that a home screen including a plurality of icon items is displayed on the display unit 580. The controller 570 may also perform control such that the color of a focused item, among the icon items in the home screen, is changed based on a set temperature or a set mode.

The controller 570 may perform control such that a focused item, among the icon items in the home screen, is disposed in the central region in the home screen. The controller 570 may also perform control such that the size of the focused item, disposed in the central region, is greater than the sizes of the other items.

The controller 570 may perform control such that the icon items in the home screen are shifted in response to shift input. In addition, the controller 570 may also perform control such that the color of the focused item, disposed in the central region, is changed based on the set temperature or the set mode.

The controller 570 may perform control to navigate between the icon items in the home screen in response to leftward or rightward shift input when the icon items are displayed.

The controller 570 may also perform control such that the color of at least one item selected from among the icon items is changed based on a target temperature.

The controller 570 may also perform control such that the color of the selected item is gradated when the color of the selected item is changed based on the target temperature.

The controller 570 may perform control such that time information, an additional information item, and an oil change item/error number item/$CO_2$ warning item are displayed at the left upper end, the right upper end, and left lower end in the home screen (not limited to this particular arrangement).

The controller 570 may also perform control such that an unoccupied override item is displayed at the right lower end (not limited to this particular arrangement).

Meanwhile, the icon items in the home screen may include for example, inter alia, a temperature setting item, an operation mode setting item, a wind intensity setting item, and/or a menu item.

Meanwhile, the menu item may include for example, inter alia, an override item, an additional operation item, a zone control item, a lock setting item, a timer item, a setting item, an energy storage item, a schedule item, and/or a wind direction items, as sub-menu items.

For example, when the menu item is selected from among the icon items in the home screen, the controller 570 may perform control such that a screen related to at least one selected from among the override item, the additional operation item, the zone control item, the lock setting item, the timer item, the setting item, the energy storage item, the schedule item, and the wind direction item is displayed.

For example, when an upward or downward button is operated after an OK button is selected in the state in which the temperature setting item in the home screen is focused, the controller 570 may perform control such that the set temperature is increased or decreased. In addition, the controller 570 may perform control such that a temperature adjustment signal corresponding to the set temperature is transmitted to the indoor unit 30.

Alternatively, when the upward or downward button is operated without the OK button being selected in the state in which the temperature setting item in the home screen is focused, the controller 570 may perform control such that the set temperature is increased or decreased. In addition, the controller 570 may perform control such that a temperature adjustment signal corresponding to the set temperature is transmitted to the indoor unit 30.

The controller 570 may receive information related to the temperature of the indoor unit 30 through the communication unit 520. The controller 570 may perform control such that the received information about the temperature of the indoor unit 30 is displayed within the temperature setting item. At this time, the controller 570 may perform control such that the color of the temperature setting item is changed depending on the current temperature.

For example, the controller 570 may perform control such that the color of the temperature setting item is red (or another color/visual cue) when the current temperature is high (e.g., greater than a predetermined temperature level) and the color of the temperature setting item is blue (or another color/visual cue) when the current temperature is low (e.g., less than a predetermined temperature level).

Similarly, the controller 570 may perform control such that the color of the temperature setting item is red (or another color/visual cue) when the target temperature is high (e.g., greater than a predetermined temperature level) and such that the color of the temperature setting item is blue (or another color/visual cue) when the target temperature is low (e.g., less than a predetermined temperature level).

Meanwhile, when one or more of the items displayed in the home screen is selected or focused, the controller 570 may perform control such that a specific button is operated and the operation of the other buttons is ignored.

For example, when the operation mode setting item and the wind intensity setting item are selected or focused in response to the operation of the OK button, the controller 570 may perform control such that leftward and rightward buttons, among four-directional buttons (i.e. upward, downward, leftward, and rightward buttons), are operated. That is, the controller 570 may perform control such that another operation mode item for operation mode setting is displayed or another wind intensity item for wind intensity setting is displayed.

According to another embodiment, when the operation mode setting item and the wind intensity setting item are selected or focused, the controller 570 may perform control such that the leftward and rightward buttons, among the four-directional buttons (i.e. the upward, downward, leftward, and rightward buttons), are operated and the operation of the upward and downward buttons is ignored.

Meanwhile, when a power button is operated in the state in which an RGB color-based home screen is displayed, the controller 570 may perform control such that the luminance is reduced and a gray-based home screen is displayed.

Alternatively, when the power button is pressed in the state in which the RGB color-based home screen is displayed, the controller 570 may perform control such that the RGB color-based home screen is displayed in the state in which luminance is reduced.

In other words, when the input device 40 enters a standby mode in response to the operation of the power button, the controller 570 may perform control such that a gray-based home screen or a low-luminance home screen is displayed.

In the standby mode, the controller 570 may perform control such that the temperature setting item is displayed as an RGB-based image. In the standby mode, the luminance of the RGB-based image of the temperature setting item or the saturation of the RGB-based image may be lower than in the operation mode.

In the case in which the power button is further operated, the controller 570 may perform control such that the input device 40 enters an off mode from the standby mode. In other words, in the off mode, the controller 570 may perform control such that no data are displayed on the display unit 580.

In the case in which the power button is operated in the off mode, the controller 570 may perform control such that the off mode is switched to the standby mode or the operation mode is immediately executed.

In the case in which the input device 40 is powered on again and thus enters the operation mode, the controller 570 may perform control such that the temperature setting item, among the items, is displayed in the central region in the home screen. In other words, the controller 570 may perform control such that, when the first home screen is displayed, the temperature setting item, among the items, is displayed in the central region in the home screen by default irrespective of the last focused item. Consequently, a user may readily confirm the temperature setting item.

According to another embodiment, in the case in which the input device 40 is powered on again and thus enters the operation mode, the controller 570 may perform control such that the last focused item is displayed in the central region in the home screen using a memory function. Consequently, the user may immediately confirm the last focused item.

Additionally, when the power button is pressed for a long time in the operation mode, the controller 570 may perform control such that the input device immediately enters the off mode without entering the standby mode.

The controller 570 may perform control such that the temperature setting information set by manipulating the input unit 585 is transmitted to another device, such as a heater or a lighting device, through the interface unit 530.

In the case in which contact control is possible through the connection part 530*a* in the interface unit 530, as described above, the controller 570 may perform control such that the temperature setting information set by manipulating the input unit 585 is transmitted to another device, such as a heater or a lighting device, through the interface unit 530.

Consequently, operation of the heater or the lighting device as well as the operation of the air conditioner, may be controlled through the input device 40 for inputting the operation of the air conditioner 50, such as the indoor unit 30.

For example, the color of light emitted from the lighting device may be changed based on the temperature set by the input device 40.

Specifically, for example, when the set temperature is high (e.g., greater than a predetermined temperature level), the temperature setting item of the input device 40 may be displayed in red (or another color/visual cue), and the lighting device may emit red light (or another color/visual cue). When the set temperature is low (e.g., less than a predetermined temperature level), the temperature setting item of the input device 40 may be displayed in blue (or another color/visual cue), and the lighting device may emit blue light (or another color/visual cue). Consequently, a mood light may be emitted.

Meanwhile, the controller 570 may perform control such that the temperature setting information set by manipulating the input unit 585 is transmitted to another device, such as an audio output device or an image display device, including a TV, through the communication unit 520.

In the case in which one selected from among Bluetooth communication, Wi-Fi communication, and ZigBee communication is possible as described above, the controller 570 may perform control such that the temperature setting information set by manipulating the input unit 585 is transmitted to another device, such as an audio output device or an image display device, including a TV, through the communication unit 520.

Consequently, operation of the audio output device or the image display device, including the TV, as well as operation of the air conditioner, may be controlled through the input device 40 for inputting the operation of the air conditioner 50, such as the indoor unit 30.

For example, audio may be output from the audio output device or an image may be output from the image display device based on the temperature set by the input device 40.

Specifically, for example, when the set temperature is high (e.g., above a predetermined temperature level), the temperature setting item of the input device 40 may be displayed in red, and the audio output device or the image display device may output or display content suggesting warmth. When the set temperature is low (e.g., below a predetermined temperature level), the temperature setting item of the input device 40 may be displayed in blue (or another color/visual cue), and the audio output device or the image display device may output or display content suggesting coolness.

Figure 6:
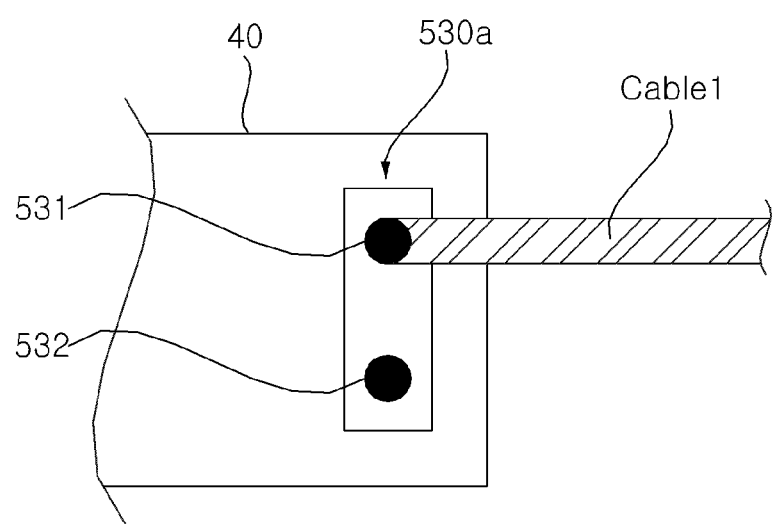
FIG. 6 is a view showing an interface unit of the input device of FIG. 5.

FIG. 6 is a view showing the interface unit of the input device of FIG. 5.

Referring to FIG. 6, the interface unit 530 may include a connection part 530a for controlling contact with an external device.

The connection part 530a may include a plurality of contacts 531 and 532.

A cable may be connected to one of the contacts 531 and 532.

For example, in the case in which an external device electrically connected to the cable is a lighting device, the controller 570 may perform control such that the temperature setting information set by manipulating the input unit 585 is transmitted to the lighting device through the communication unit 520.

The temperature setting information set by manipulating the input unit 585 may be transferred to an air purifier, another indoor unit, or a heater, in addition to the lighting device, through the connection part 530a.

The connection part 530a may receive data from an external device.

For example, the connection part 530a may receive light color information or light luminance information from the lighting device.

The received light color information or light luminance information may be transmitted to the controller 570 of the input device 40. The controller 570 may perform control such that the light color information or light luminance information of the lighting device received through the interface unit 530 is displayed on the display unit 580.

The controller 570 may perform control such that recommended temperature setting information or recommended operation mode information based on the light color information or light luminance information of the lighting device is displayed on the display unit 580. Consequently, the air conditioner may be operated in cooperation with the lighting device.

According to another embodiment, in the case in which the connection part 530a is connected to another air conditioner, e.g., another indoor unit, the connection part 530a may exchange data with the air conditioner connected thereto. The temperature setting information or the operation mode setting information set by manipulating the input unit 585 may be transmitted to another air conditioner.

Alternatively, the temperature setting information or the operation mode setting information of the air conditioner may be received from another air conditioner. Consequently, the air conditioner may be operated in cooperation with the other air conditioner.

FIGS. 7A to 21G are reference views illustrating the operation of the input device.

Figure 7A:
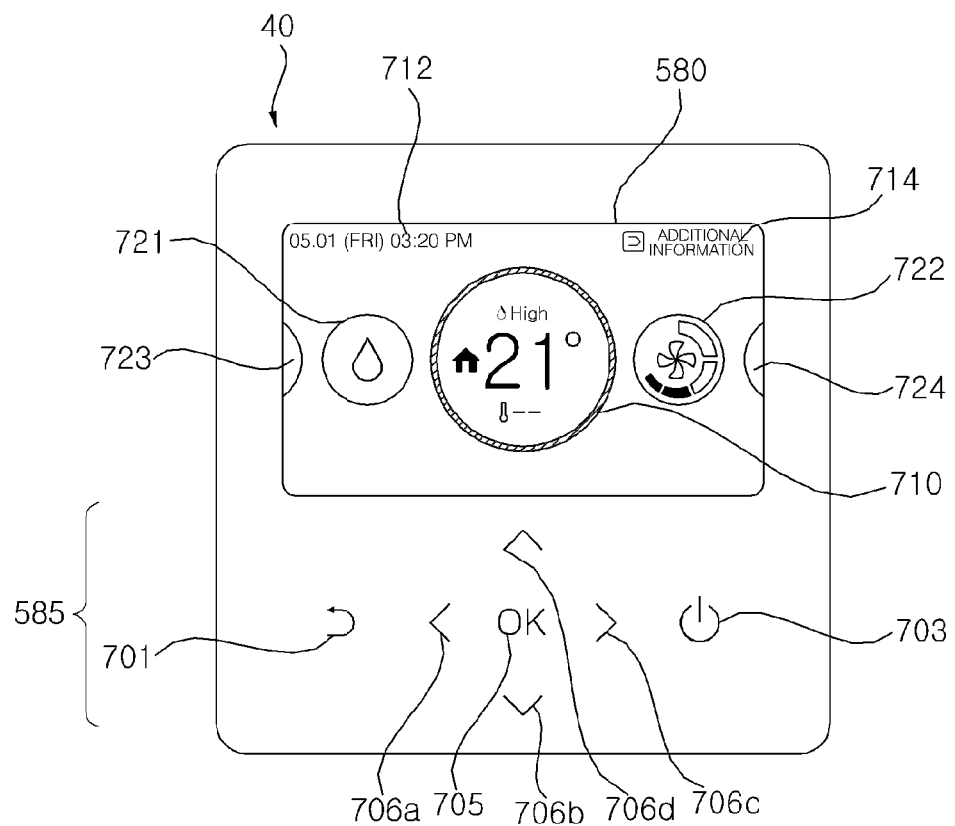
FIG. 7A is a reference view illustrating an embodiment of the operation of the input device.

FIG. 7A illustrates the input device 40 in the operation mode.

Referring to FIG. 7A, the input device 40 may include a display unit 580 and an input unit 585.

The input unit 585 may include four-directional buttons 706a, 706b, 706c, and 706d, an OK button 705, a power button 703, and a back button 701.

The controller 570 may perform control such that a home screen including a plurality of icon items is displayed on the display unit 580 in the operation mode.

The icon items may include, inter alia, a temperature setting item 710, an operation mode item 721, and/or a wind intensity item 722, which may be displayed in the central region, the left side, and the right side, respectively.

The controller 570 may perform control such that partial icon items 723 and 724 are displayed in order to indicate additional icon items, which are not displayed in the home screen, such as shown in FIG. 7A.

The controller 570 may perform control such that a focused item or an item disposed in the central region, among the icon items, is displayed differently from the other items.

The controller 570 may perform control such that the temperature setting item 710, among the icon items, is focused, is disposed in the central region, and is displayed in the state of being larger than the other items.

For example, when the temperature setting item 710 is focused and disposed in the central region, the controller 570 may perform control such that the temperature setting item 710 is displayed in color, unlike the other items.

The edge of the temperature setting item 710 may be displayed in blue (or another color/visual cue).

The temperature setting item 710 may include current temperature information and may display the current temperature information. When the temperature setting item 710 is subsequently selected, the current temperature information may be changed to set temperature information, which is displayed.

The home screen may further include time information 712 indicating the current time. The time information 712 may be disposed at the left upper end thereof (not limited thereto), and an additional information item 714 indicating additional information may be disposed at the right upper end thereof (not limited thereto).

Figure 7B:
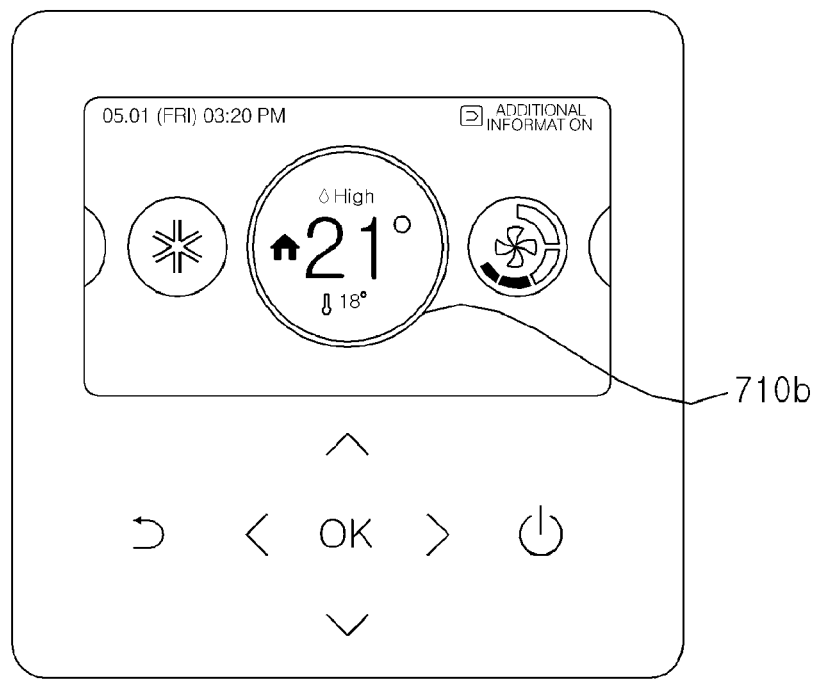
FIG. 7B illustrates another reference view showing operation of the input device.

When the power button 703 is operated in the state in which the input device 40 is in the operation mode, such as shown in FIG. 7A, the input device 40 may enter the standby mode, such as shown in FIG. 7B.

FIG. 7B illustrates the input device 40 in the standby mode.

When the input device 40 enters the standby mode in response to the operation of the power button 703, the controller 570 may perform control such that a gray-based home screen or a low-luminance home screen is displayed.

The edge of the temperature setting item 710b may be in black (not limited thereto). In addition, the entire region of the home screen may be displayed in black or gray. Consequently, the user may intuitively recognize that the input device 40 is in the standby mode.

Figure 7C:
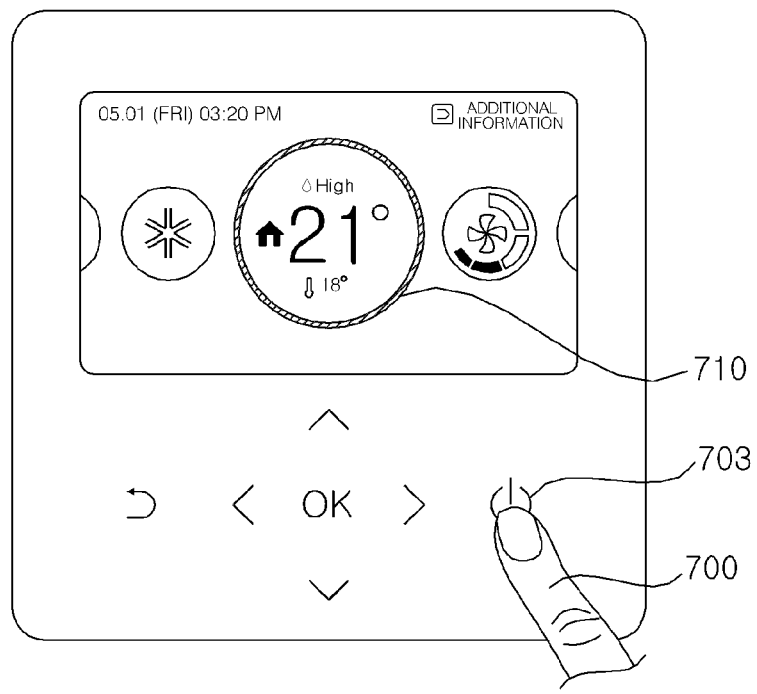
FIG. 7C is illustrates another reference view showing operation of the input device.

Meanwhile, when the power button 703 is operated again in the state in which the input device 40 is in the standby mode, such as shown in FIG. 7B, the input device 40 may enter the operation mode again, such as shown in FIG. 7C.

When the input device 40 re-enters the operation mode, the controller 570 may perform control such that a home screen including colored items is displayed. For example, the edge of the temperature setting item 710 may be displayed in blue (or another color/visual cue).

Meanwhile, when the input device 40 is powered on again and thus enters the operation mode, the controller 570 may perform control such that the temperature setting item 710, among the items, is displayed in the central region in the home screen. That is, the controller 570 may perform control such that, when the first home screen is displayed, the temperature setting item, among the items, is displayed in the central region in the home screen by default irrespective of the last focused item. Consequently, the user may readily confirm the temperature setting item.

Figure 7D:
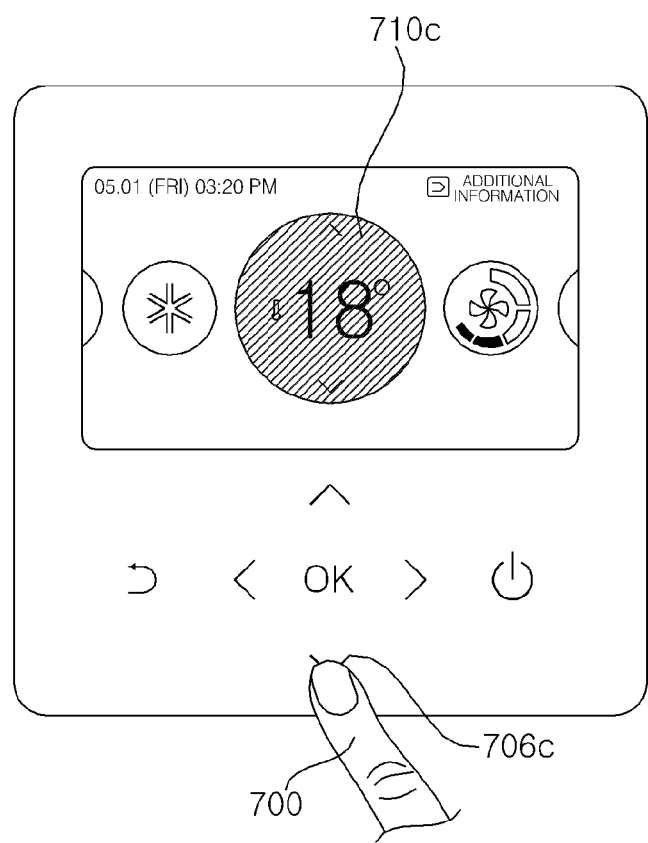
FIG. 7D illustrates another reference view showing operation of the input device.

Meanwhile, when the downward button 706*c* is operated, such as shown in FIG. 7D, in the state in which the temperature setting item 710*c* is focused, the controller 570 may perform control such that a temperature setting mode is immediately executed.

Consequently, the current temperature information, which is displayed in the temperature setting item 710*c*, may be changed to set temperature information, which is displayed.

That is, "21 degrees" is displayed as the current temperature information in FIG. 7C, and "18 degrees" is displayed as the set temperature information in FIG. 7D.

At this time, the controller 570 may perform control such that the color of the temperature setting item 710 is changed depending on the set temperature information. For example, the "18 degrees" shown in FIG. 7D may be displayed in blue (or another color/visual cue).

Meanwhile, the controller 570 may perform control such that the temperature setting item 710 is displayed in red (or another color/visual cue) when the set temperature is high (e.g., greater than a predetermined temperature) and such that the temperature setting item 710 is displayed in blue (or another color/visual cue) when the set temperature is low (e.g., less than a predetermined temperature). Consequently, the user may intuitively recognize the set temperature.

Figure 7E:
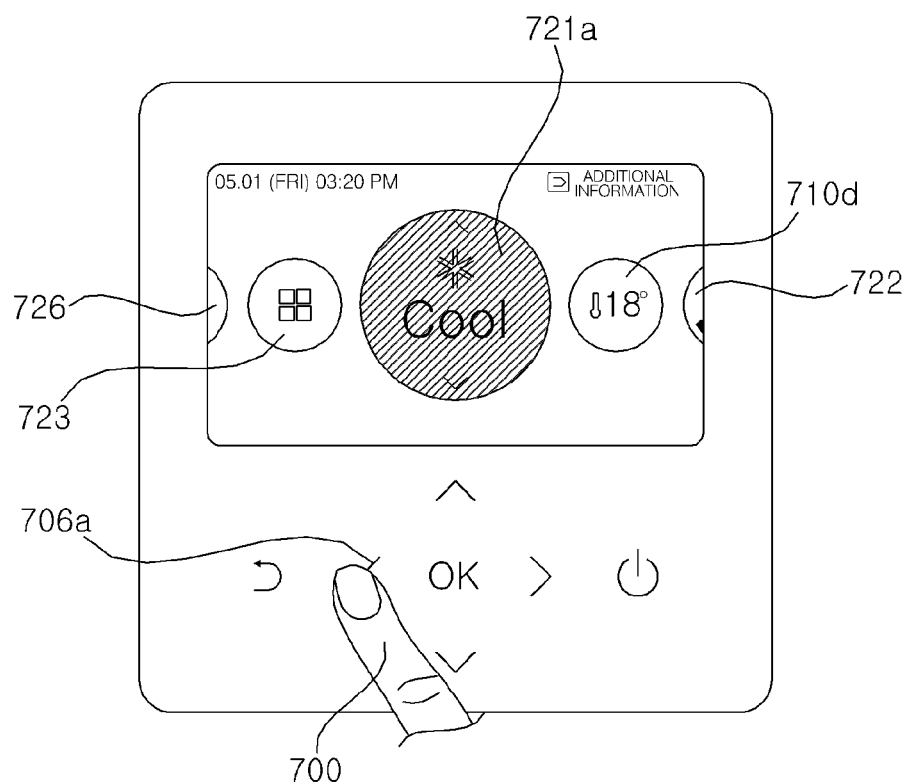
FIG. 7E illustrates another reference view showing operation of the input device.

Meanwhile, when the leftward button 706*a* is operated, such as shown in FIG. 7E, in the state in which the temperature setting item 710*d* is focused, the operation mode item 721*a*, located at the left side of the temperature setting item 710*d*, is focused, is shifted to the central region of the home screen, and is displayed in the central region. The operation mode item 721*a* is displayed in the state of being larger than the other items.

FIG. 7E illustrates a home screen in which a operation mode item 721*a* is focused.

A menu item 723 may be displayed at the left side of the operation mode item 721*a*, and a small-sized temperature setting item 710*d* may be displayed at the right side of the operation mode item 721*a*. At this time, the temperature setting item 710*d* may be displayed in gray.

The controller 570 may perform control such that, when the operation mode item 721*a* is focused and displayed, the color of the operation mode item 721*a* is changed depending on the operation mode.

For example, as shown in FIG. 7E, the operation mode of the operation mode item 721*a* may be a cooling mode. The operation mode item 721*a* may be displayed in blue (or another color/visual cue).

Meanwhile, when the rightward button or the leftward button is operated in the state in which the operation mode item 721*a* is displayed, the controller 570 may perform control such that the items displayed in the home screen are shifted. For example, the controller 570 may perform control such that the menu item or the temperature setting item is shifted, focused, and displayed.

Meanwhile, when the upward button, the downward button, or the OK button is operated in the state in which the operation mode item 721*a* is displayed, the controller 570 may perform control such that the operation mode is changed.

Figure 7F:
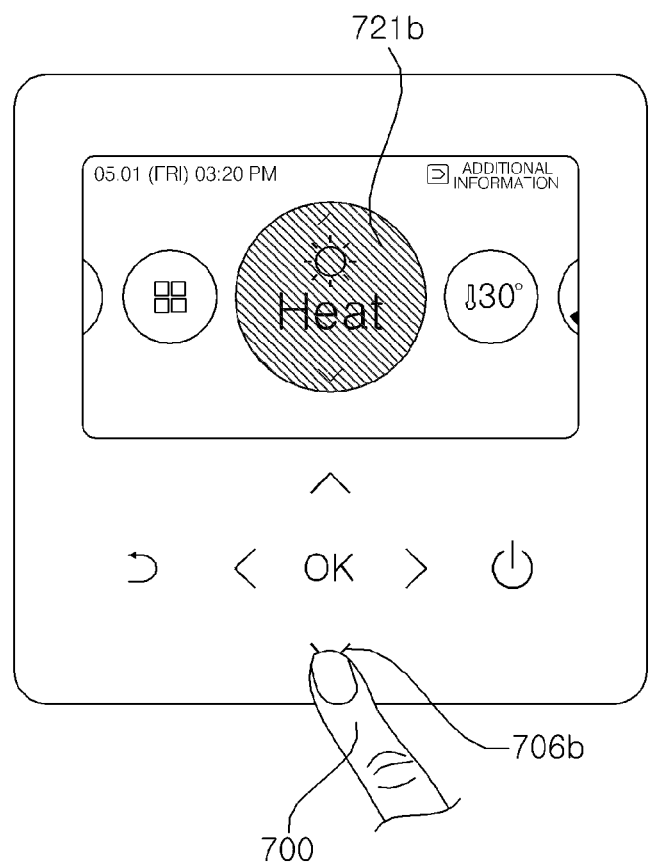
FIG. 7F illustrates another reference view showing operation of the input device.

When the downward button 706*b* is selected, such as shown in FIG. 7F, in the state in which the operation mode item 721*a* corresponding to the cooling mode is displayed, the controller 570 may perform control such that the operation mode is changed from the cooling mode to a heating mode.

That is, the controller 570 may perform control such that an operation mode item 721*b* corresponding to the heating mode is displayed. To display the heating mode, the controller 570 may perform control such that the operation mode item 721*b* is displayed in red.

Figure 7G:
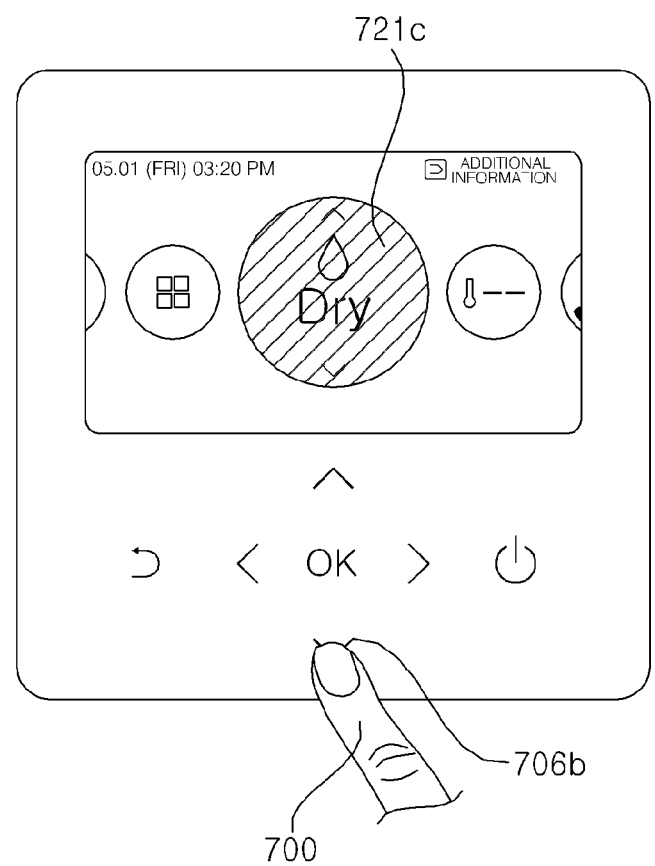
FIG. 7G illustrates another reference view showing operation of the input device.

Meanwhile, when the downward button 706*b* is selected, such as shown in FIG. 7G, in the state in which the operation mode item 721*b* corresponding to the heating mode is displayed, the controller 570 may perform control such that the operation mode is changed from the heating mode to a dehumidification mode.

That is, the controller 570 may perform control such that an operation mode item 721*c* corresponding to the dehumidification mode is displayed. To display the dehumidification mode, the controller 570 may perform control such that the operation mode item 721*c* is displayed in deep blue or gradated blue (or another color/visual cue).

Figure 7H:
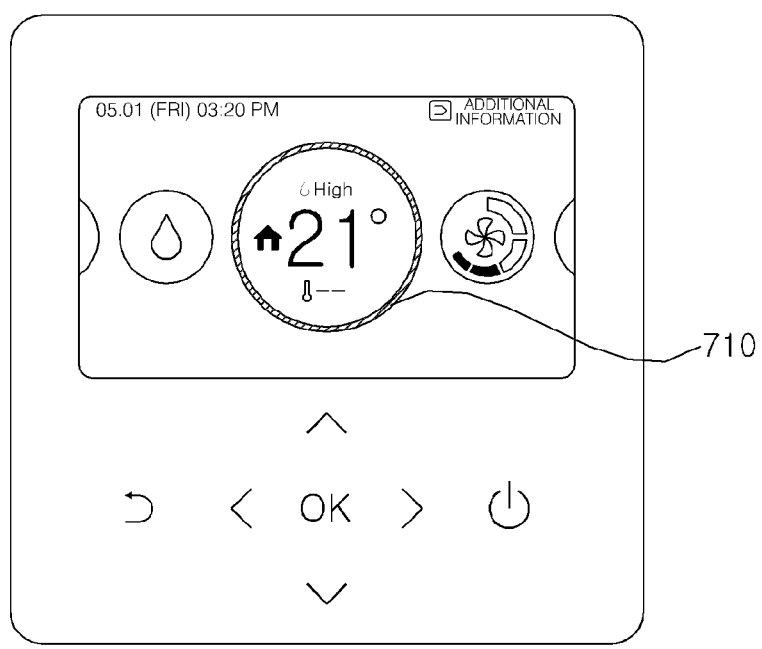
FIG. 7H illustrates another reference view showing operation of the input device.

Meanwhile, when the rightward button 706*c* is selected, in the state in which the operation mode item 721*c* corresponding to the dehumidification mode is displayed, the controller 570 may perform control such that the temperature setting item 710 is focused and displayed, such as shown in FIG. 7H.

Figure 8A:
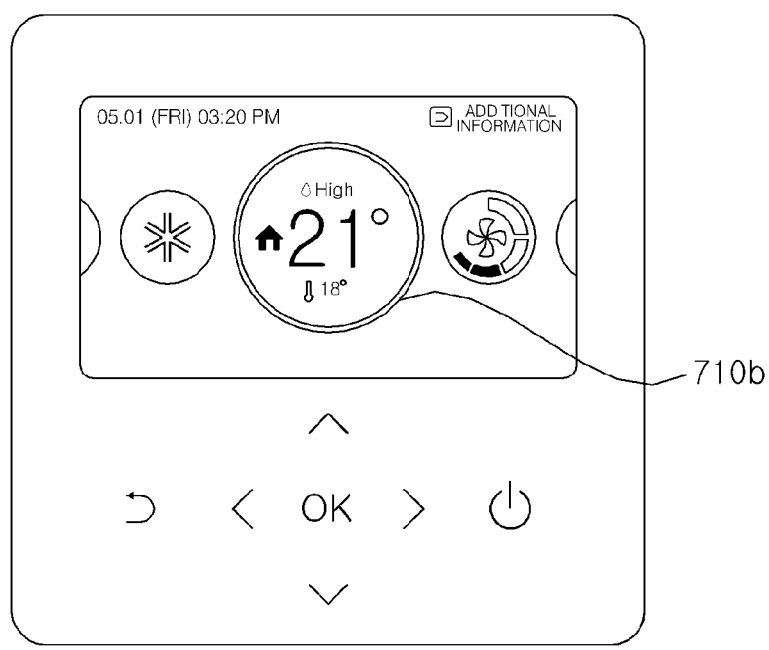
FIG. 8A illustrates a reference view of the input device in the standby mode.

FIG. 8A illustrates an embodiment of the input device in the standby mode.

When the input device 40 enters the standby mode in response to the operation of the power button 703, the controller 570 may perform control such that a gray-based home screen or a low-luminance home screen is displayed.

For example, the controller 570 may perform control such that the luminance of the temperature setting item 710*b* is reduced or the temperature setting item 710*b* is displayed in gray. Consequently, the user may intuitively recognize that the input device 40 is in the standby mode.

Figure 8B:
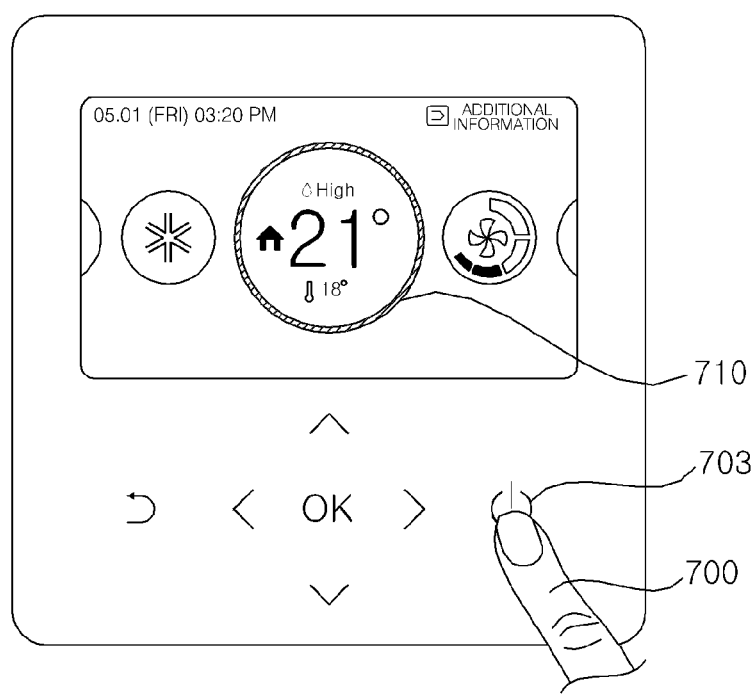
FIG. 8B illustrates another reference view of the input device in the operation mode.

FIG. 8B illustrates an embodiment of the input device in the operation mode.

Referring to FIG. 8B, when the power button 703 is operated in the standby mode, the input device enters the operation mode.

When the input device enters the operation mode, the controller 570 may perform control such that a home screen including colored items is displayed. For example, the edge of the temperature setting item 710 may be displayed in blue (or another color/visual cue).

Figure 8C:
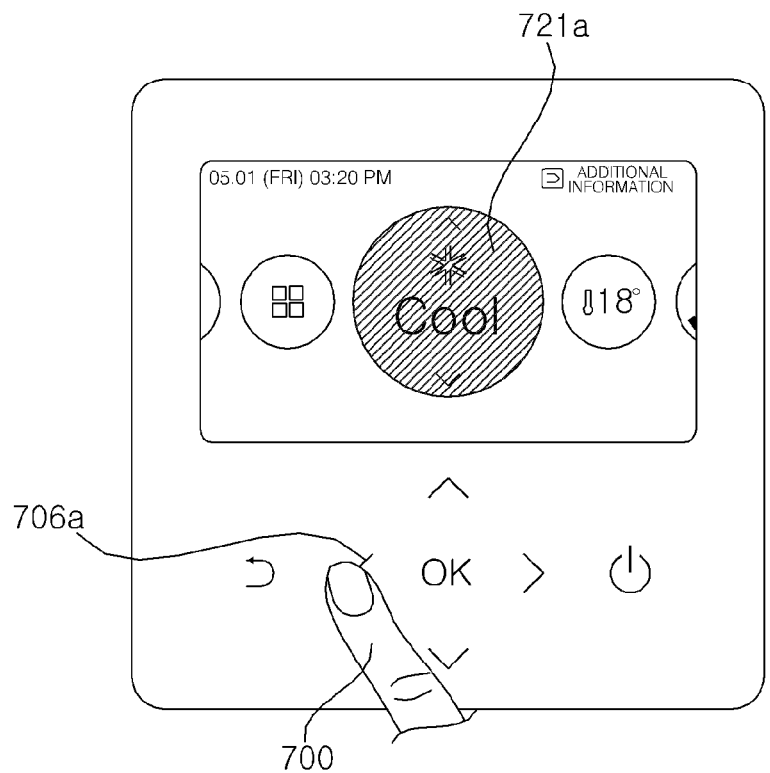
FIG. 8C illustrates another reference view of the input device in the operation mode.

Meanwhile, when the leftward button 706*a* is operated, the controller 570 may perform control such that the operation mode item 721*a* is focused and displayed, such as shown in FIG. 8C. The entirety of the operation mode item 721*a*, rather than just the edge of the operation mode item 721*a*, may be displayed in blue (or another color/visual cue). Consequently, the user may intuitively recognize that the operation mode item 721*a* indicates a cooling mode.

Figure 8D:
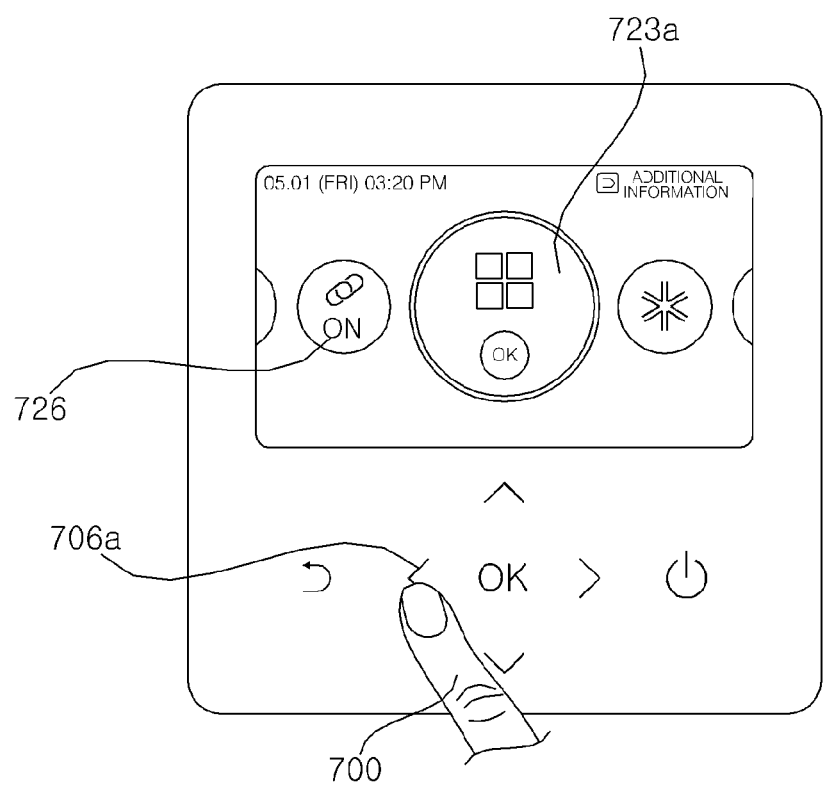
FIG. 8D illustrates another reference view of the input device in the operation mode.

Meanwhile, when the leftward button 706*a* is operated, the controller 570 may perform control such that a menu item 723*a* is focused and displayed, such as shown in FIG. 8D.

Meanwhile, the controller 570 may perform control such that items having no relationship with temperature, among the items in the home screen, are displayed in gray, rather than in color.

For example, a black-based menu item 723*a* may be displayed. Consequently, the user may intuitively recognize that the menu item has no relationship with temperature.

The menu item may further include, inter alia, an override item, an additional operation item, a zone control item, a lock setting item, a timer item, a setting item, an energy storage item, a schedule item, and/or a wind direction item, as sub-menu items.

Figure 8E:
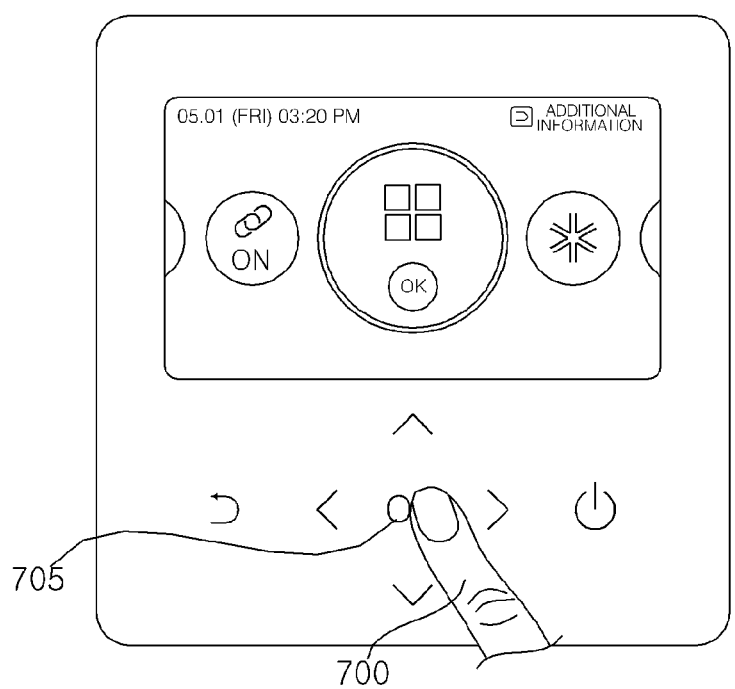
FIG. 8E illustrates another reference view of the input device in the operation mode.

Meanwhile, when the OK button 705 is operated, such as shown in FIG. 8E, in the state in which the black-based menu item 723a is focused and displayed, the controller 570 may perform control such that the sub-menu items of the menu item are displayed on the display unit 580.

Figure 8F:
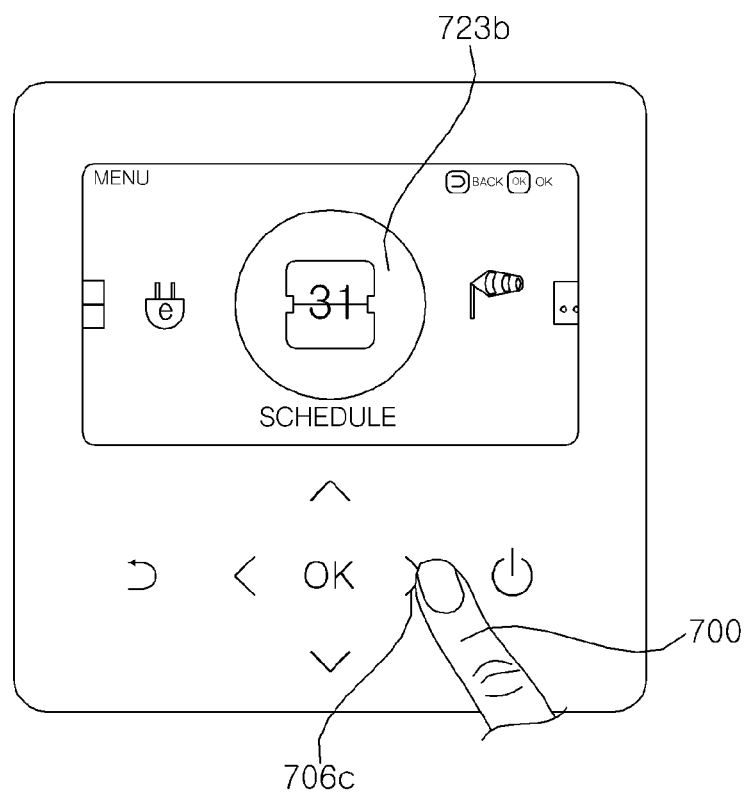
FIG. 8F illustrates another reference view of the input device in the operation mode.

FIG. 8F illustrates that the schedule item 723b, among the sub-menu items, is focused and displayed.

Figure 8G:
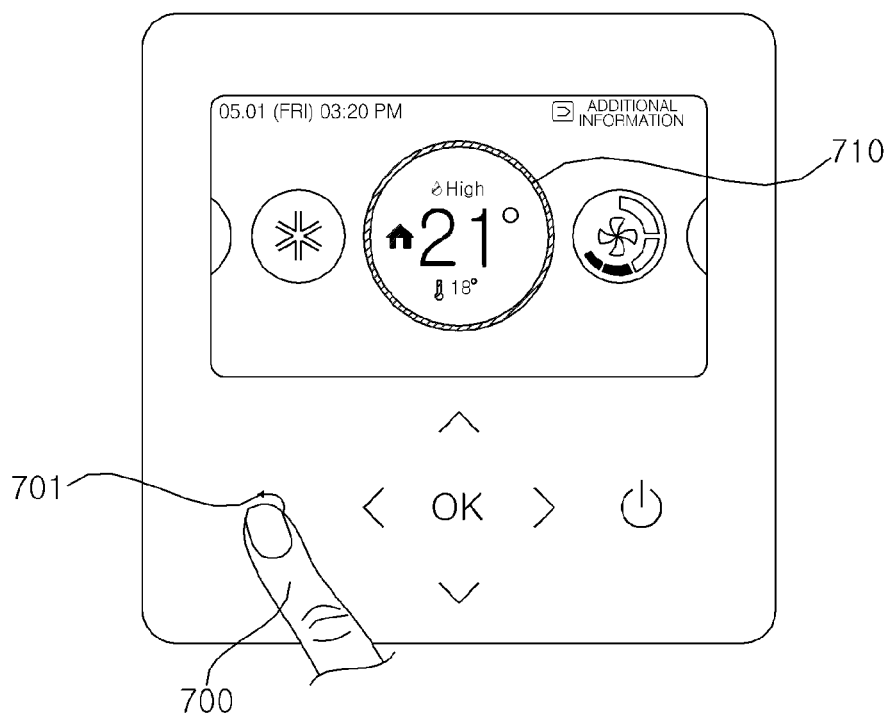
FIG. 8G illustrates another reference view of the input device in the operation mode.

As shown in FIG. 8G, when the back button 701 is operated the controller 570 may perform control such that the home screen is displayed again on the display unit 580 in the state in which the temperature setting item 710 is focused.

That is, the previously displayed item, e.g. the temperature setting item 710, may be focused and displayed in response to the operation of the back button.

Although the embodiments shown in FIGS. 7A to 8G illustrate that the input unit 585 and the display unit 580 are separately provided, it is understood that the input unit 585 and the display unit 580 may be integrated (e.g., to constitute a touchscreen).

Figure 9A:
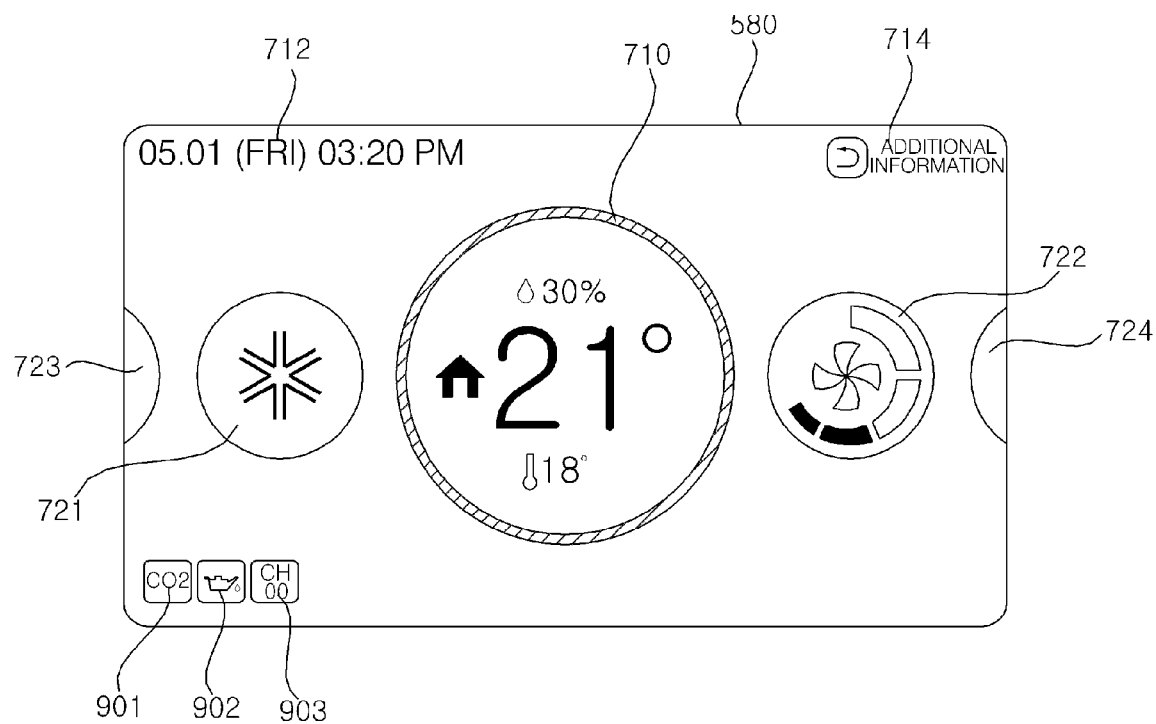
FIG. 9A illustrates a reference view of the input device in the operation mode.

FIG. 9A illustrates the input device 40 in the operation mode.

The input device 40 may include a touchscreen-type display unit 580.

Consequently, touch input, sweep input, and flicking input may be provided as part of the display unit 580.

The controller 570 may perform control such that a home screen including a plurality of icon items is displayed on the display unit 580 in the operation mode.

As shown in FIG. 9A, among the icon items, for example, a temperature setting item 710, an operation mode item 721, and a wind intensity item 722 may be displayed in the central region, the left side, and the right side, respectively (not limited to this particular arrangement or icons).

Meanwhile, as shown, the controller 570 may perform control such that partial icon items 723 and 724 are displayed in order to indicate additional icon items, which are not displayed in the home screen.

Meanwhile, the controller 570 may perform control such that a focused item or an item disposed in the central region, among the icon items, is displayed differently from the other items.

Meanwhile, the controller 570 may perform control such that the temperature setting item 710, among the icon items, is focused, is disposed in the central region, and is displayed in the state of being larger than the other items.

Meanwhile, when the temperature setting item 710, among the icon items, is focused and disposed in the central region, the controller 570 may perform control such that the temperature setting item 710 is displayed as a different color than the other items.

For example, the edge of the temperature setting item 710 may be displayed in blue (or another color).

Meanwhile, the temperature setting item 710 may include current temperature information and display the current temperature information. When the temperature setting item 710 is subsequently selected, the current temperature information may be changed to set temperature information, which is displayed.

The home screen may further include, inter alia, time information 712 indicating the current time, which is disposed at the left upper end thereof (not limited thereto), an additional information item 714 indicating additional information, which is disposed at the right upper end thereof (not limited thereto), and $CO_2$ information 901, oil change information 902, and emergency control information 902, which are disposed at the left lower end thereof (not limited thereto).

Meanwhile, in the case in which the current mode is a cooling mode, such as shown in FIG. 9A, the controller 570 may perform control such that the edge of the temperature setting item 710 is displayed in blue (or another color).

Figure 9B:
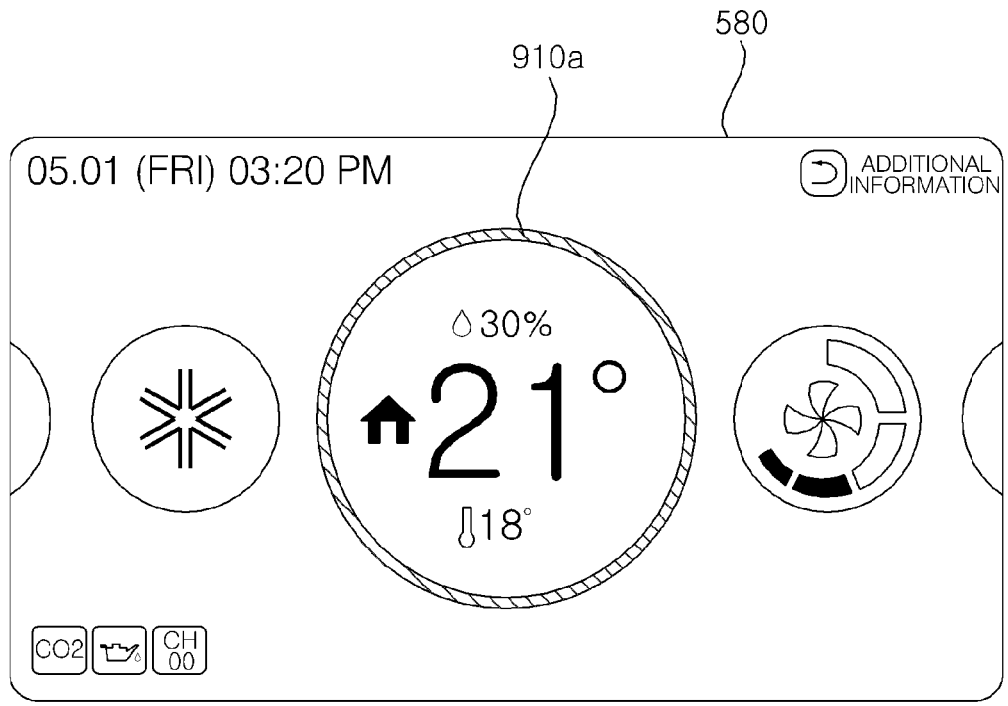
FIG. 9B illustrates another reference view of the input device in the operation mode.

Meanwhile, in the case in which the current mode is a heating mode, such as shown in FIG. 9B, the controller 570 may perform control such that the edge of a temperature setting item 910a is displayed in red (or another color).

Figure 9C:
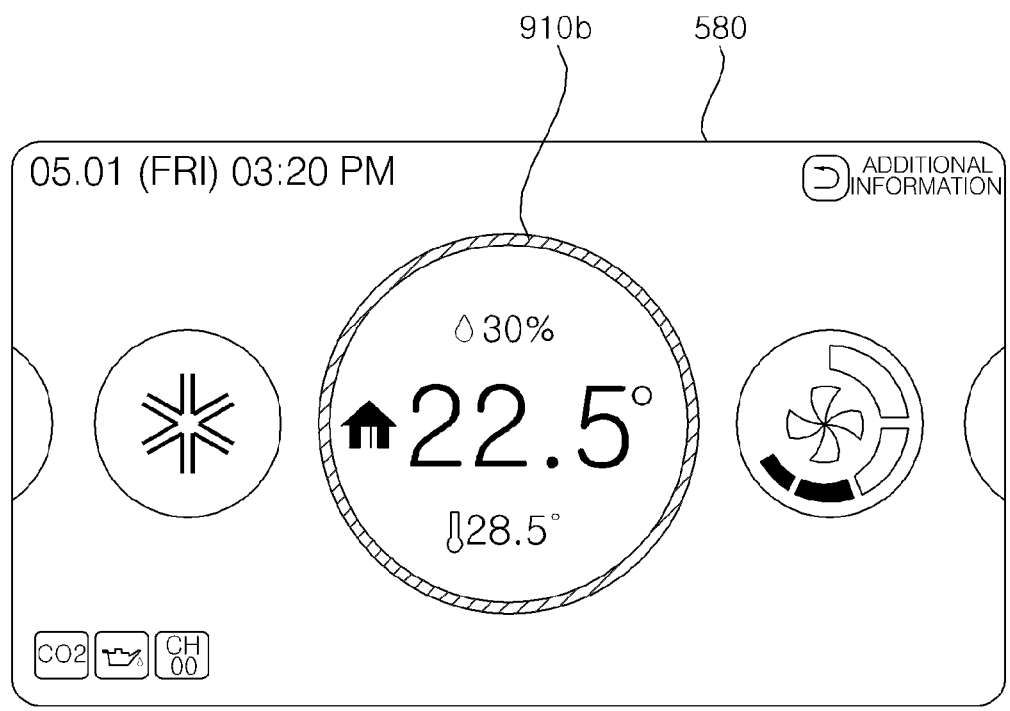
FIG. 9C illustrates another reference view of the input device in the operation mode.

Meanwhile, in the case in which the current mode can be set in units of 0.5 degrees, such as shown in FIG. 9C, the controller 570 may perform control such that the unit of the temperature information displayed in a temperature setting item 910b may be changed to "22.5 degrees."

Figure 9D:
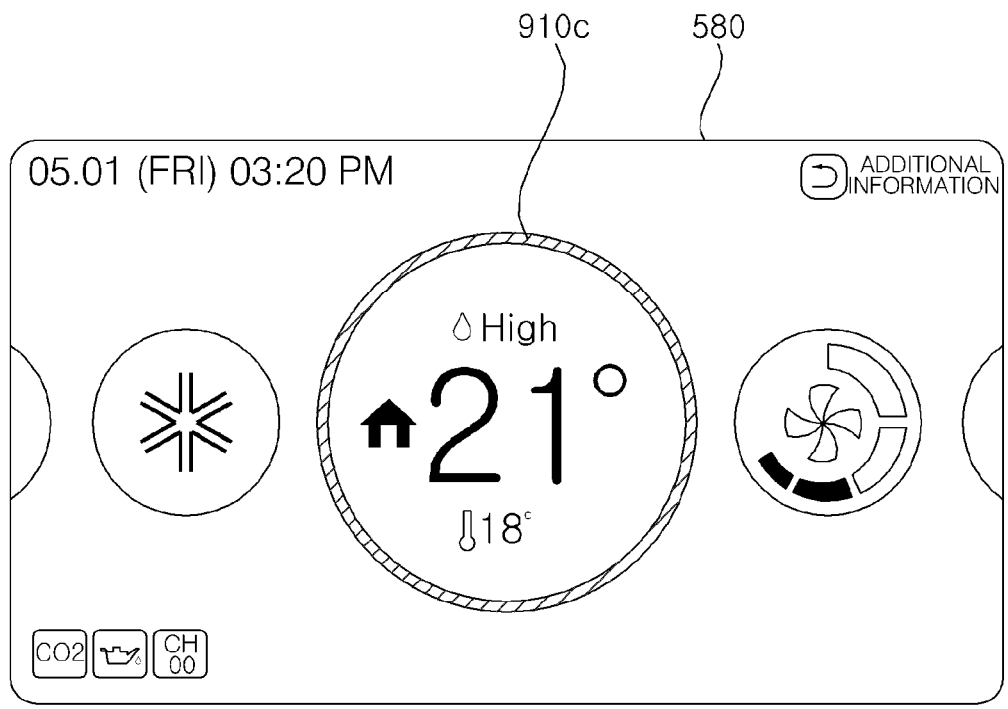
FIG. 9D illustrates another reference view of the input device in the operation mode.

Meanwhile, in the case in which humidity information can be displayed, such as shown in FIG. 9D, the controller 570 may perform control such that the text "high" (or similar text) is displayed in a temperature setting item 910c as the humidity information.

Figure 9E:
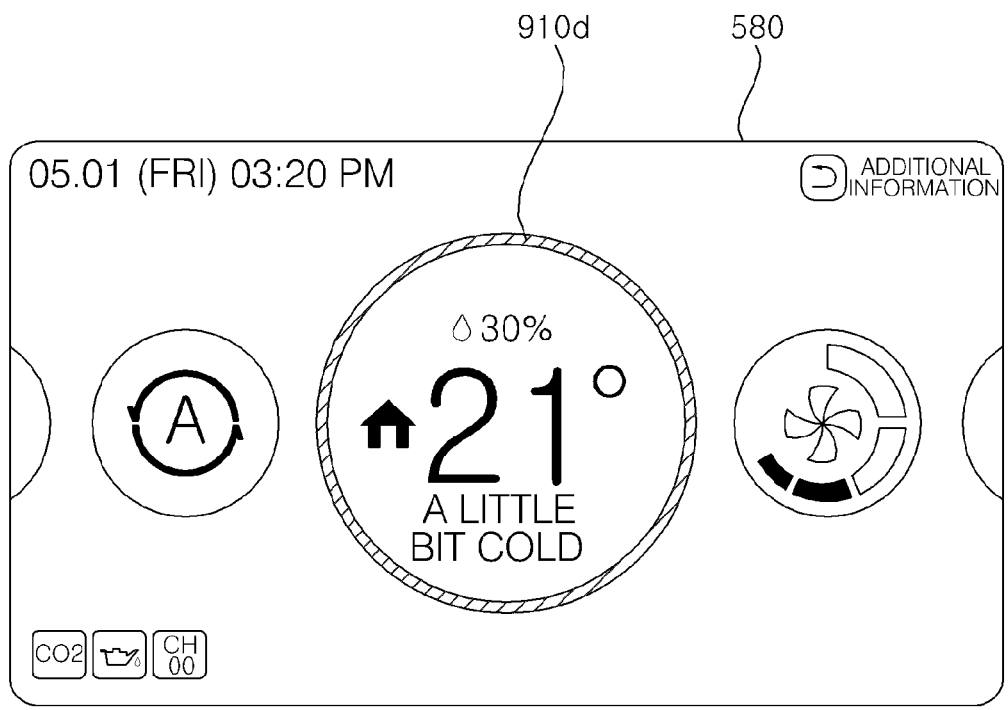
FIG. 9E illustrates another reference view of the input device in the operation mode.

Meanwhile, in the case in which the current mode is an automatic mode, such as shown in FIG. 9E, the controller 570 may perform control such that a message related to temperature (e.g. "a little bit cold") is displayed in a temperature setting item 910d.

Figure 9F:
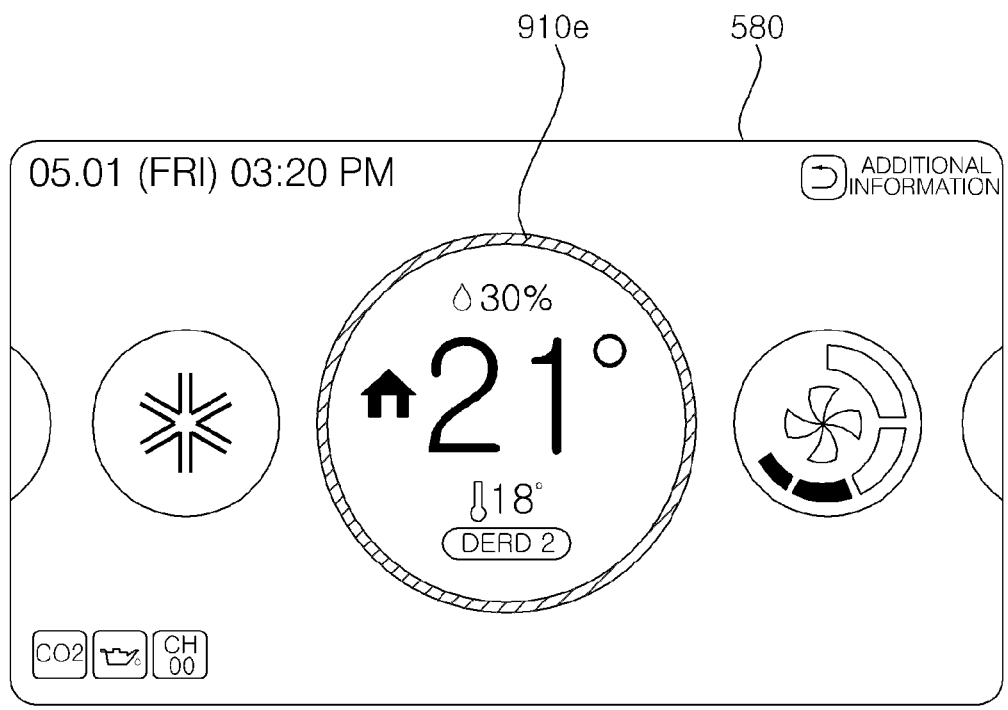
FIG. 9F illustrates another reference view of the input device in the operation mode.

Meanwhile, in the case in which the current mode is a DRED mode, such as shown in FIG. 9F, the controller 570 may perform control such that a message related to DRED is displayed in a temperature setting item 910e.

Meanwhile, a setting item may be included in the menu item. When the setting item is selected after the menu item is selected, various setting screens may be displayed, such as shown in FIGS. 10A and 10B.

Figure 10A:
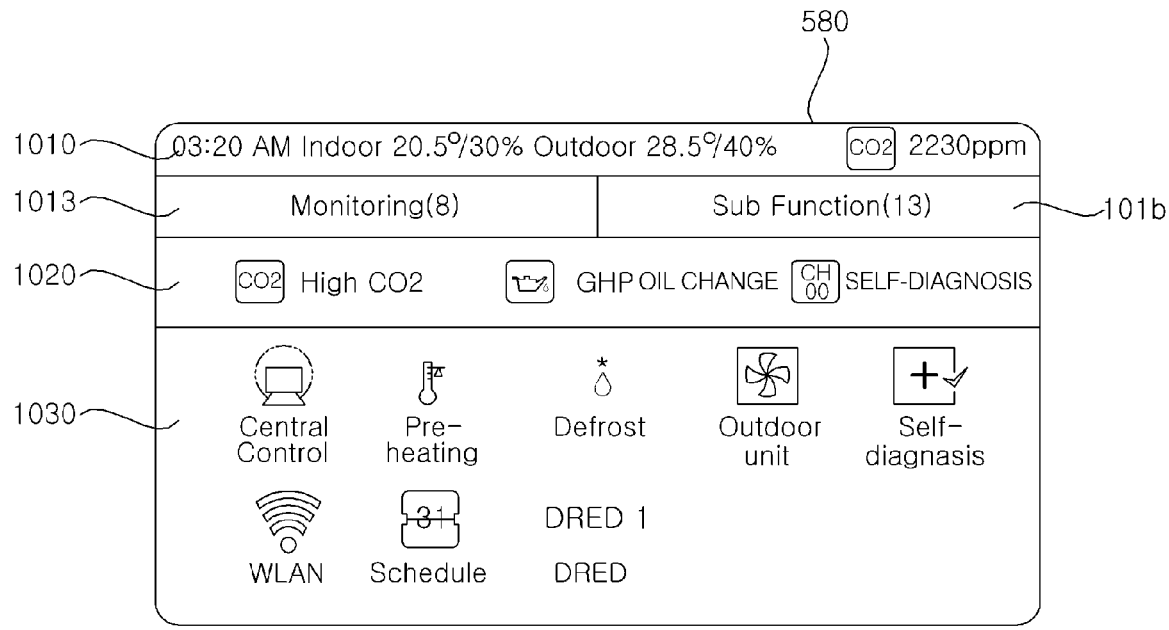
FIG. 10A illustrates a reference view of the input device in the operation mode.
Figure 10B:
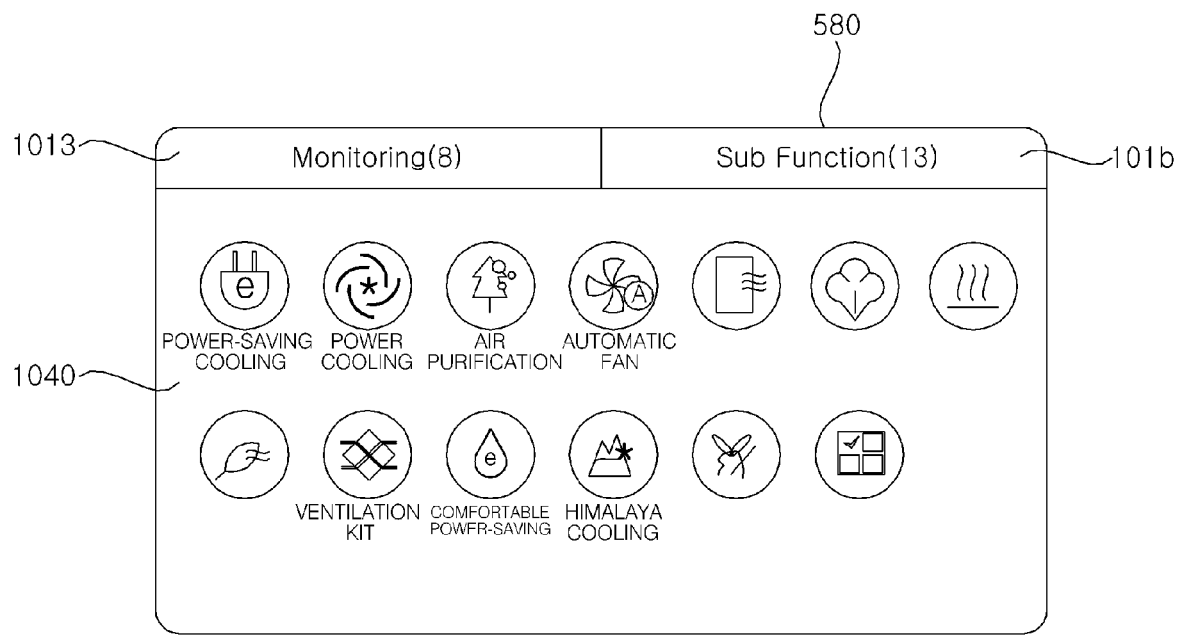
FIG. 10B illustrates another reference view of the input device in the operation mode.

FIGS. 10A and 10B illustrate embodiments of the setting screen displayed in the home screen.

FIG. 10A illustrates an embodiment of a monitoring setting screen displayed on the display unit 580. Referring to FIG. 10A, a monitoring setting item 1013 and a sub function setting item 101b may be displayed as a tab menu.

The monitoring setting screen may include, for example, a first setting region 1010, a second setting region 1020, and a third setting region 1030 (not limited to any particular number of setting regions).

For example, the first setting region 1010 may include, inter alia, time, temperature, and/or humidity information 1010. The second setting region 1020 may include, inter alia, a CO2 setting item, an oil change setting item, and/or a self-diagnosis setting item. The third setting region 1030 may include, inter alia, a central control item, a pre-heating item, a dehumidification item, an outdoor unit item, a self-diagnosis item, a wireless router item (i.e. an AP item), a schedule item, and/or a DRED1 item.

FIG. 10B illustrates an embodiment of a sub function setting screen displayed on the display unit 580.

For example, the sub function setting screen 1040 may include, inter alia, a power-saving cooling item, a power cooling item, an air purification item, an automatic FAN item, a ventilation kit item, a comfortable power-saving item, and/or a Himalaya cooling item.

Figure 11A:
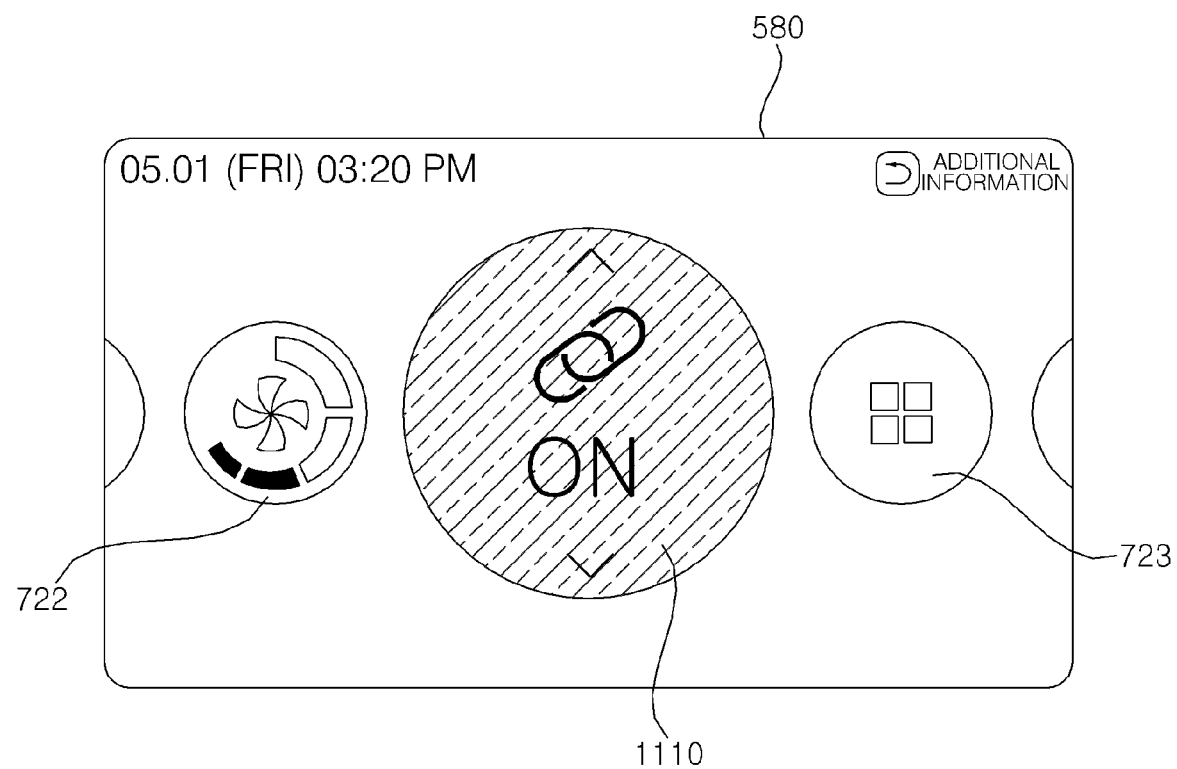
FIG. 11A illustrates a reference view of the input device in the operation mode.

FIG. 11A illustrates an external device setting item 1110 focused and displayed in the central region. As shown, a wind intensity item 722 may be displayed at the left side, and a menu item 7230 may be displayed at the right side (not limited to this particular arrangement).

The external device setting item 1110 may be an item for setting or controlling the operation of various kinds of devices, such as, inter alia, a motor, a lighting device, a fan, a heater, and/or a pump. That is, it is possible to set on/off of various kinds of external devices.

Meanwhile, the controller 570 may perform control such that the external device setting item 1110 is displayed in green (or another color/visual cue) to indicate that an external device has been turned on such that the external device setting item 1110 is distinguishable from the other items. Consequently, the user may intuitively recognize contents related to the external device setting.

Meanwhile, in the case in which the external device setting item 1110 is displayed in green (or another color/visual cue), the controller 570 may perform control such that a signal indicating that the external device has been turned on is output to the outside through the communication unit 520 or the interface unit 530.

Meanwhile, in the case in which the external device setting item 1110 is touched by user touch input, the controller 570 may perform control such that off setting of the external device is executed.

Figure 11B:
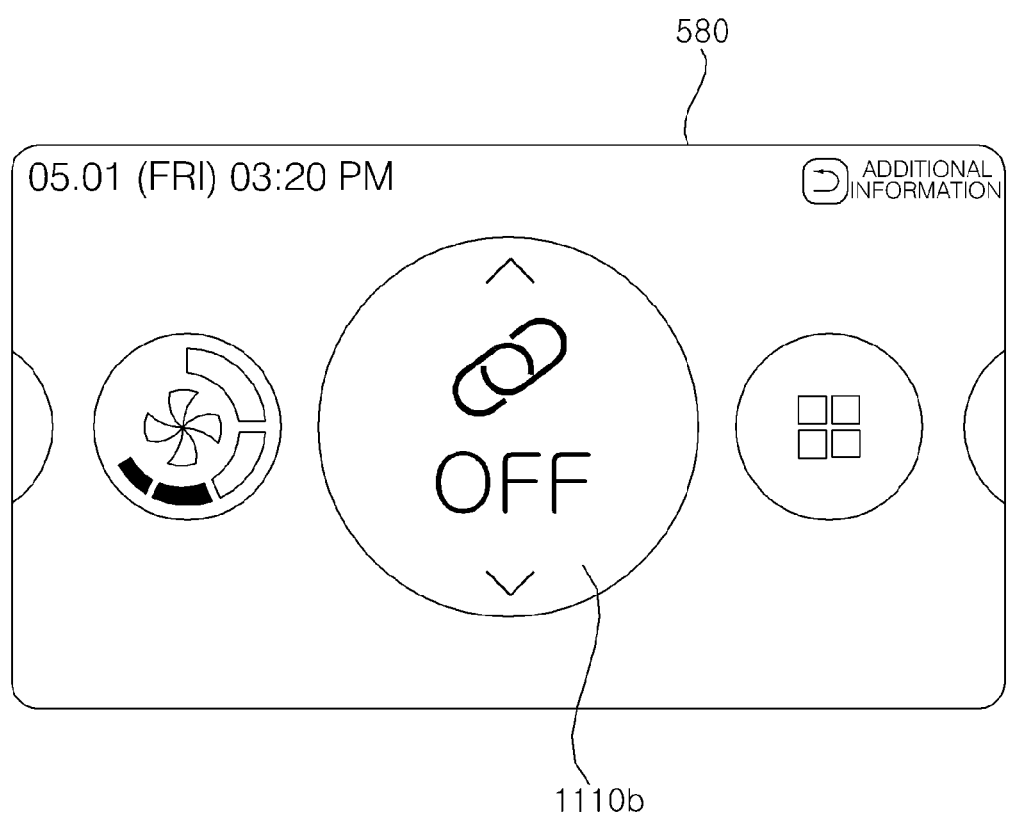
FIG. 11B illustrates another reference view of the input device in the operation mode.

Consequently, the controller 570 may perform control such that the external device setting item, which has been displayed in green (or another color/visual cue), is displayed in black (or another color/visual cue), such as shown in FIG. 11B.

FIG. 11B illustrates the external device setting item 1110 displayed in a different color, such as black, to indicate off setting of the external device.

Meanwhile, in the case in which the external device setting item 1110 is touched once more by user touch input, the controller 570 may perform control such that automatic mode setting of the external device is executed.

Figure 11C:
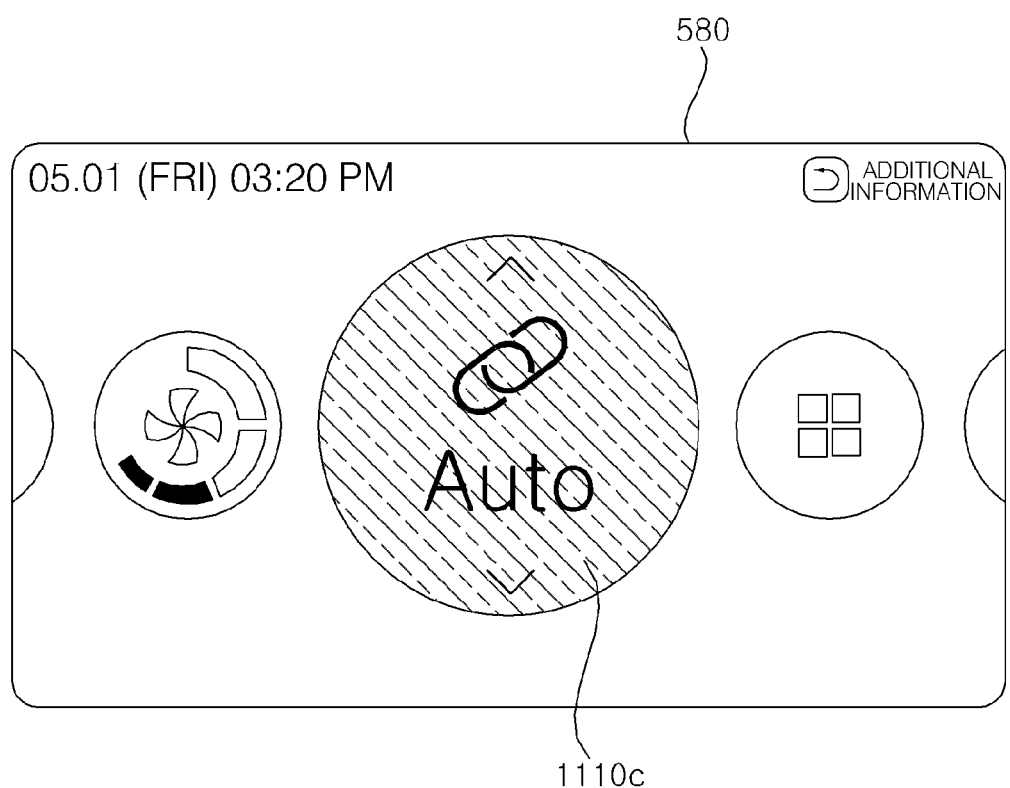
FIG. 11C illustrates another reference view of the input device in the operation mode.

Consequently, the controller 570 may perform control such that the external device setting item, which has been displayed in black (or another color/visual cue), is displayed in violet (or another color/visual cue), such as shown in FIG. 11C.

FIG. 11C illustrates an embodiment of an external device setting item 1110c displayed in a different color, such as violet, to indicate automatic mode setting of the external device.

FIGS. 12A to 12E are reference views illustrating schedule addition through the input device 40 according to embodiments of the present disclosure.

Figure 12A:
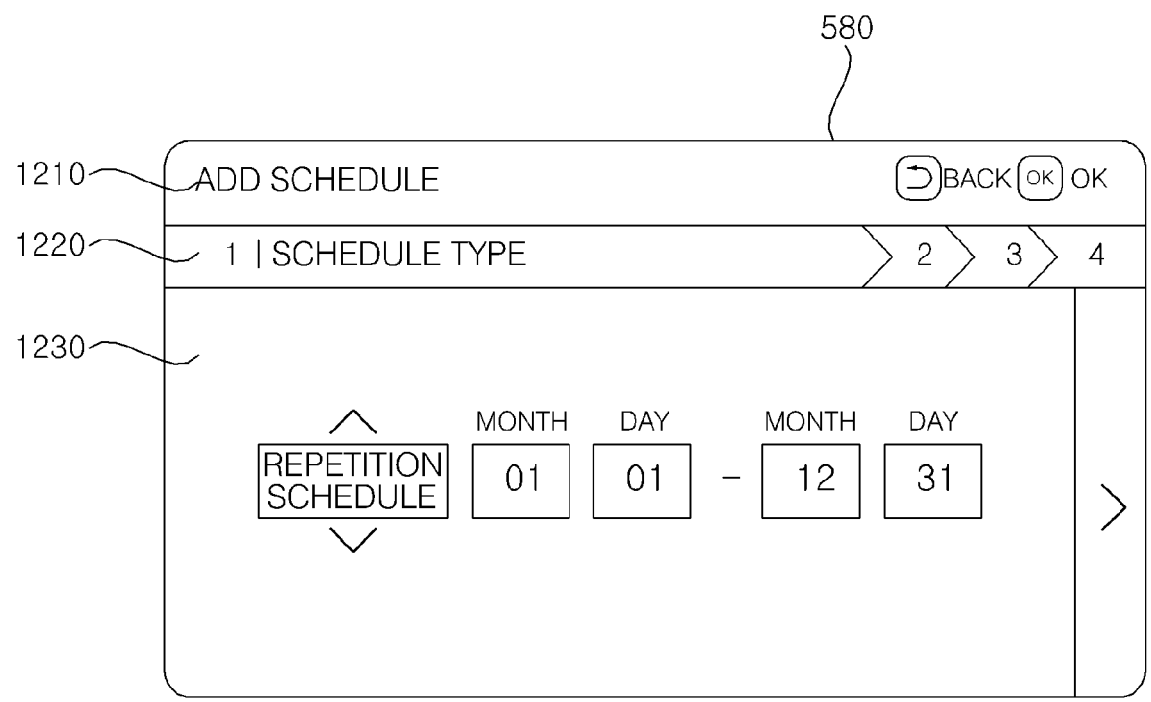
FIG. 12A illustrates a reference view of the input device in the operation mode.

FIG. 12A illustrates an embodiment of a schedule addition screen 1210.

As shown in FIG. 12A, when a schedule item, which is a sub-menu item of the menu item, is selected after the menu item in the home screen is selected, the controller 570 may perform control such that the schedule addition screen 1210 is displayed.

The schedule addition screen 1210 may include, inter alia, a schedule type item 1220 and/or a schedule input item 1230 for inputting a schedule mode and schedule time.

For example, in FIG. 12A, a repetition schedule item is displayed as the schedule type item.

Figure 12B:
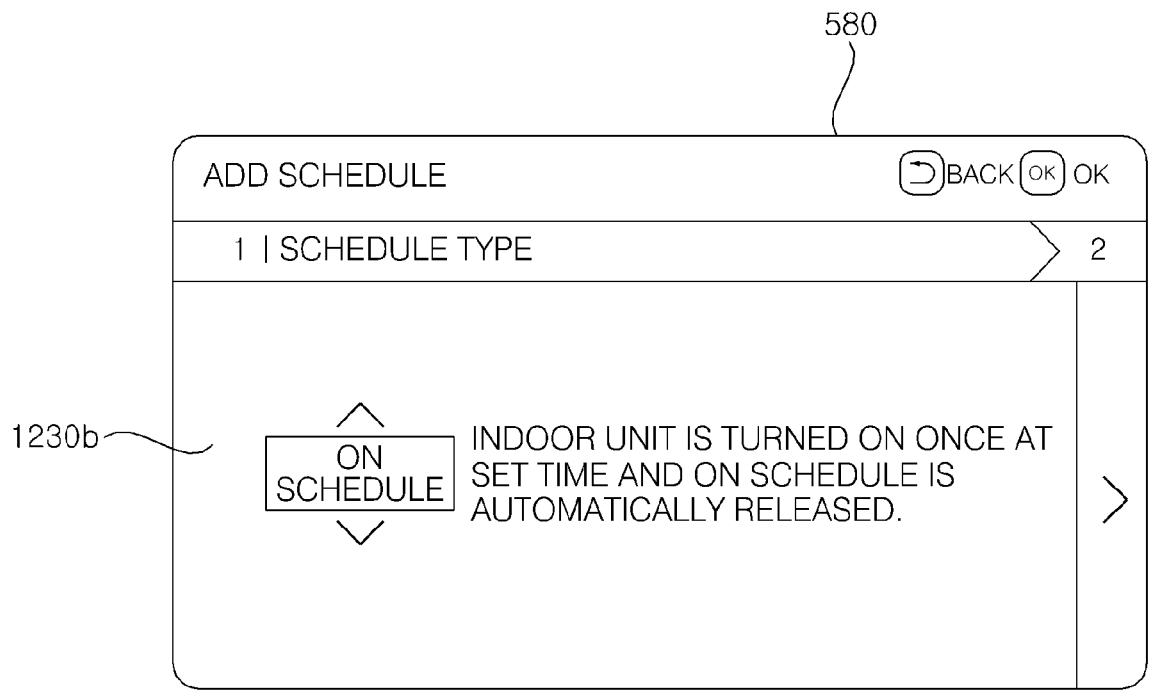
FIG. 12B illustrates another reference view of the input device in the operation mode.

The repetition schedule item may be changed to an "on schedule item," as shown in FIG. 12BC, by upward, downward, or sweep input.

FIG. 12B illustrates an embodiment of an "on schedule" input screen 1230b.

Figure 12C:
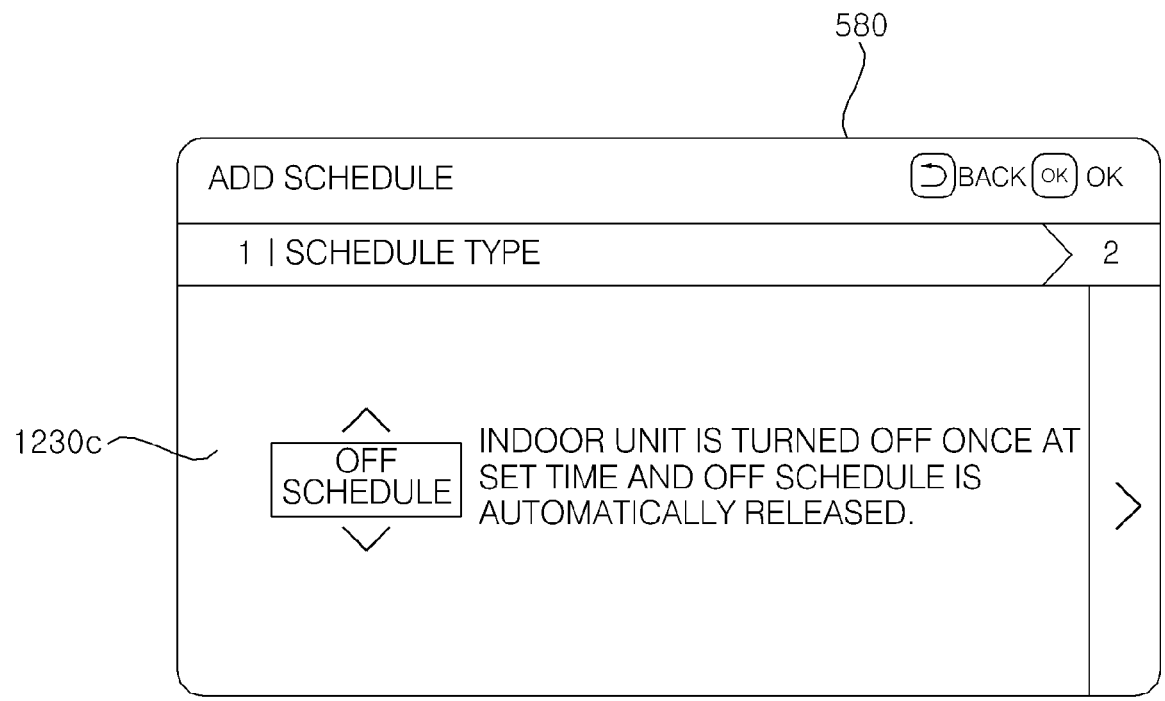
FIG. 12C illustrates another reference view of the input device in the operation mode.

A change to an "off schedule" item may be performed, such as shown in FIG. 12C, by upward, downward, or sweep input.

FIG. 12C illustrates an embodiment of an "off schedule" input screen 1230c.

Figure 12D:
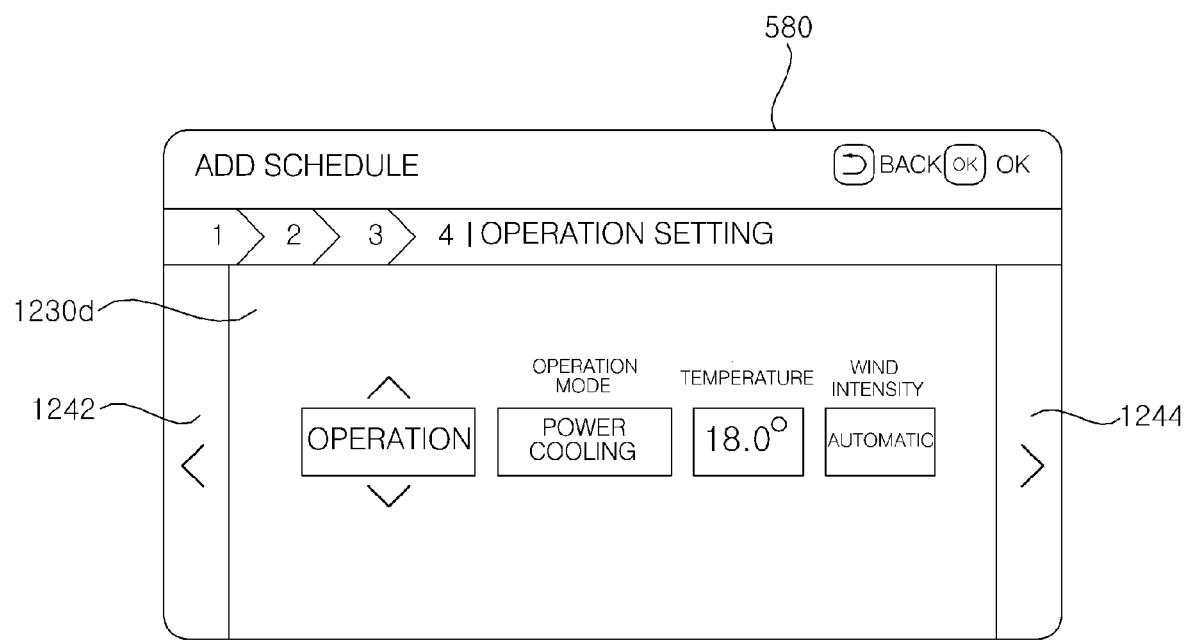
FIG. 12D illustrates another reference view of the input device in the operation mode.

A change to an operation schedule item may be performed, such as shown in FIG. 12D, by upward, downward, or sweep input.

FIG. 12D illustrates an embodiment of an operation schedule input screen 1230d.

For example, the operation schedule input screen 1230d may include, inter alia, an operation mode item, a temperature item, and/or a wind intensity item.

Figure 12E:
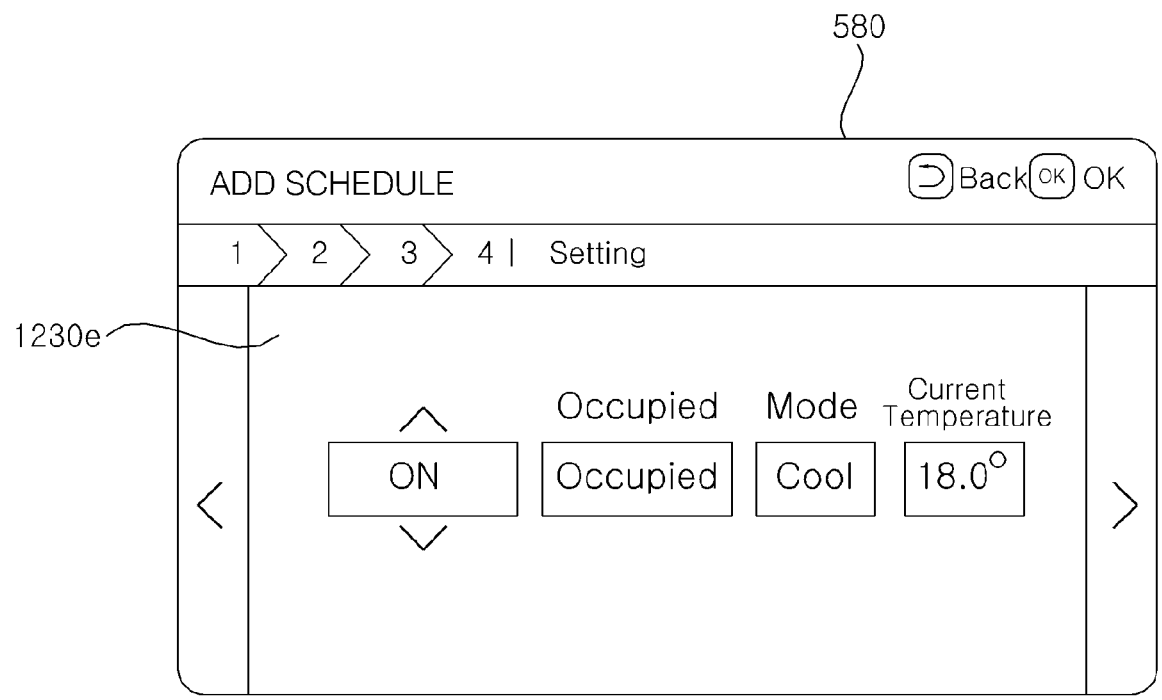
FIG. 12E illustrates another reference view of the input device in the operation mode.

Moreover, the operation schedule input screen may be displayed differently for different languages. For example, when the language used in the input device 40 is set to "English," rather than "Korean," the controller 570 may perform control such that an operation schedule input screen 1230e is displayed, such as shown in FIG. 12E.

FIGS. 13A to 13F illustrate various operation mode items displayed on the touchscreen-type display unit 580 according to embodiments of the present disclosure.

Figure 13A:
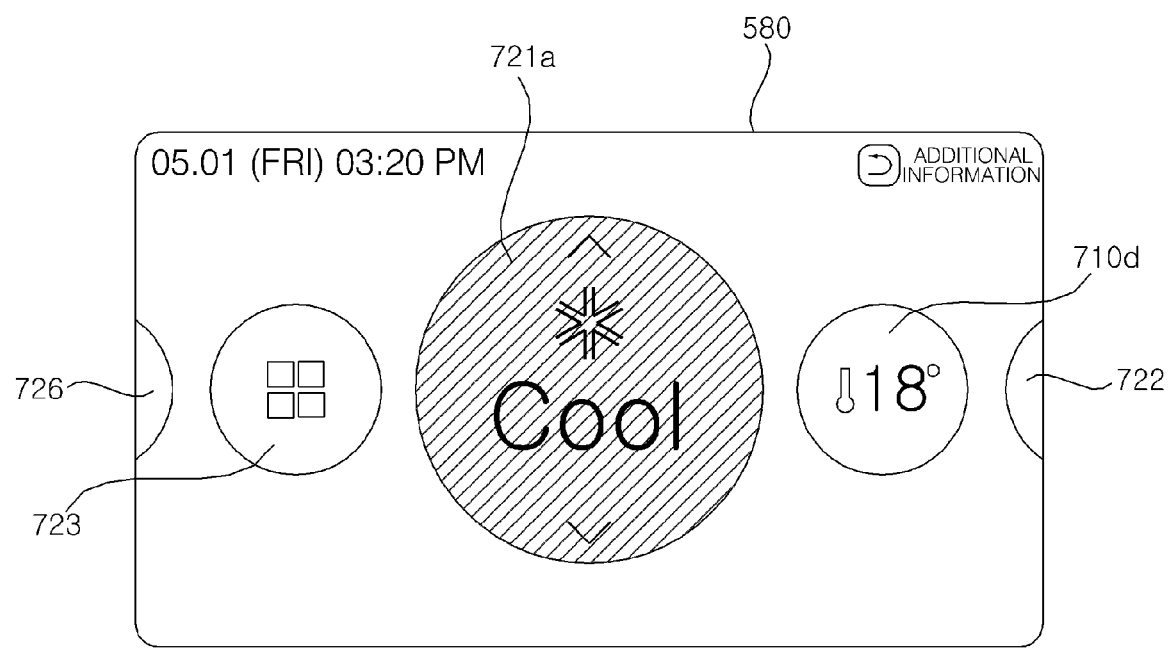
FIG. 13A illustrates a reference view of the input device in the operation mode.
Figure 13B:
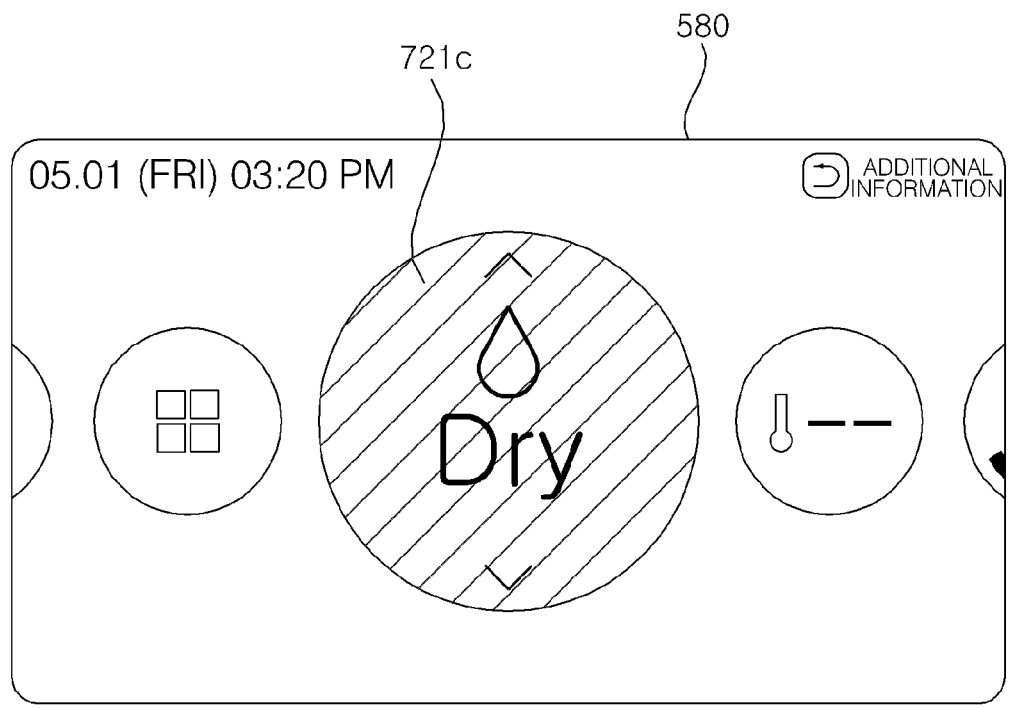
FIG. 13B illustrates another reference view of the input device in the operation mode.
Figure 13C:
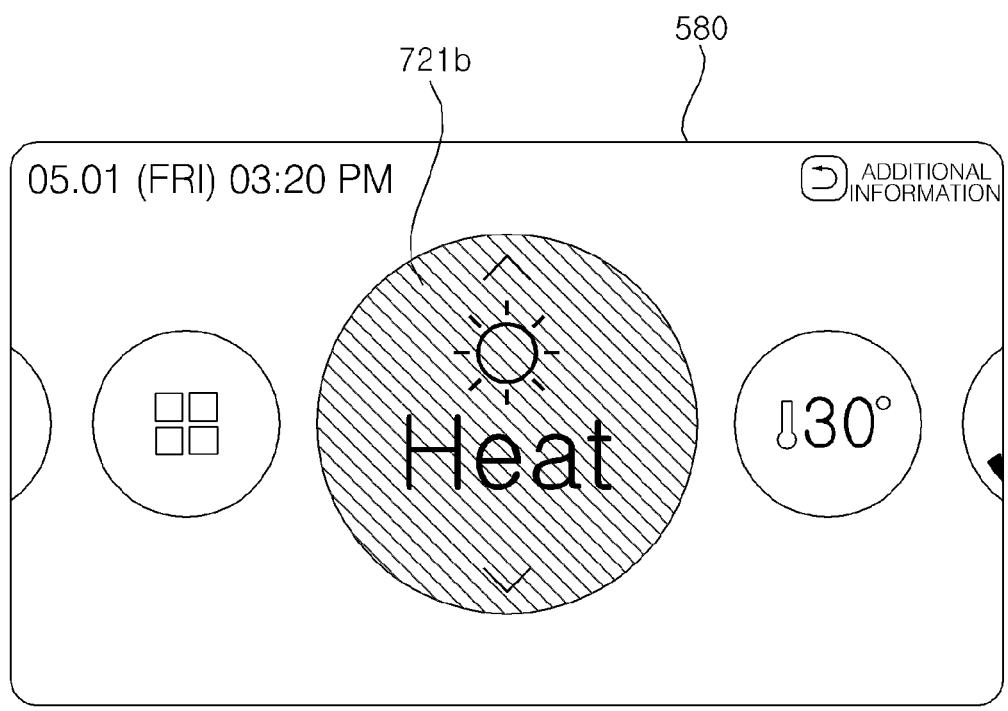
FIG. 13C illustrates another reference view of the input device in the operation mode.
Figure 13D:
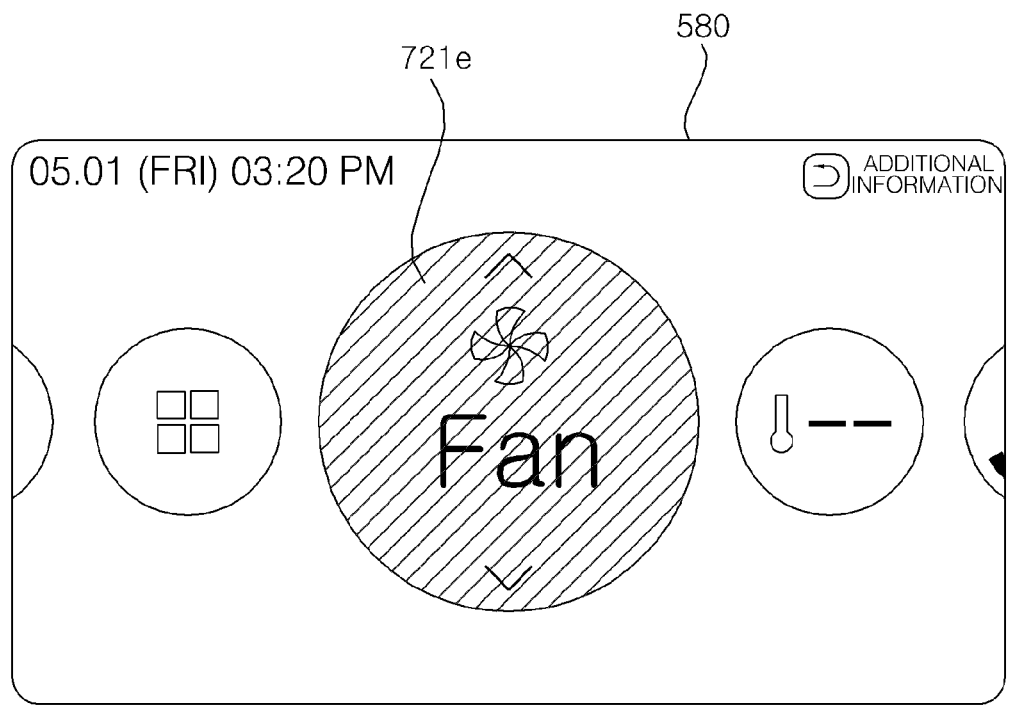
FIG. 13D illustrates another reference view of the input device in the operation mode.
Figure 13E:
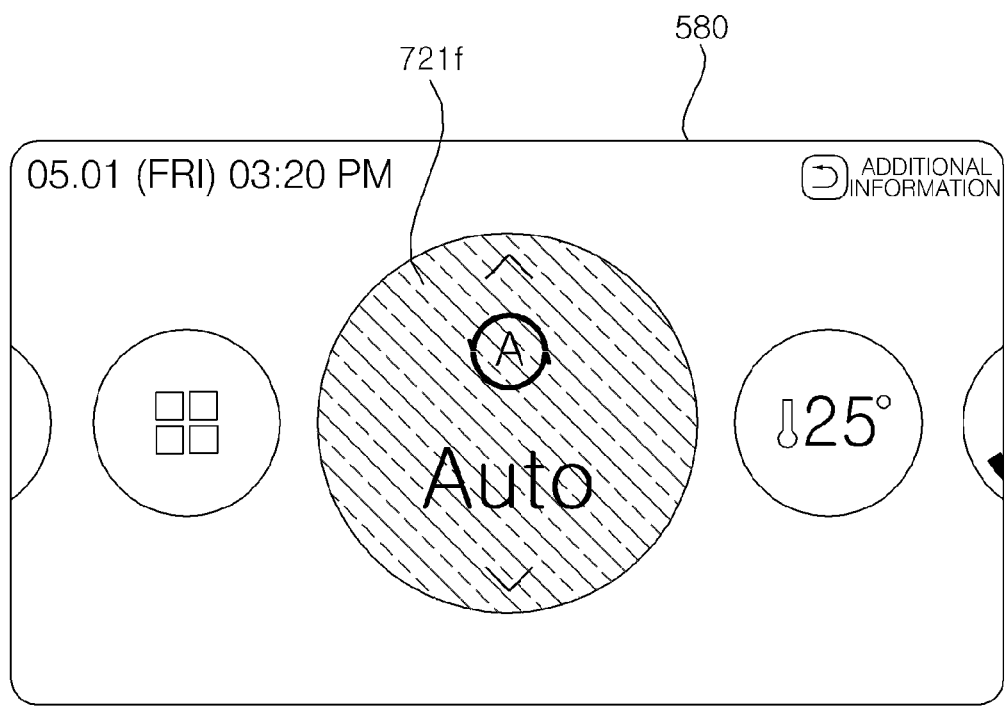
FIG. 13E illustrates another reference view of the input device in the operation mode.
Figure 13F:
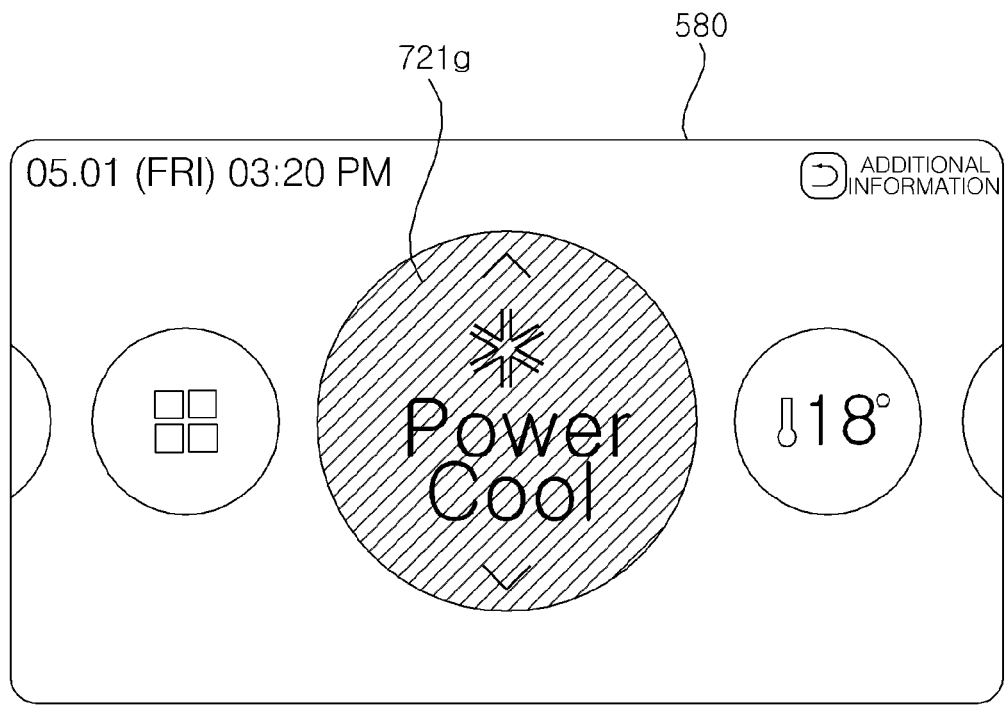
FIG. 13F illustrates another reference view of the input device in the operation mode.

For example, as shown in FIG. 13A, when a cooling mode is selected in the state in which the operation mode setting item in the home screen is focused, the controller 570 may perform control so that a blue operation mode setting item 721a (or another color/visual cue) is displayed. For example, in the case in which a dehumidification mode is selected, the controller 570 may perform control so that a green operation mode setting item 721c (or another color/visual cue) is displayed, such as shown in FIG. 13B. For example, in the case in which a heating mode is selected, the controller 570 may perform control such that an orange operation mode setting item 721b (or another color/visual cue) is displayed, such as shown in FIG. 13C. For example, in the case in which a ventilation mode is selected, the controller 570 may perform control such that a yellowish green operation mode setting item 721e (or another color/visual cue) is displayed, such as shown in FIG. 13D. For example, in the case in which an automatic mode is selected, the controller 570 may perform control such that a violet operation mode setting item 721f (or another color/visual cue) is displayed, such as shown in FIG. 13E. For example, in the case in which a power cooling mode is selected, the controller 570 may perform control such that a deep blue operation mode setting item 721g (or another color/visual cue) is displayed.

Figure 14A:
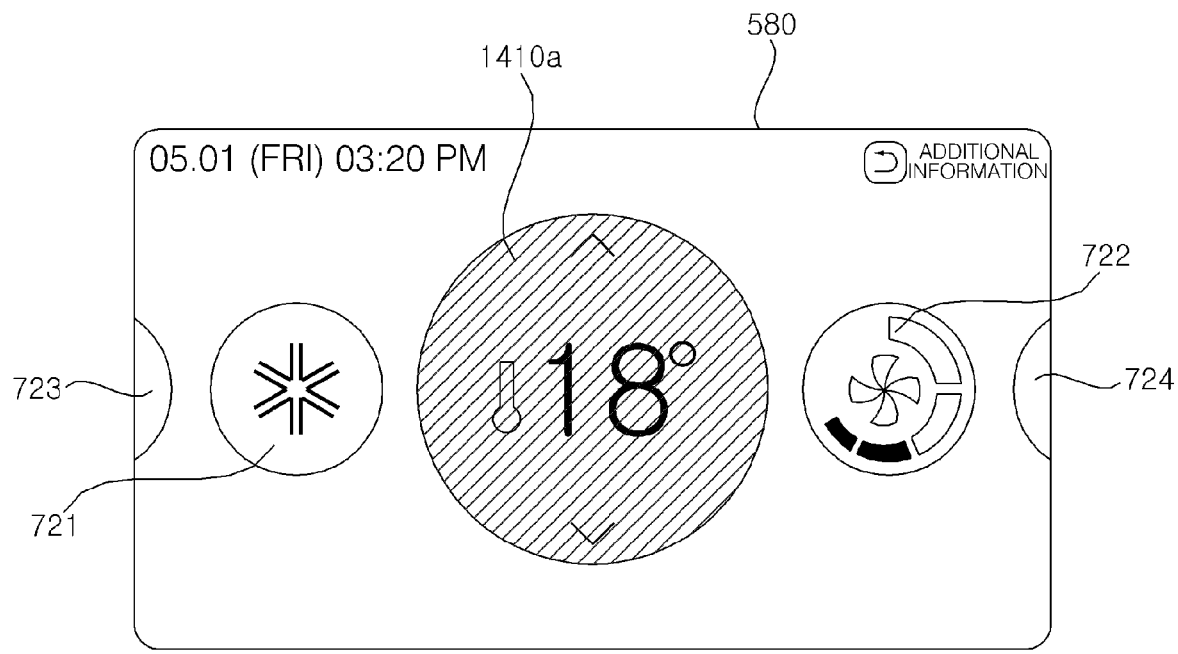
FIG. 14A illustrates a reference view of the input device in the operation mode.
Figure 14B:
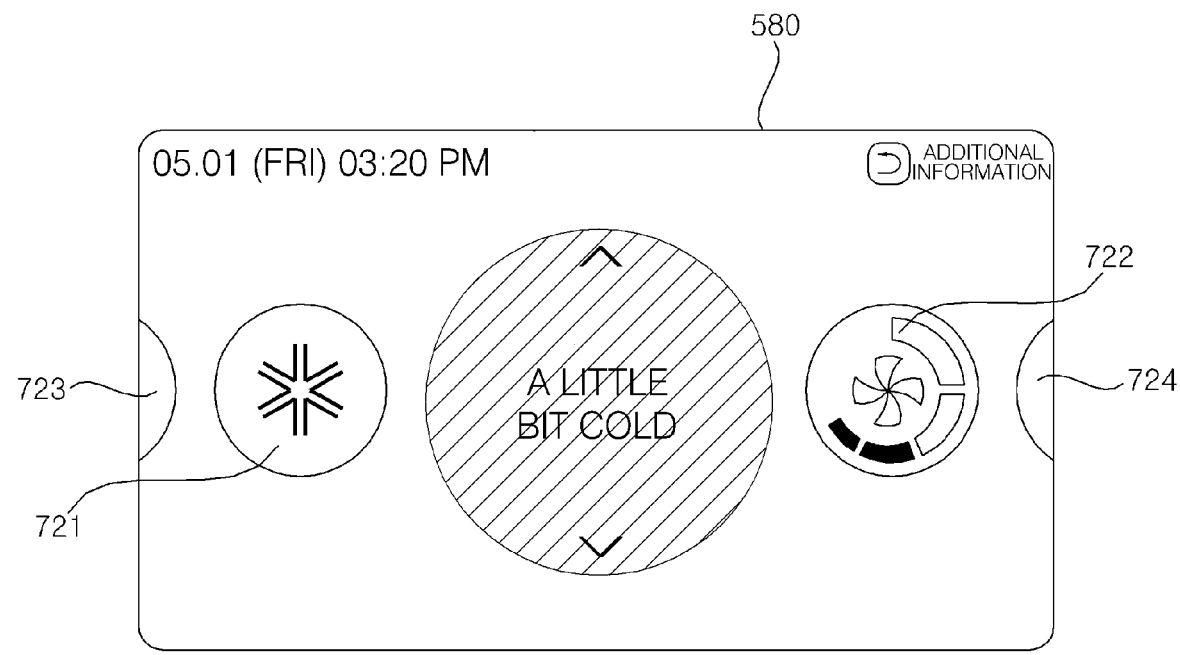
FIG. 14B illustrates another reference view of the input device in the operation mode.

FIGS. 14A and 14B illustrate various temperature setting items displayed on the touchscreen-type display unit 580 according to embodiments of the present disclosure.

For example, in the case in which a manual temperature setting mode is selected in the state in which the temperature setting item in the home screen is focused, the controller 570 may perform control such that set temperature information is displayed in a blue operation mode setting item 1410a (or another color/visual cue), such as shown in FIG. 14A.

For example, in the case in which an automatic temperature setting mode is selected, the controller 570 may perform control such that text "a little bit cold" (or text having a similar meaning) is displayed in a blue operation mode setting item 1410b (or another color/visual cue), such as shown in FIG. 14B.

Figure 15A:
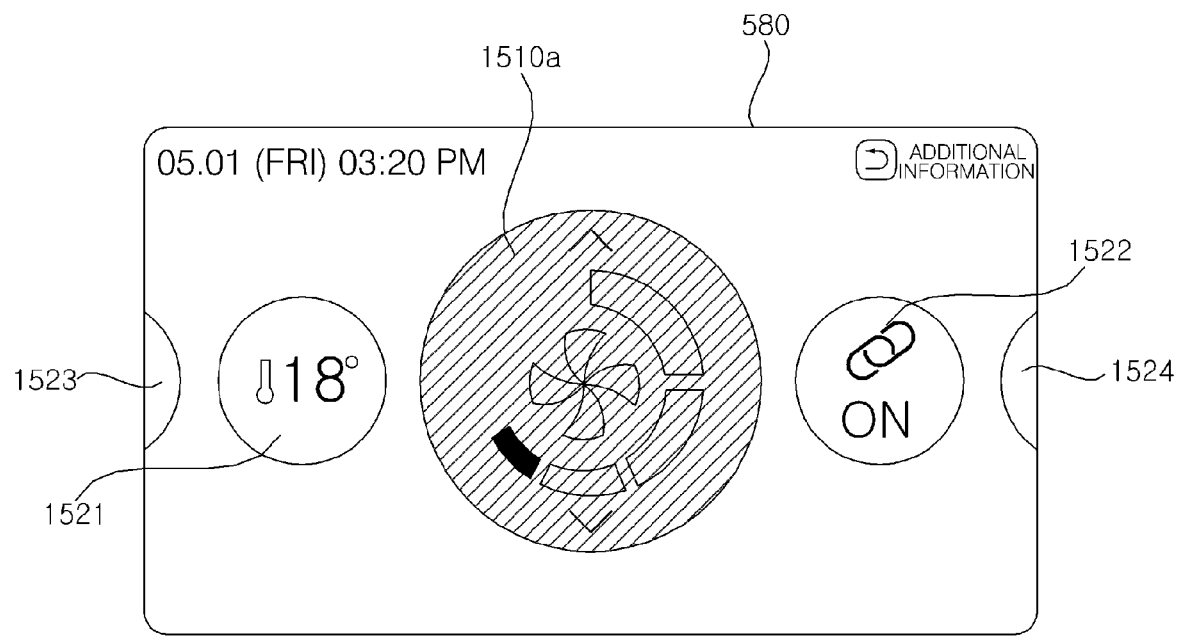
FIG. 15A illustrates a reference view of the input device in the operation mode.
Figure 15B:
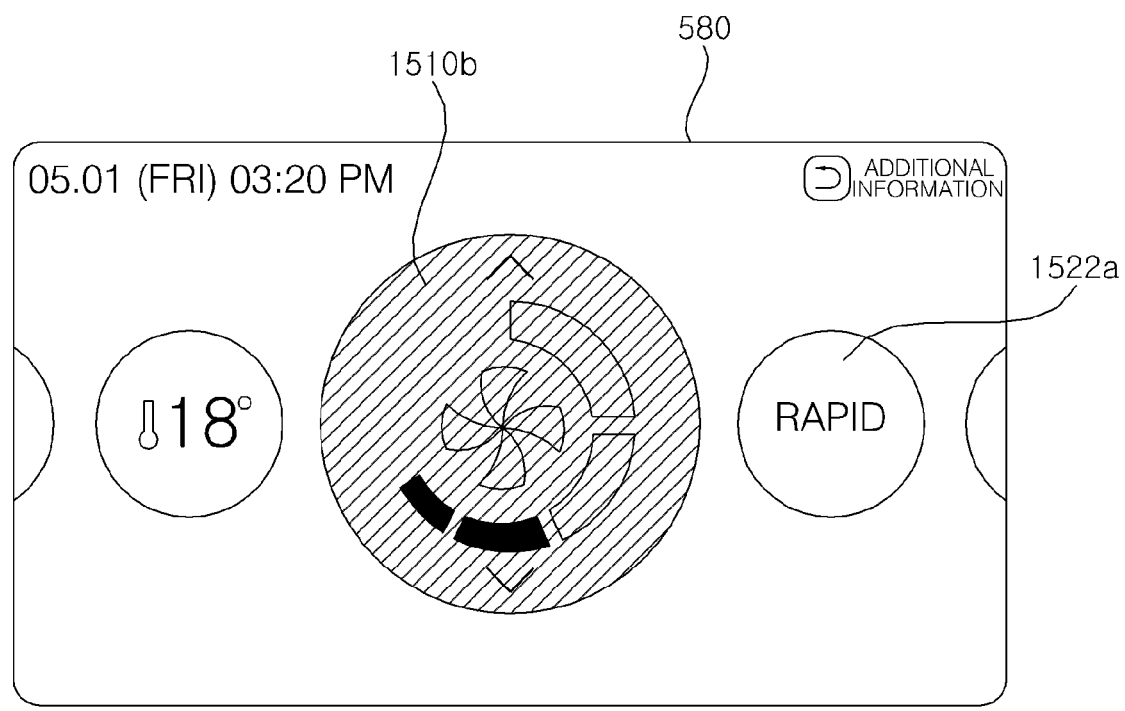
FIG. 15B illustrates another reference view of the input device in the operation mode.

FIGS. 15A and 15B illustrate various wind intensity setting items displayed on the touchscreen-type display unit 580 according to embodiments of the present disclosure.

For example, in the case in which first level wind intensity is set in the state in which the wind intensity setting item in the home screen is focused, the controller 570 may perform control such that an object corresponding to the first level wind intensity is displayed in a blue wind intensity setting item 1510a (or another color/visual cue), such as shown in FIG. 15A.

For example, in the case in which second level wind intensity, which is larger than the first level wind intensity, is set, the controller 570 may perform control such that an object corresponding to the second level wind intensity is displayed in a blue wind intensity setting item 1510b (or another color/visual cue), such as shown in FIG. 15B.

Meanwhile, the icon items in the home screen may further include a presence-in-room item (i.e. a home-back item) and/or a locking item, in addition to the temperature setting item, the operation mode setting item, the wind intensity setting item, and/or the menu item.

Figure 16A:
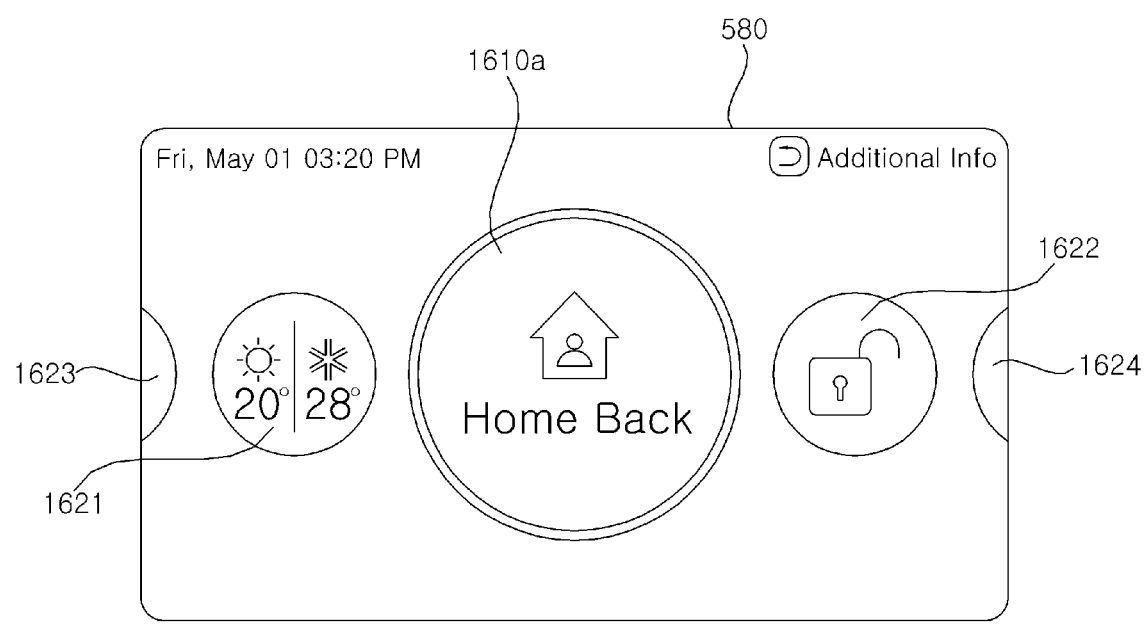
FIG. 16A illustrates a reference view of the input device in the operation mode.
Figure 16B:
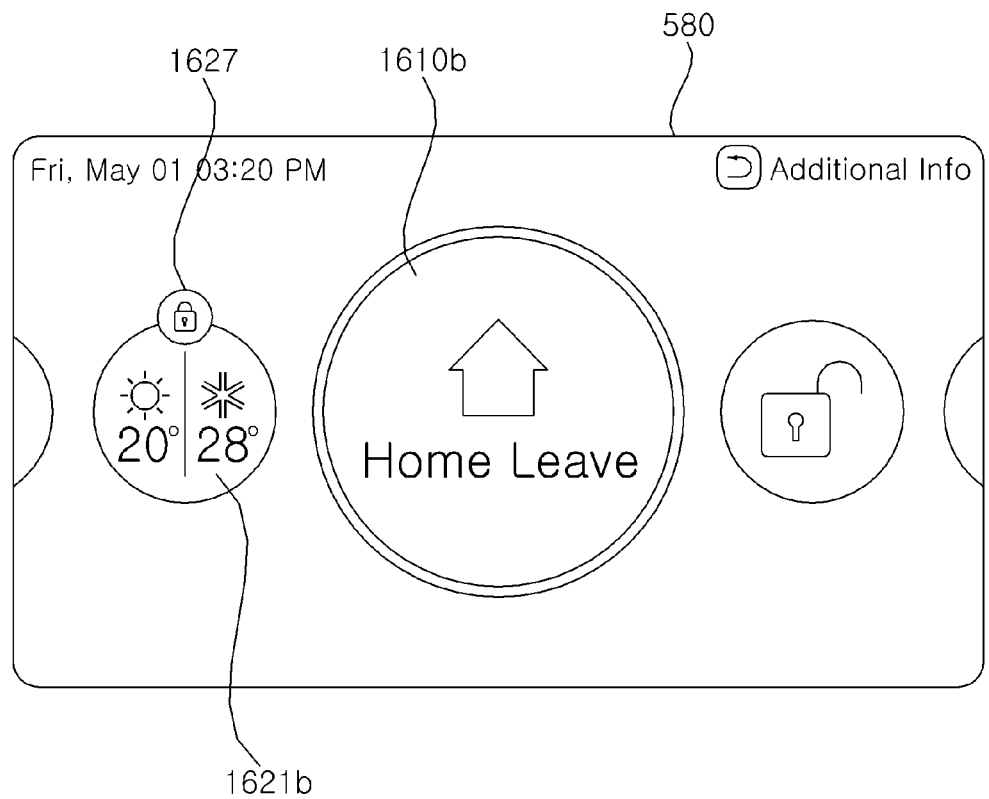
FIG. 16B illustrates another reference view of the input device in the operation mode.

FIGS. 16A and 16B illustrate various presence-in-room setting items displayed on the touchscreen-type display unit 580 according to embodiments of the present disclosure.

For example, in the case in which setting is made corresponding to the presence of occupants in room in the state in which the presence-in-room setting item in the home screen is focused, the controller 570 may perform control such that a black presence-in-room setting item 1610a (or another color/visual cue) is displayed, such as shown in FIG. 16A.

For example, in the case in which setting is made corresponding to the absence of occupants in room (i.e. home leave), the controller 570 may perform control such that a black absence-in-room setting item 1610b (or another color/visual cue) is displayed, such as shown in FIG. 16B.

Figure 17A:
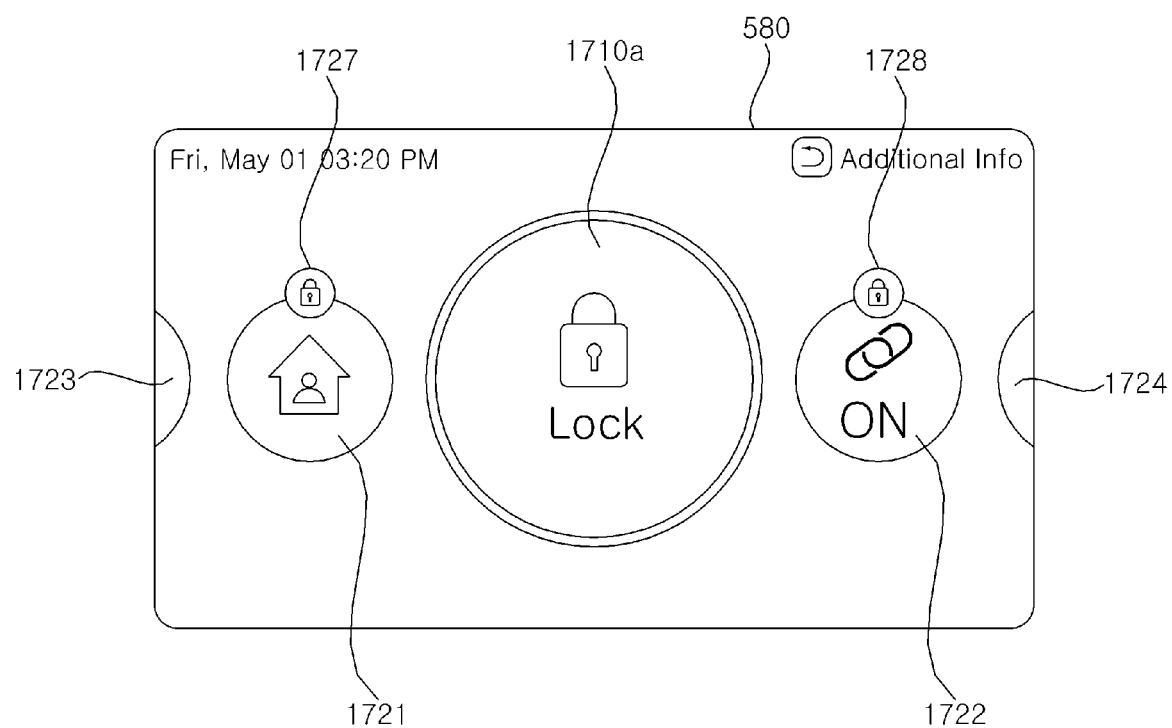
FIG. 17A illustrates a reference view of the input device in the operation mode.
Figure 17B:
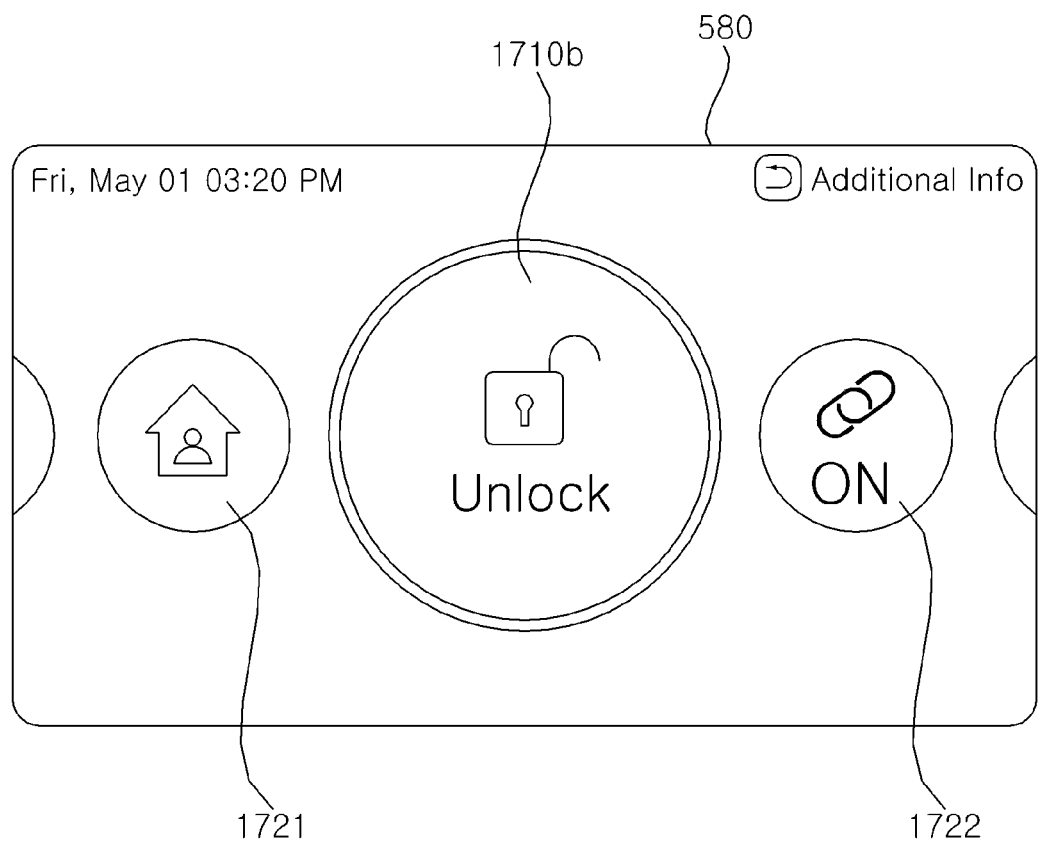
FIG. 17B illustrates another reference view of the input device in the operation mode.
Figure 17C:
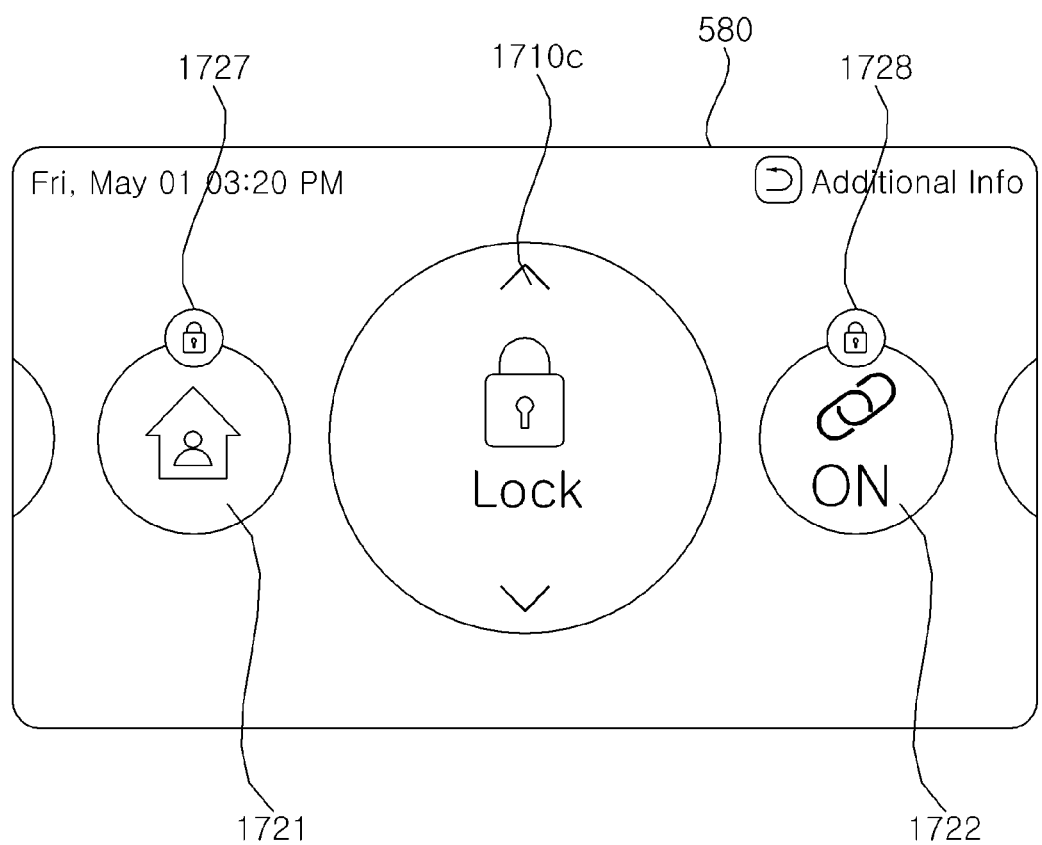
FIG. 17C illustrates another reference view of the input device in the operation mode.
Figure 17D:
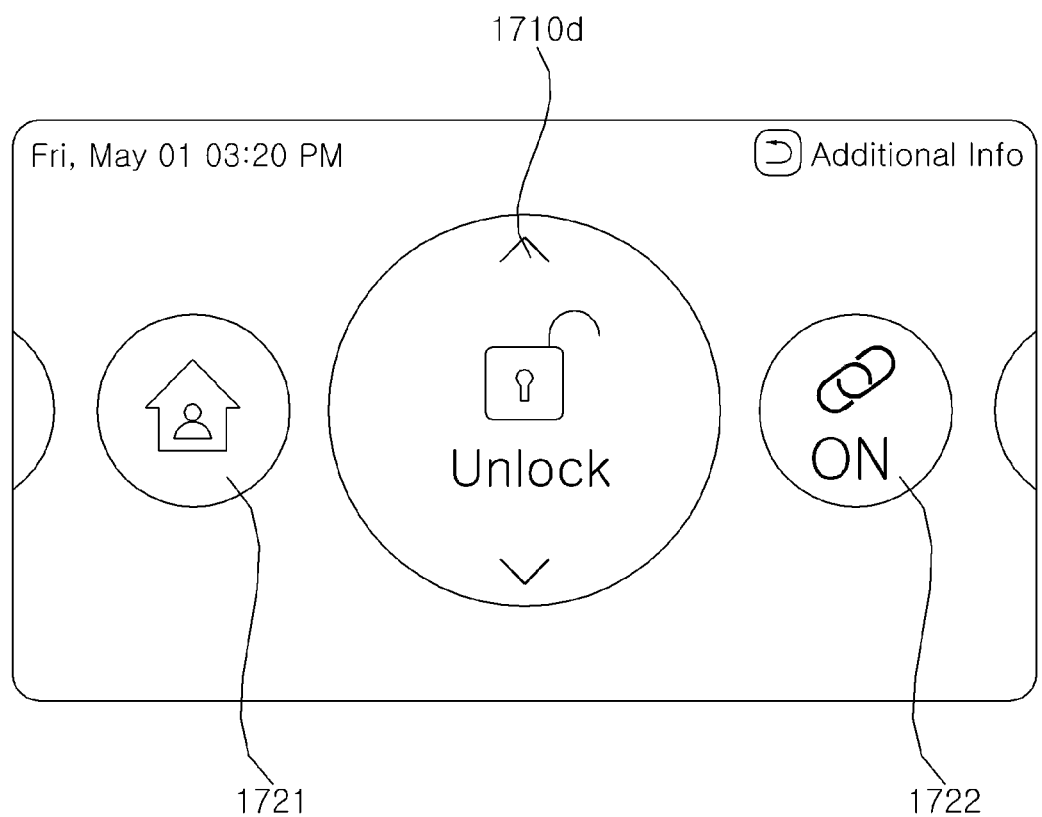
FIG. 17D illustrates another reference view of the input device in the operation mode.

FIGS. 17A and 17B illustrate various locking setting items displayed on the touchscreen-type display unit 580 according to embodiments of the present disclosure.

For example, in the case in which lock is set in the state in which the lock setting item in the home screen is focused, the controller 570 may perform control such that a black lock setting item 1710a (or another color/visual cue) is displayed, such as shown in FIG. 17A.

For example, in the case in which unlock is set, the controller 570 may perform control such that a black unlock setting item 1710b (or another color/visual cue) is displayed, such as shown in FIG. 17B.

FIGS. 18A to 18F illustrate various sub-menu items displayed on the touchscreen-type display unit 580 according to embodiments of the present disclosure.

Figure 18A:
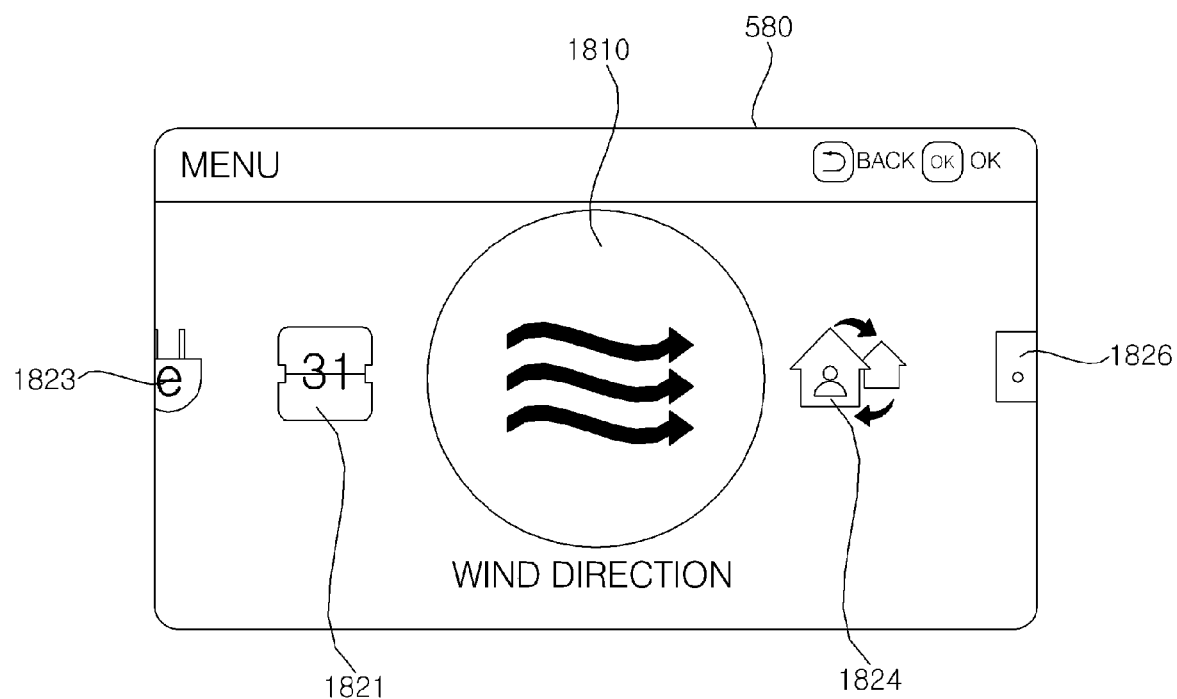
FIG. 18A illustrates a reference view of the input device in the operation mode.

For example, in the case in which a wind direction item is focused after the menu item is selected, the controller 570 may perform control such that a wind direction item 1810 is focused and displayed, such as shown in FIG. 18A.

Figure 18B:
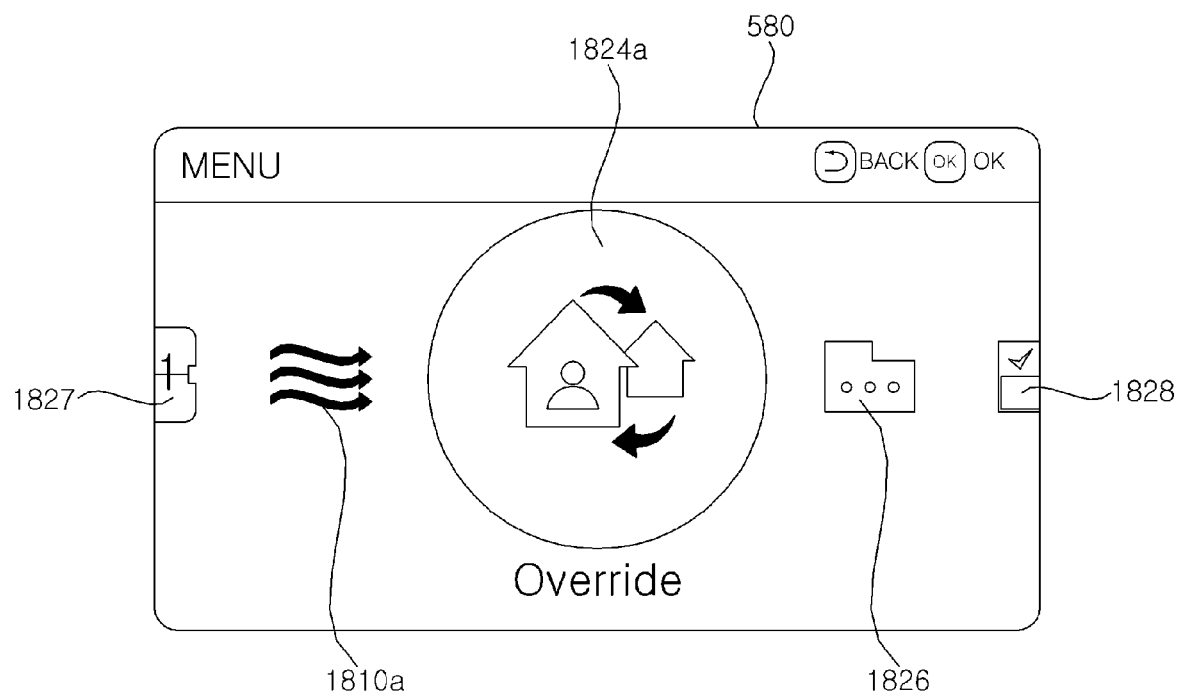
FIG. 18B illustrates another reference view of the input device in the operation mode.

For example, in the case in which an override item is focused, the controller 570 may perform control such that an override item 1824a is focused and displayed, such as shown in FIG. 18B.

Figure 18C:
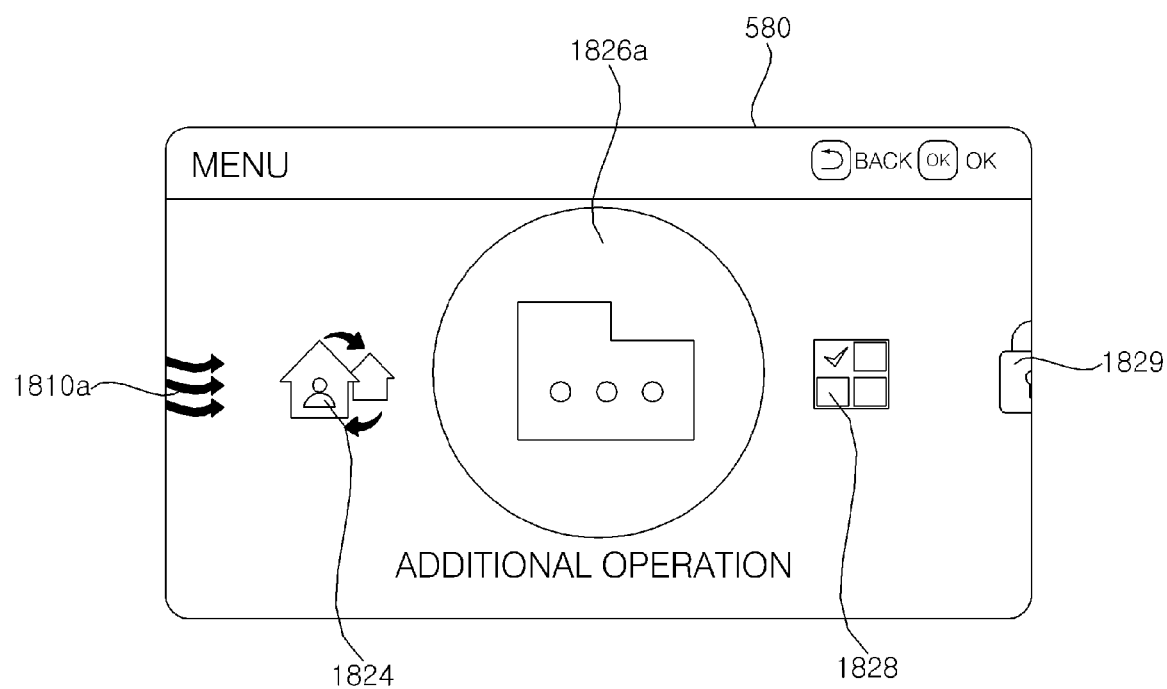
FIG. 18C illustrates another reference view of the input device in the operation mode.

For example, in the case in which an additional operation item is focused, the controller 570 may perform control such that an additional operation item 1826a is focused and displayed, such as shown in FIG. 18C.

Figure 18D:
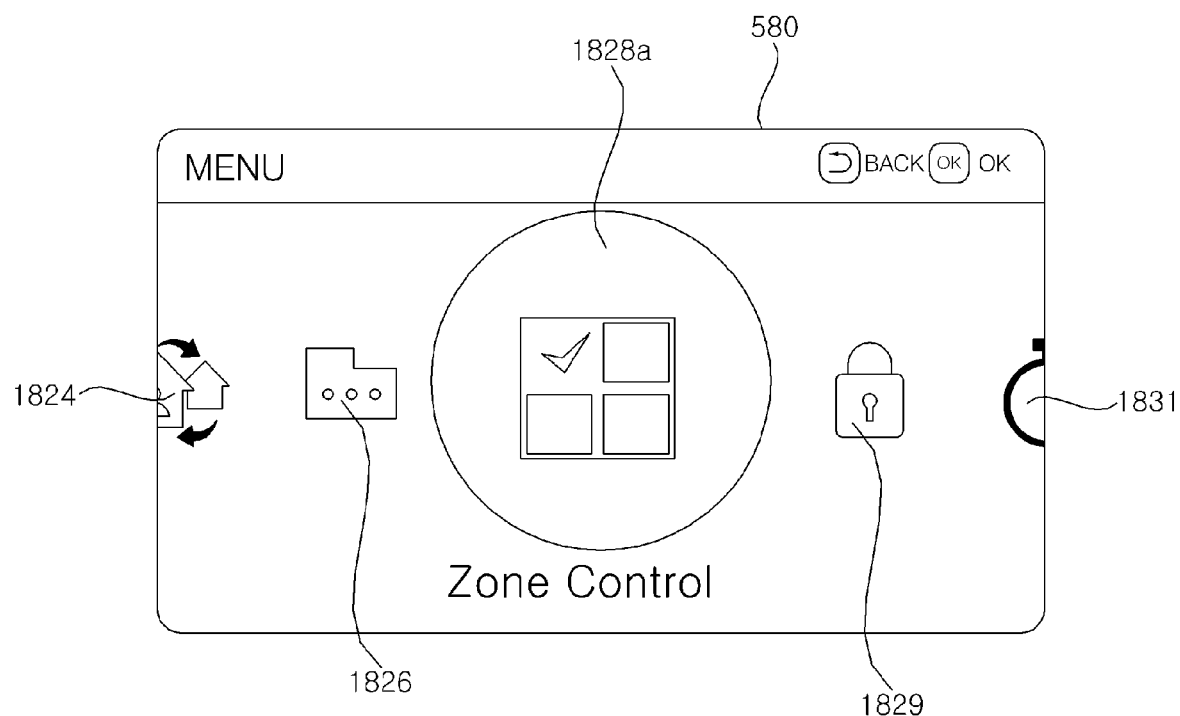
FIG. 18D illustrates another reference view of the input device in the operation mode.

For example, in the case in which a zone control item is focused, the controller 570 may perform control such that a zone control item 1828a is focused and displayed, such as shown in FIG. 18D.

Figure 18E:
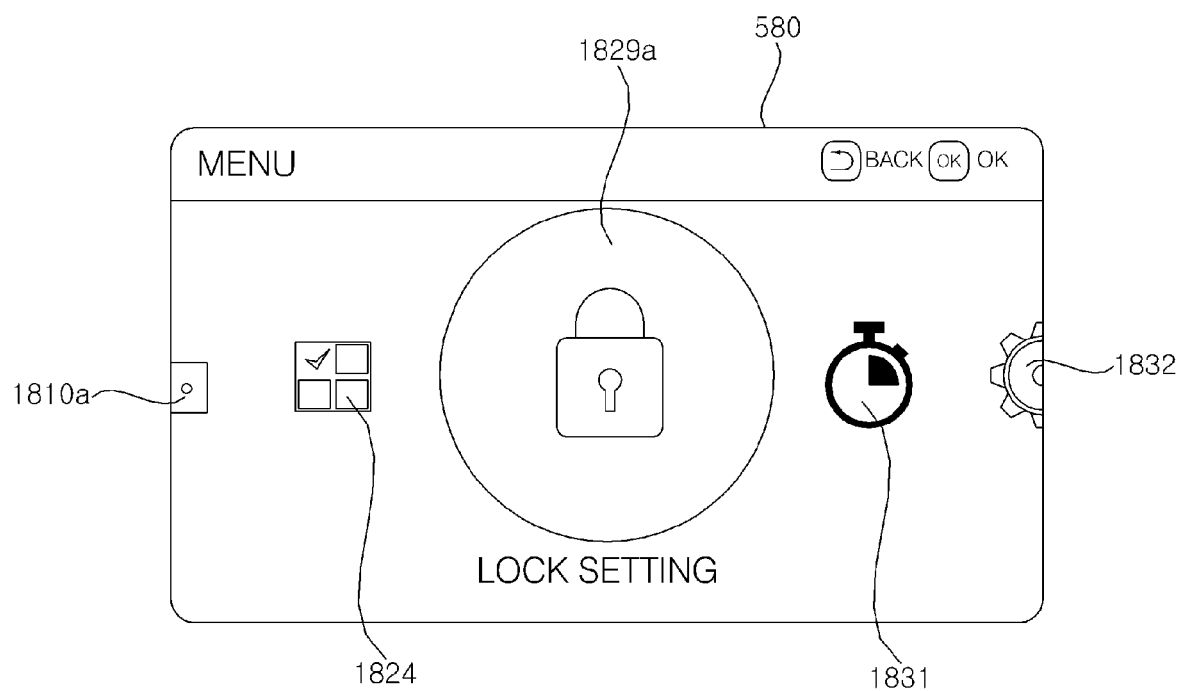
FIG. 18E illustrates another reference view of the input device in the operation mode.

For example, in the case in which a lock setting item is focused, the controller 570 may perform control such that a lock setting item 1829a is focused and displayed, such as shown in FIG. 18E.

Figure 18F:
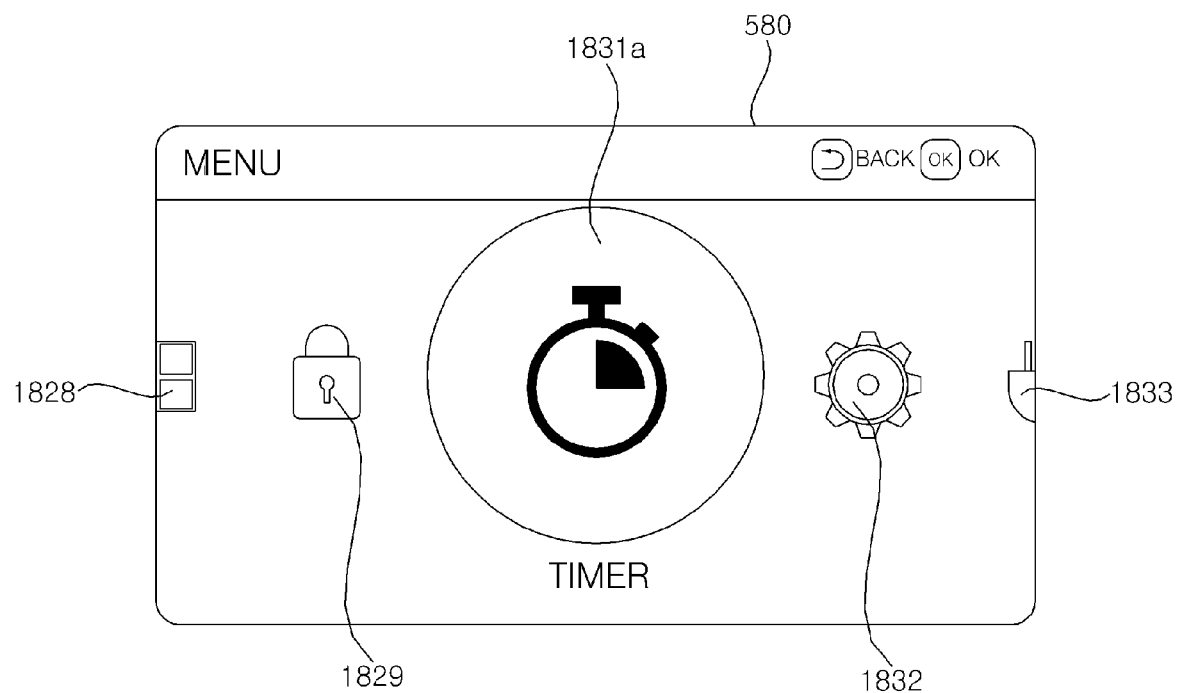
FIG. 18F illustrates another reference view of the input device in the operation mode.

For example, in the case in which a timer item is focused, the controller 570 may perform control such that a timer item 1831a is focused and displayed, such as shown in FIG. 18F.

Figure 19A:
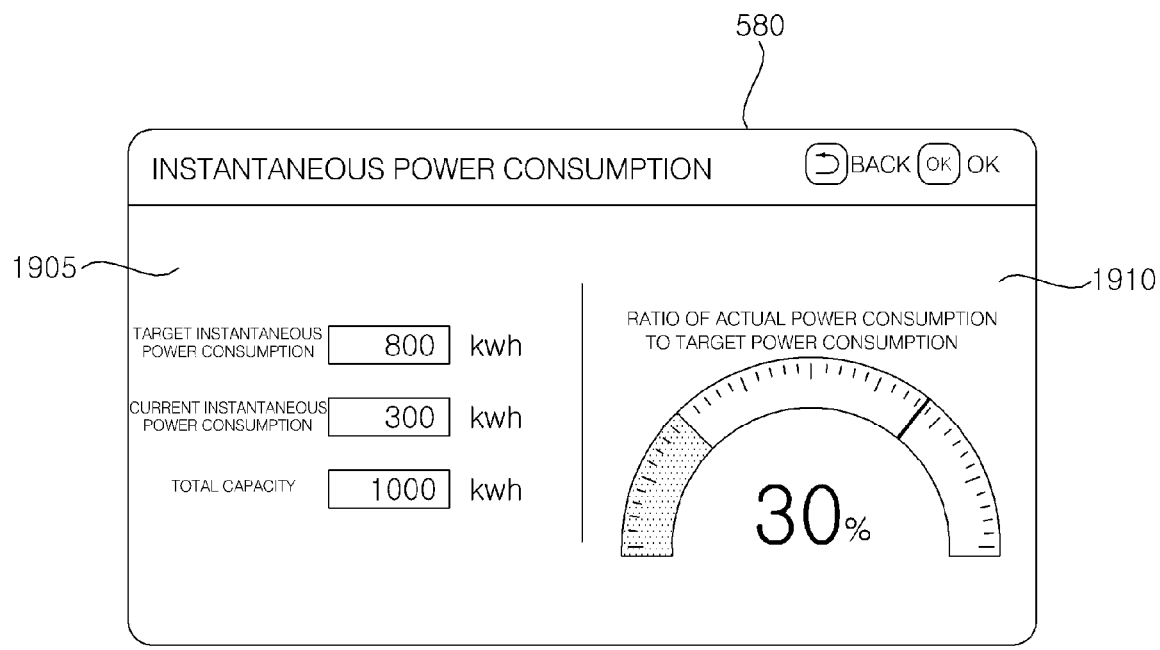
FIG. 19A illustrates a reference view of the input device in the operation mode.
Figure 19B:
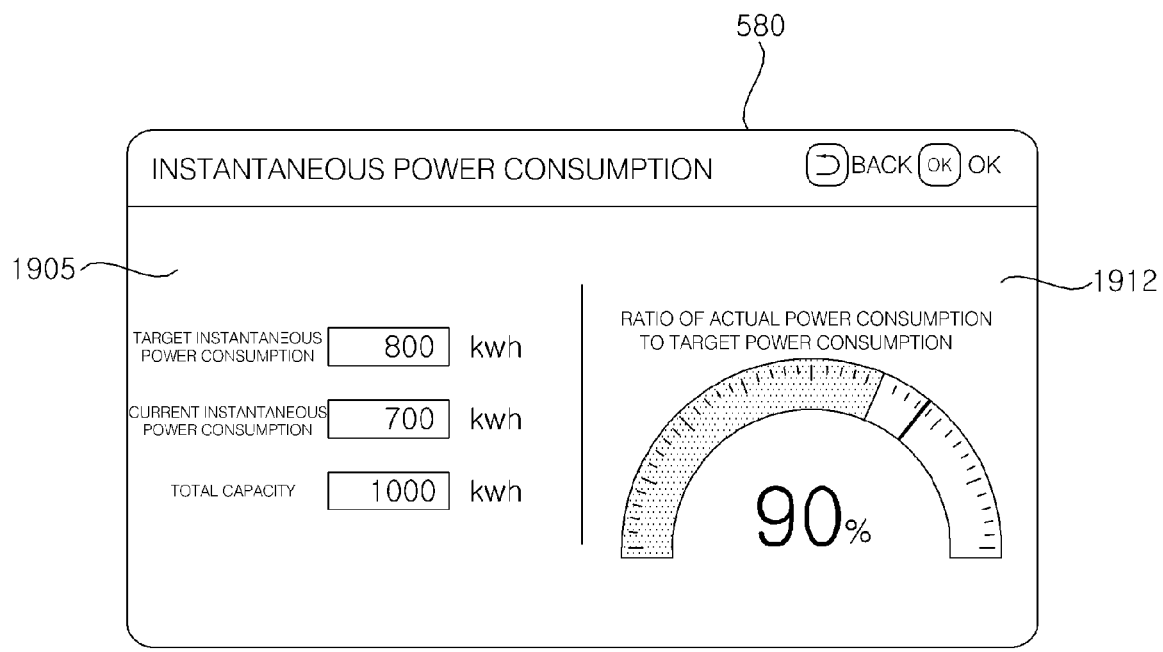
FIG. 19B illustrates another reference view of the input device in the operation mode.
Figure 19C:
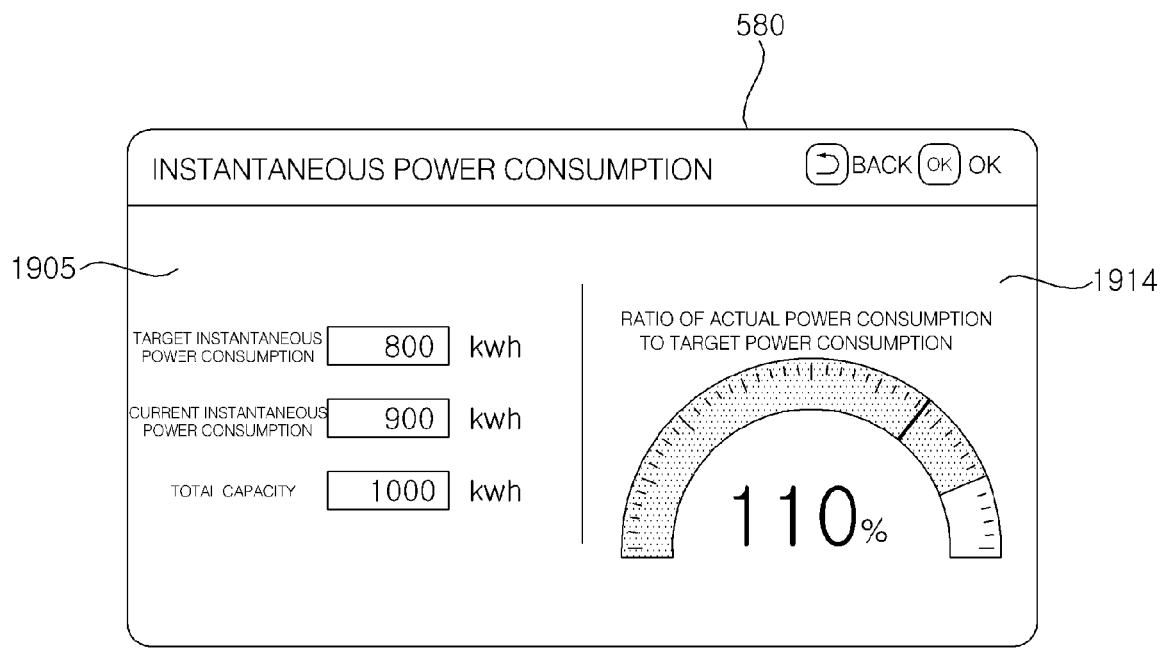
FIG. 19C illustrates another reference view of the input device in the operation mode.

FIGS. 19A to 19C illustrate various energy-related screens displayed on the touchscreen-type display unit 580 according to embodiments of the present disclosure.

For example, in the case in which an energy storage item (which is a sub-setting item) is selected after the menu item is selected, energy consumption screens 1905 may be displayed, such as shown in FIGS. 19A to 19C.

Each of the energy consumption screens 1905 may include information related to energy consumption, such as, inter alia, target instantaneous power consumption, information about current instantaneous power consumption, information about total capacity, and/or information about a ratio of actual power consumption to target power consumption (1910, 1912, and 1914).

Figure 20A:
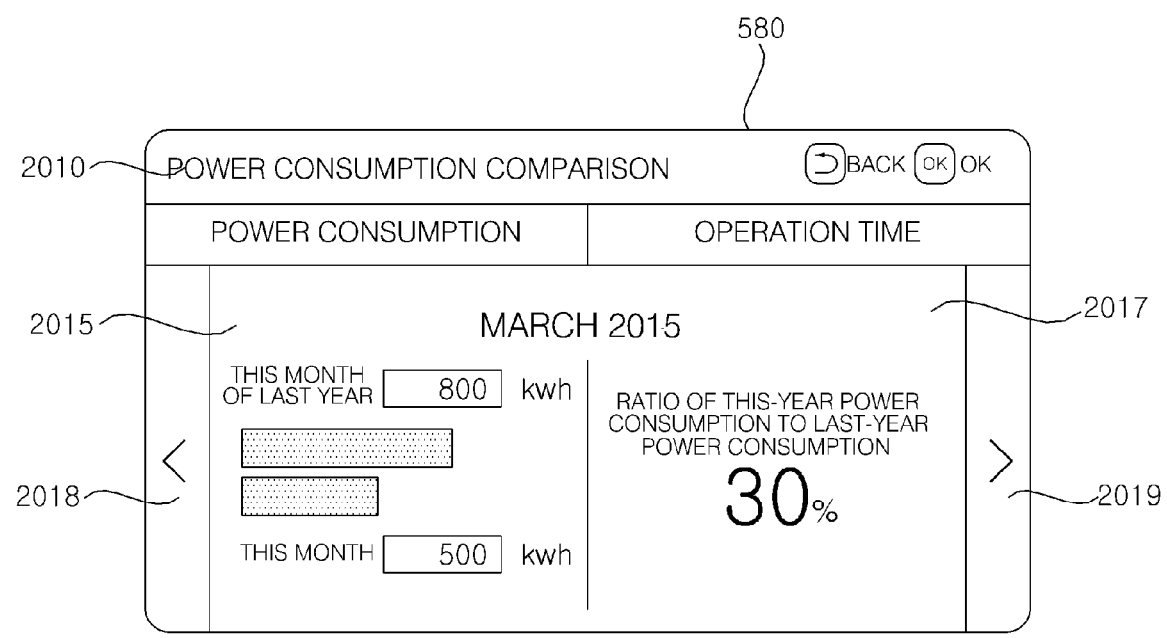
FIG. 20A illustrates a reference view of the input device in the operation mode.
Figure 20B:
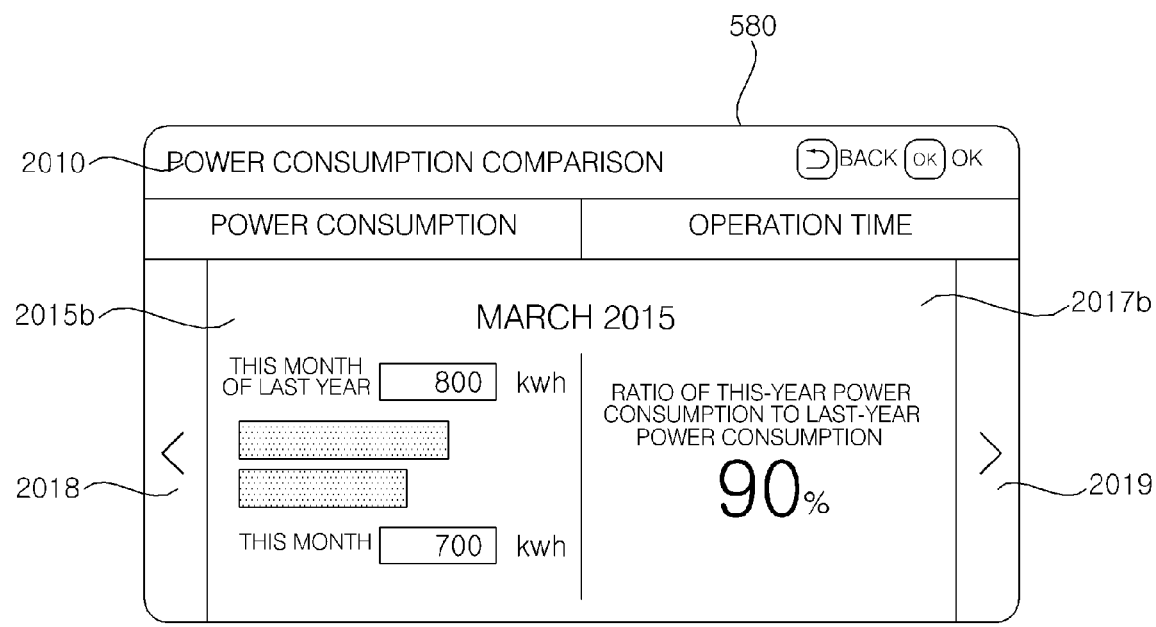
FIG. 20B illustrates another reference view of the input device in the operation mode.
Figure 20C:
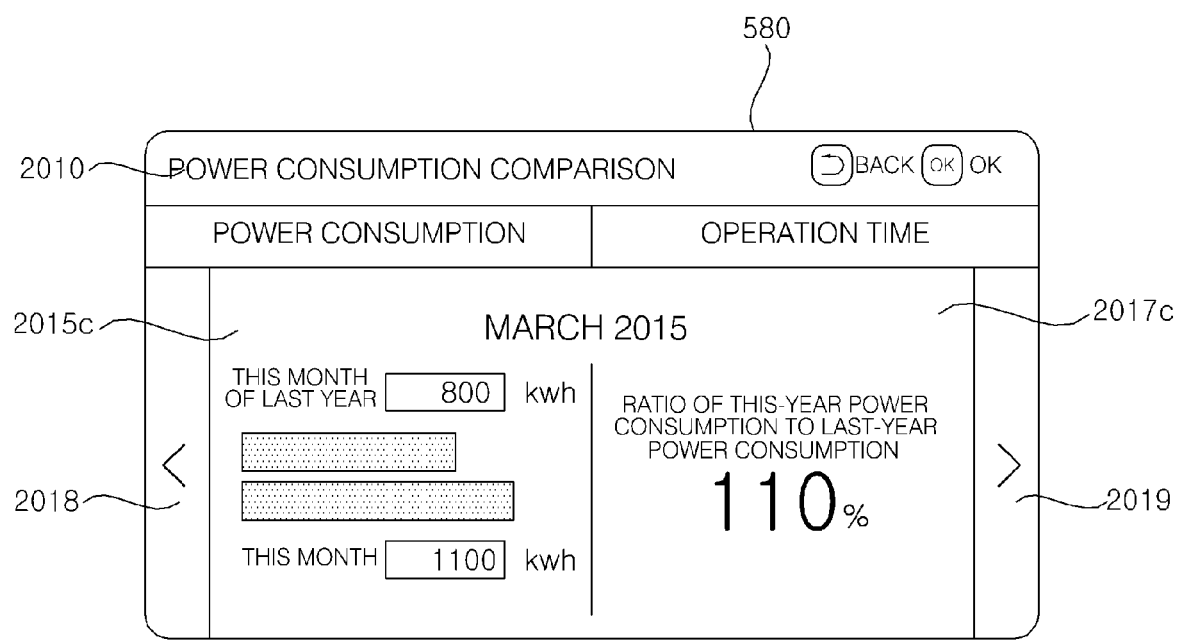
FIG. 20C illustrates another reference view of the input device in the operation mode.

The controller 570 may perform control such that various power consumption comparison screens are displayed, such as shown in the embodiments illustrated in FIGS. 20A to 20C.

The power consumption comparison screens 2010 may include information related to power consumption comparisons, such as, inter alia, information about this-year and last-year power consumption 2015, 2015b, and 2015c, and/or information about a ratio of this-year power consumption to last-year power consumption 2017, 2017b, and 2017c. The power consumption comparison screens 2010 may further include a previous item 2018 and a next item 2019.

Figure 20D:
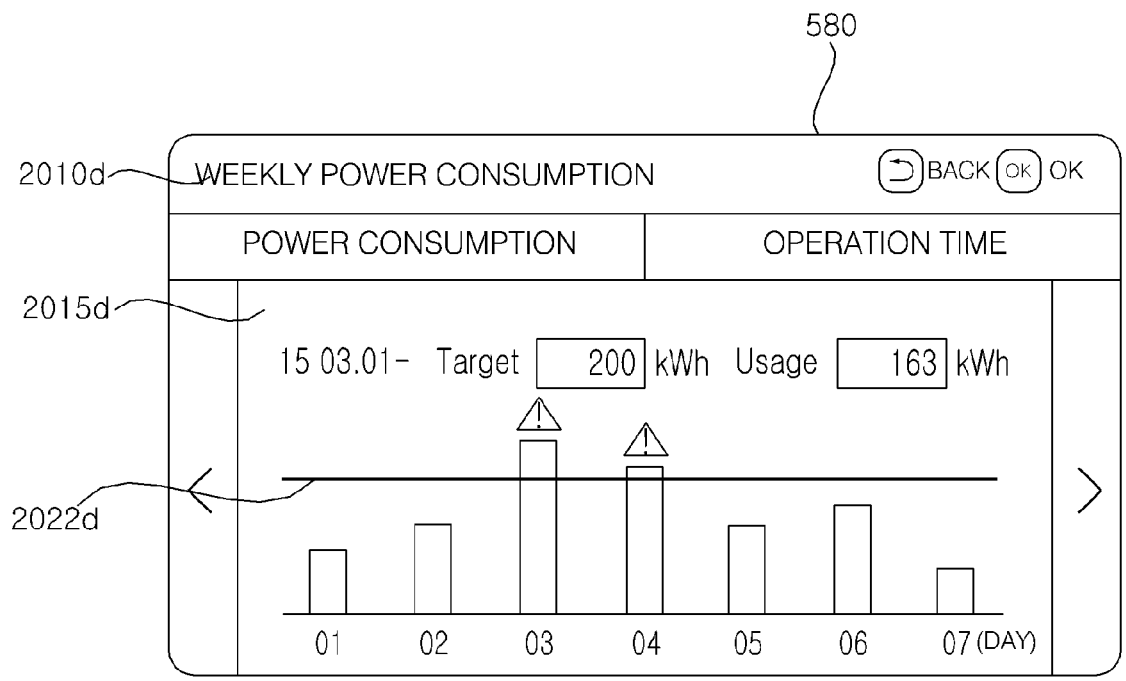
FIG. 20D illustrates another reference view of the input device in the operation mode.
Figure 20E:
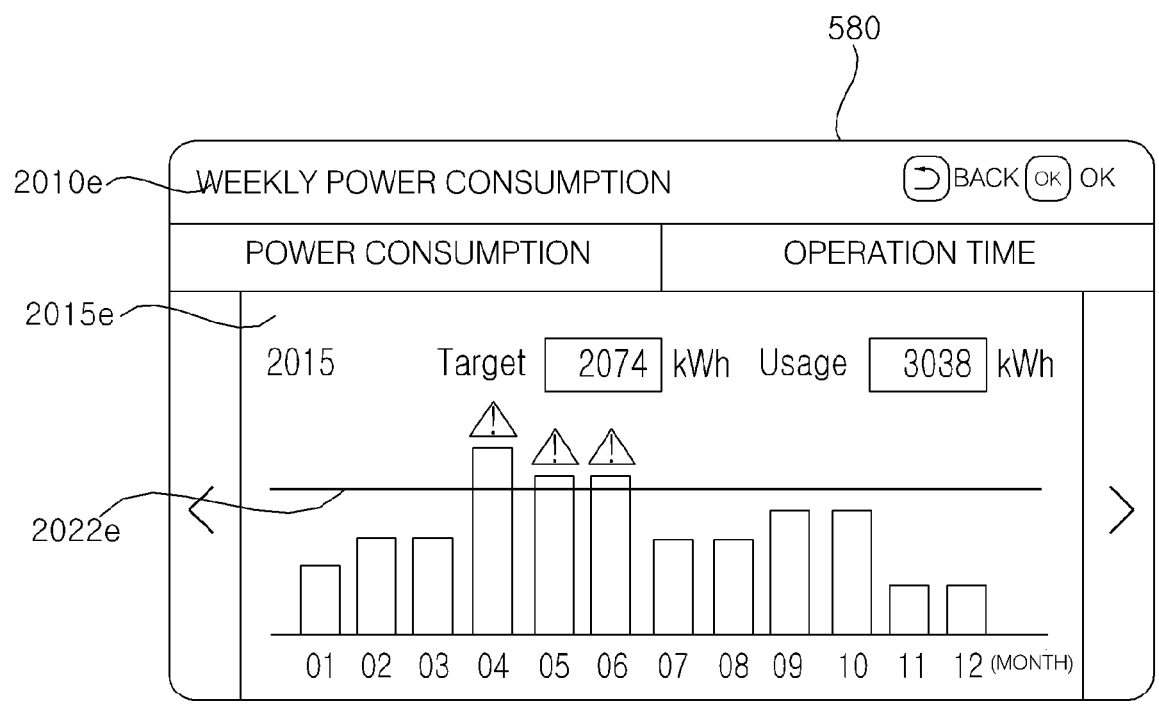
FIG. 20E illustrates another reference view of the input device in the operation mode.
Figure 20F:
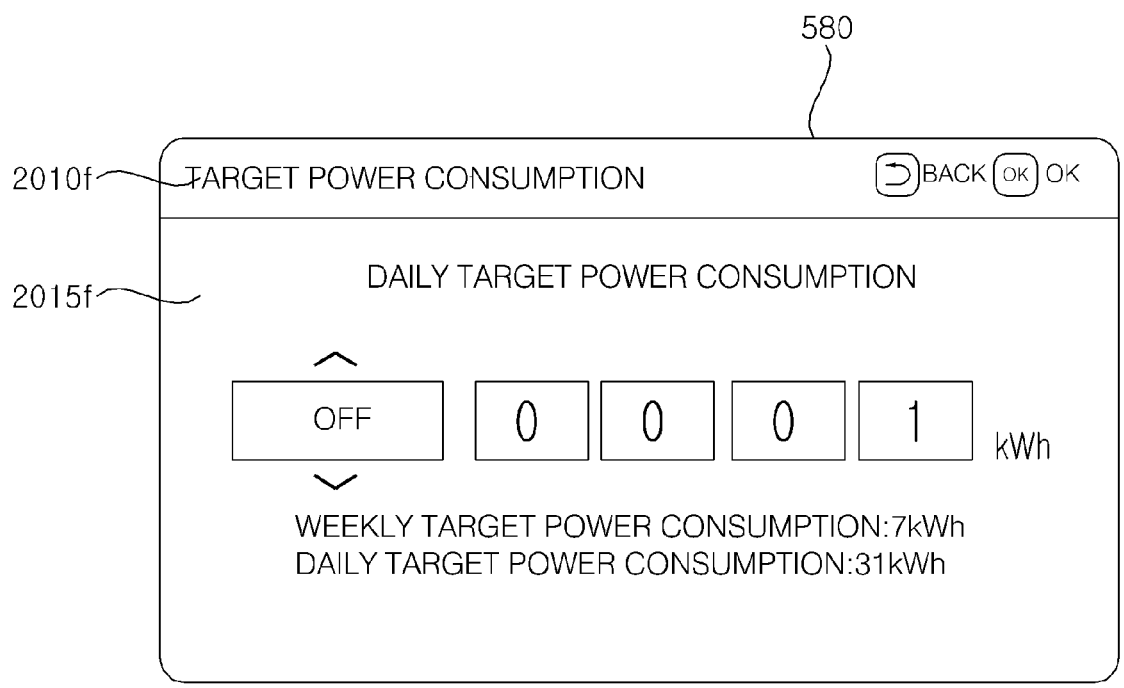
FIG. 20F illustrates another reference view of the input device in the operation mode.

The controller 570 may perform control such that various power consumption screens are displayed, such as shown in the embodiments illustrated in FIGS. 20D to 20F.

For example, FIG. 20D illustrates an embodiment of a weekly power consumption screen 2010d including period information 2015d and reference value information 2022d, FIG. 20E illustrates an embodiment of an annual power consumption screen 2010e including period information 2015e and reference value information 2022e, and FIG. 20F illustrates an embodiment of a target power consumption screen 2010f including period information 2015f.

FIGS. 21A to 21I illustrate various setting screens displayed on the touchscreen-type display unit 580 according to embodiments of the present disclosure.

Figure 21A:
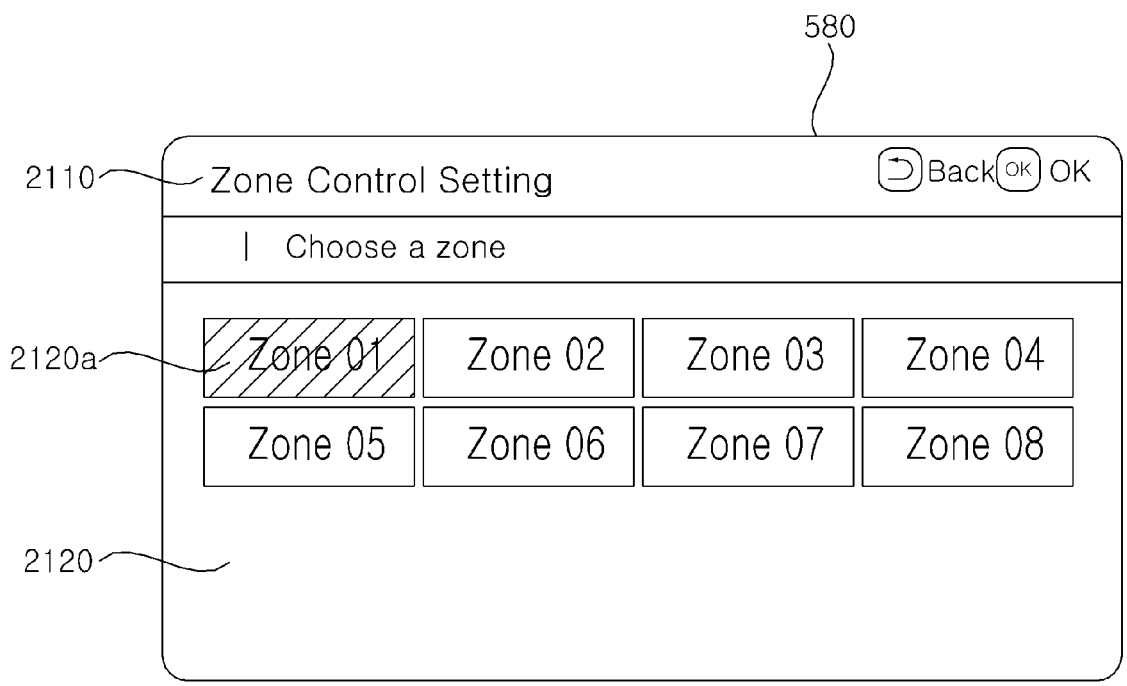
FIG. 21A illustrates a reference view of the input device in the operation mode.

For example, in the case in which a zone control setting item (which is a sub-setting item) is selected after the setting item is selected, the controller 570 may perform control such that a zone control setting screen 2110 is displayed, such as shown in FIG. 21A.

The zone control setting screen 2110 may include a zone screen 2010 including a plurality of zone items, including a first zone item 2120a.

Figure 21B:
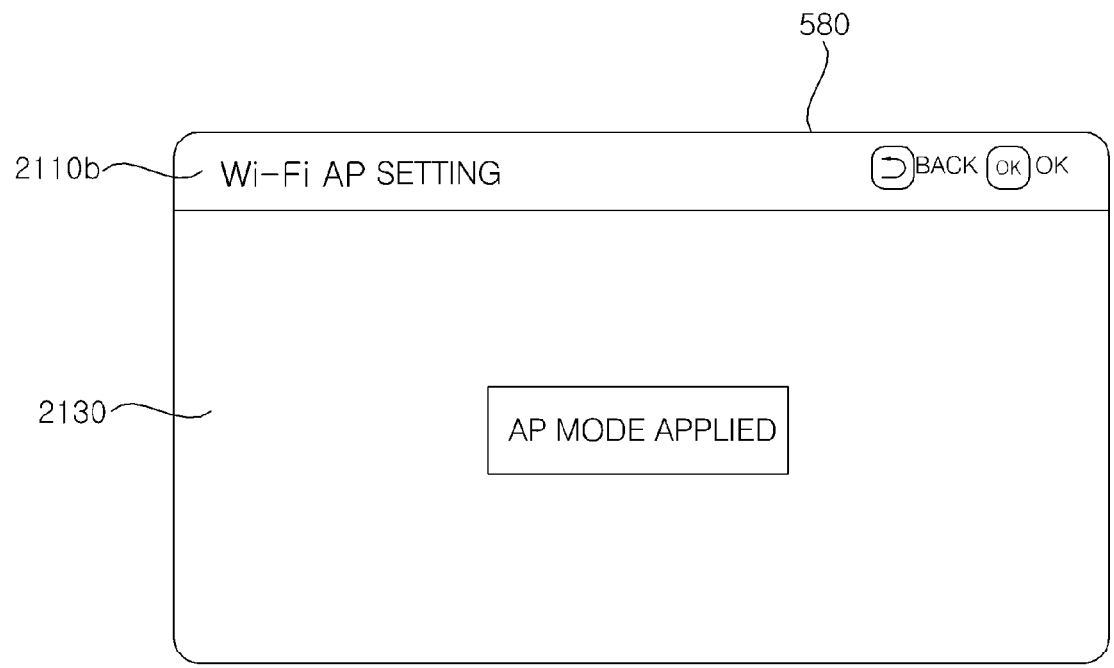
FIG. 21B illustrates another reference view of the input device in the operation mode.

For example, in the case in which a Wi-Fi setting item (which is a sub-setting item) is selected after the setting item is selected, the controller 570 may perform control such that a Wi-Fi setting screen 2110b is displayed, such as shown in FIG. 21B.

The Wi-Fi setting screen 2110b may include a screen 2130 including an AP mode application item.

Figure 21C:
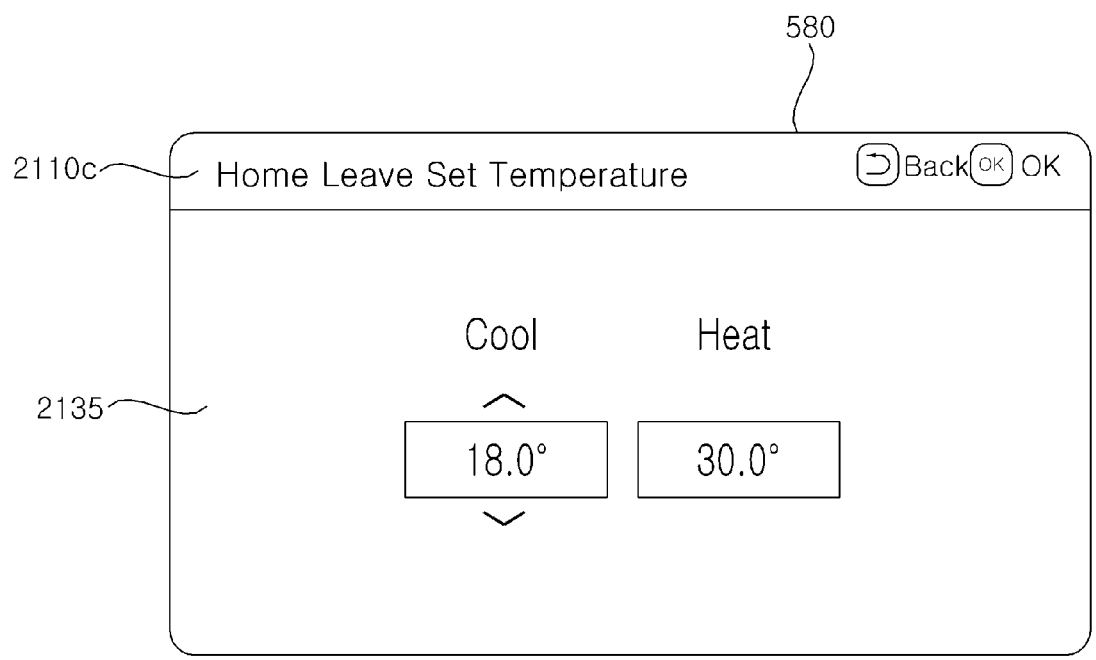
FIG. 21C illustrates another reference view of the input device in the operation mode.
Figure 21D:
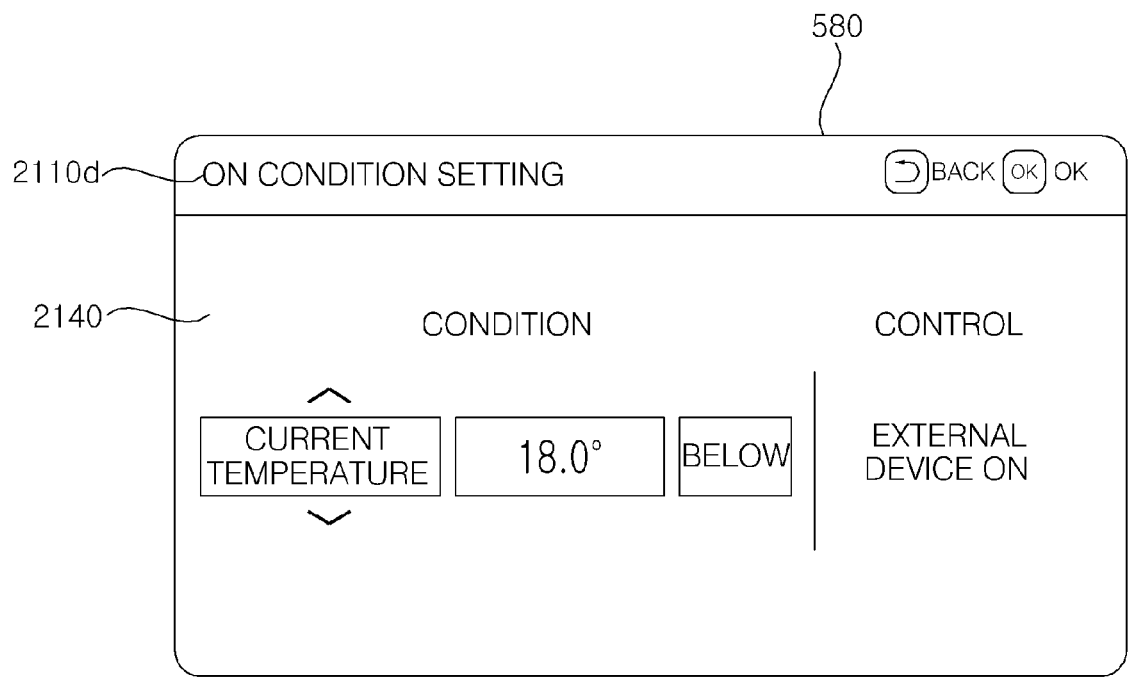
FIG. 21D illustrates another reference view of the input device in the operation mode.
Figure 21E:
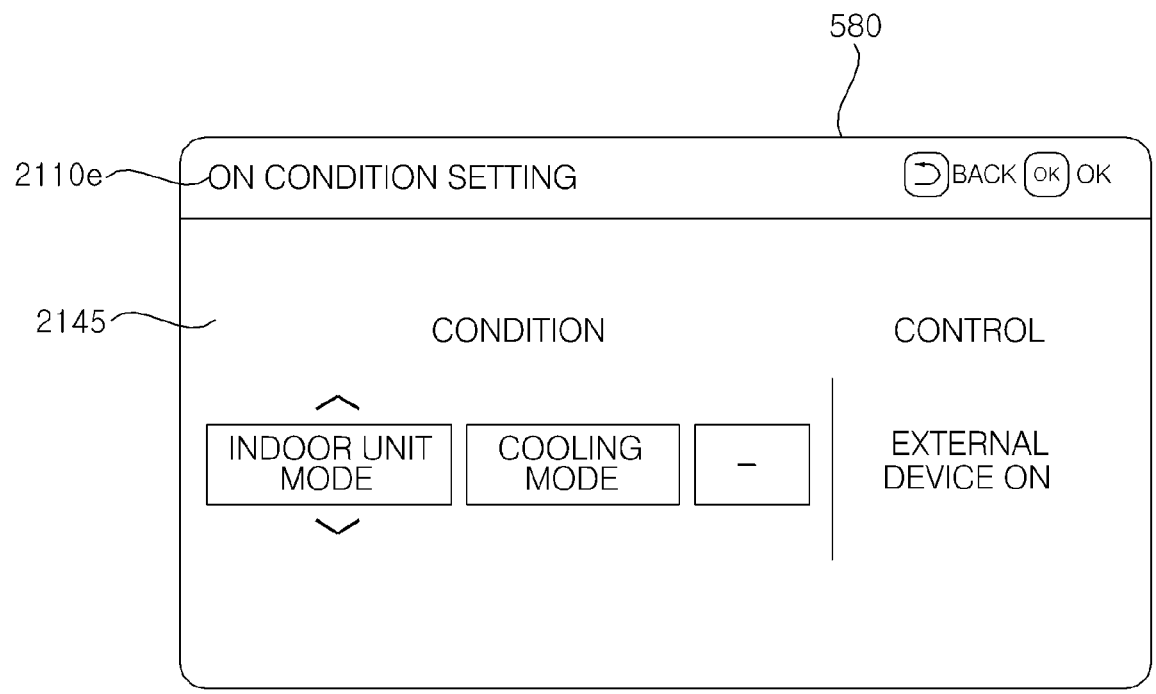
FIG. 21E illustrates another reference view of the input device in the operation mode.
Figure 21F:
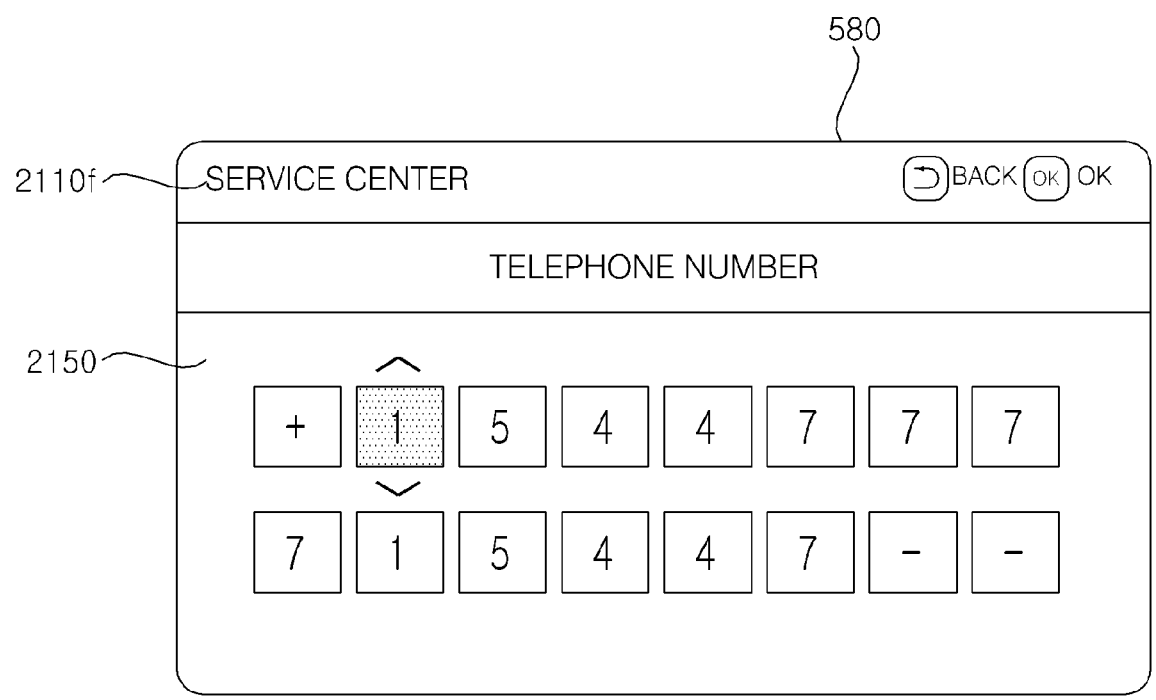
FIG. 21F illustrates another reference view of the input device in the operation mode.
Figure 21G:
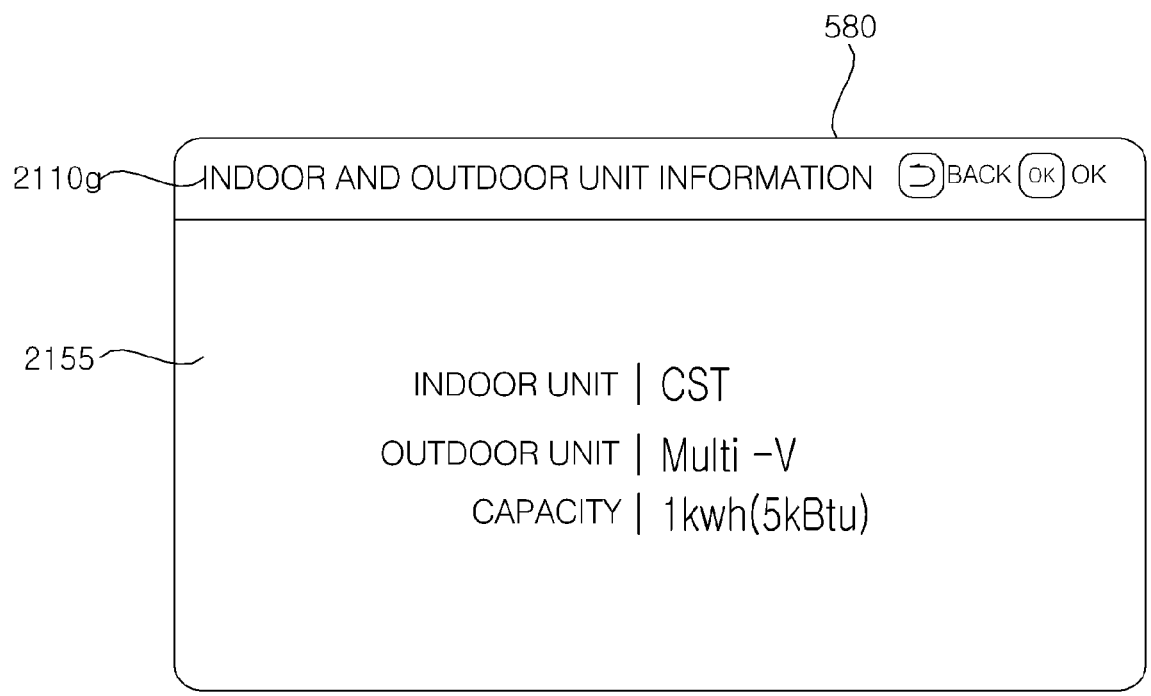
FIG. 21G illustrates another reference view of the input device in the operation mode.
Figure 21H:
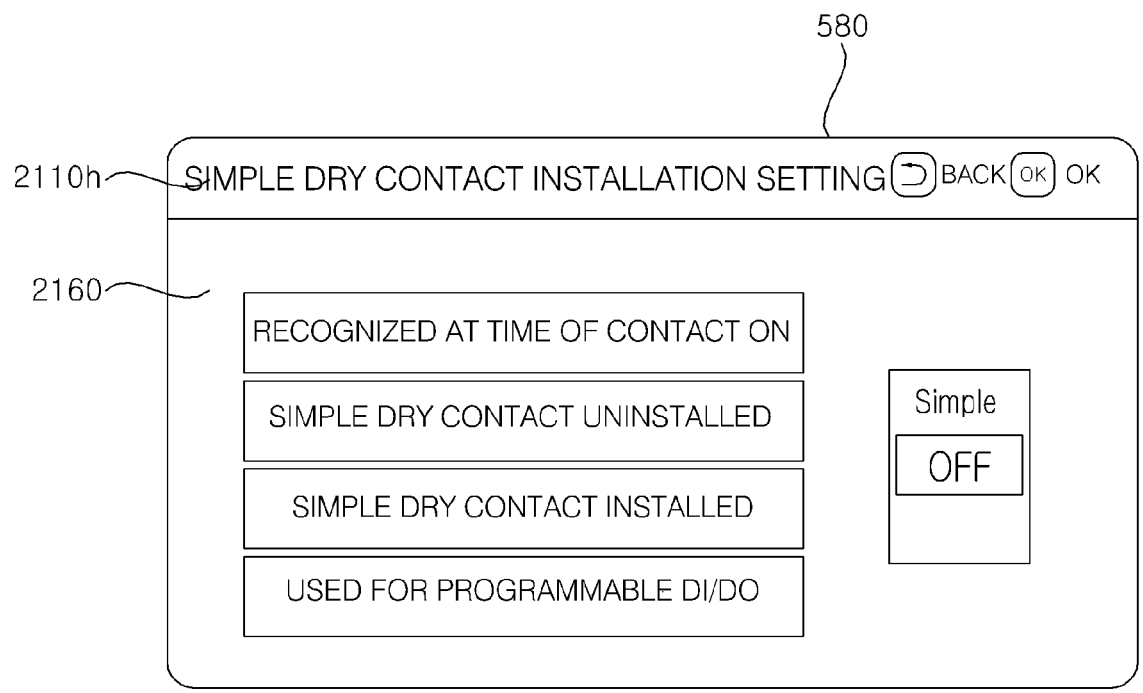
FIG. 21H illustrates another reference view of the input device in the operation mode.
Figure 21I:
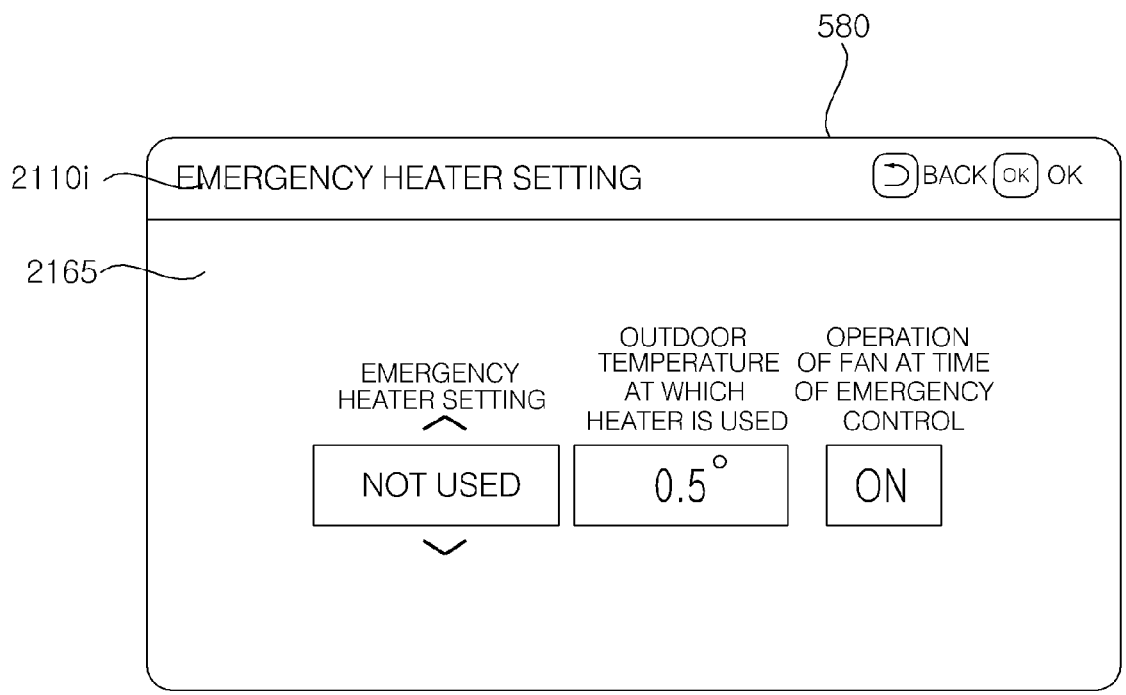
FIG. 21I illustrates another reference view of the input device in the operation mode.

FIG. 21C illustrates an embodiment of a presence-in-room setting screen 2110c including a presence-in-room temperature setting item. FIG. 21D illustrates an embodiment of an ON condition setting screen 2110d including a temperature item. FIG. 21E illustrates an embodiment of an ON condition setting screen 2110e including an indoor unit mode item. FIG. 21F illustrates an embodiment of a service center setting screen 2110f including a number item. FIG. 21G illustrates an embodiment of an indoor and outdoor unit information screen 2110g including information about an indoor unit, an outdoor unit, and capacity. FIG. 21H illustrates an embodiment of a contact control setting screen 2110*h* including information about whether contact is recognized. FIG. 21I illustrates an embodiment of an emergency heater setting screen 2110*i* including information about whether an emergency heater is being used.

FIGS. 22A to 22F illustrate various wind direction setting screens displayed on the touchscreen-type display unit 580.

For example, in the case in which a wind direction setting item (which is a sub-setting item) is selected after the setting item is selected, the controller 570 may perform control such that various wind direction setting screens are displayed, such as shown in the embodiments illustrated in FIGS. 22A to 22F.

Figure 22A:
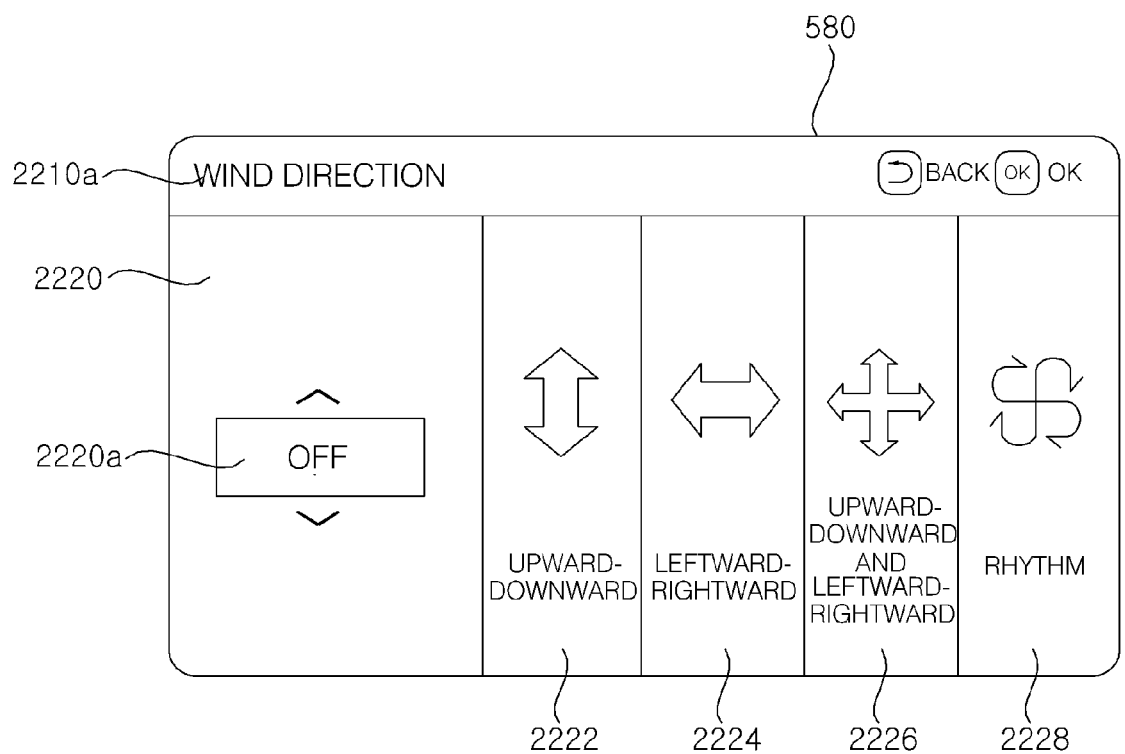
FIG. 22A illustrates a reference view of the input device in the operation mode.

For example, as shown in FIG. 22A, a wind direction setting screen may include an OFF item 2220*a* and various wind direction items 2222, 2224, 2226, and 2228.

Figure 22B:
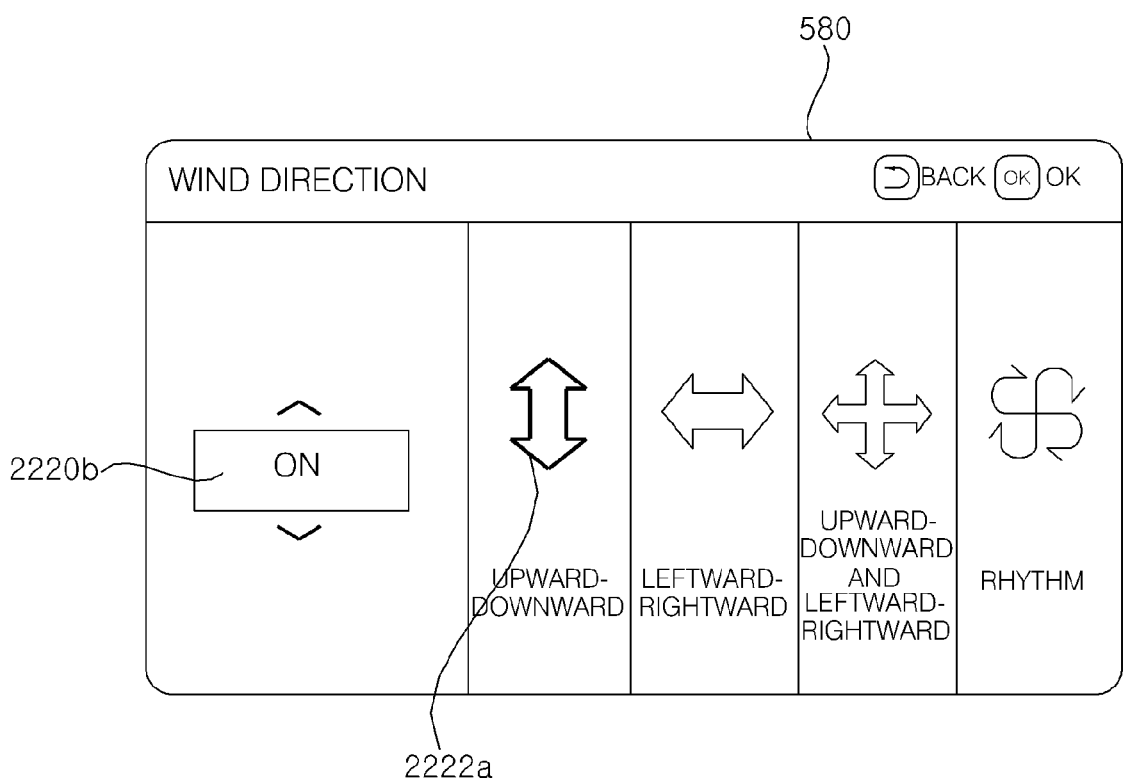
FIG. 22B illustrates another reference view of the input device in the operation mode.

For example, as shown in FIG. 22B, a wind direction setting screen may include an ON item 2220*b* and various wind direction items 2222, 2224, 2226, and 2228.

For example, in the case in which the upward-downward direction item 2222 is focused, the controller 570 may perform control such that an upward-downward direction item 2222*a* is focused and displayed, such as shown in FIG. 22B.

Figure 22C:
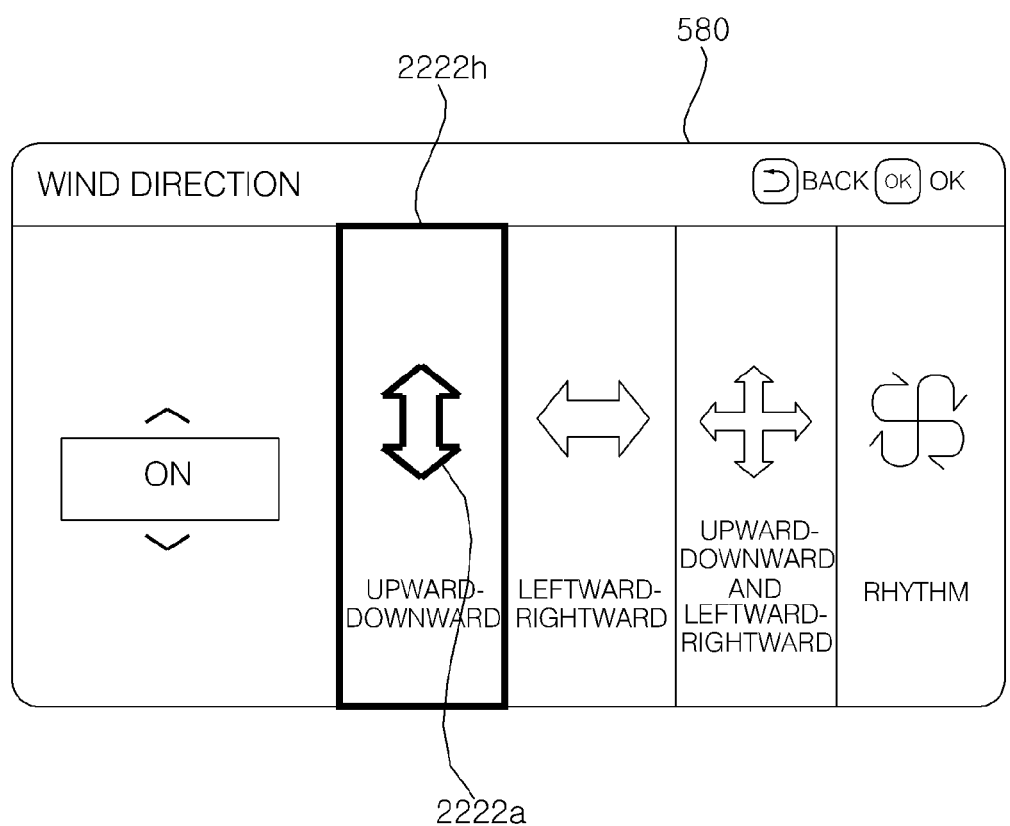
FIG. 22C illustrates another reference view of the input device in the operation mode.

Alternatively, in the case in which the upward-downward direction item 2222 is focused, the controller 570 may perform control such that an upward-downward direction item 2222*a* is focused and an edge 2222*h* is focused and displayed, such as shown in FIG. 22C.

Figure 22D:
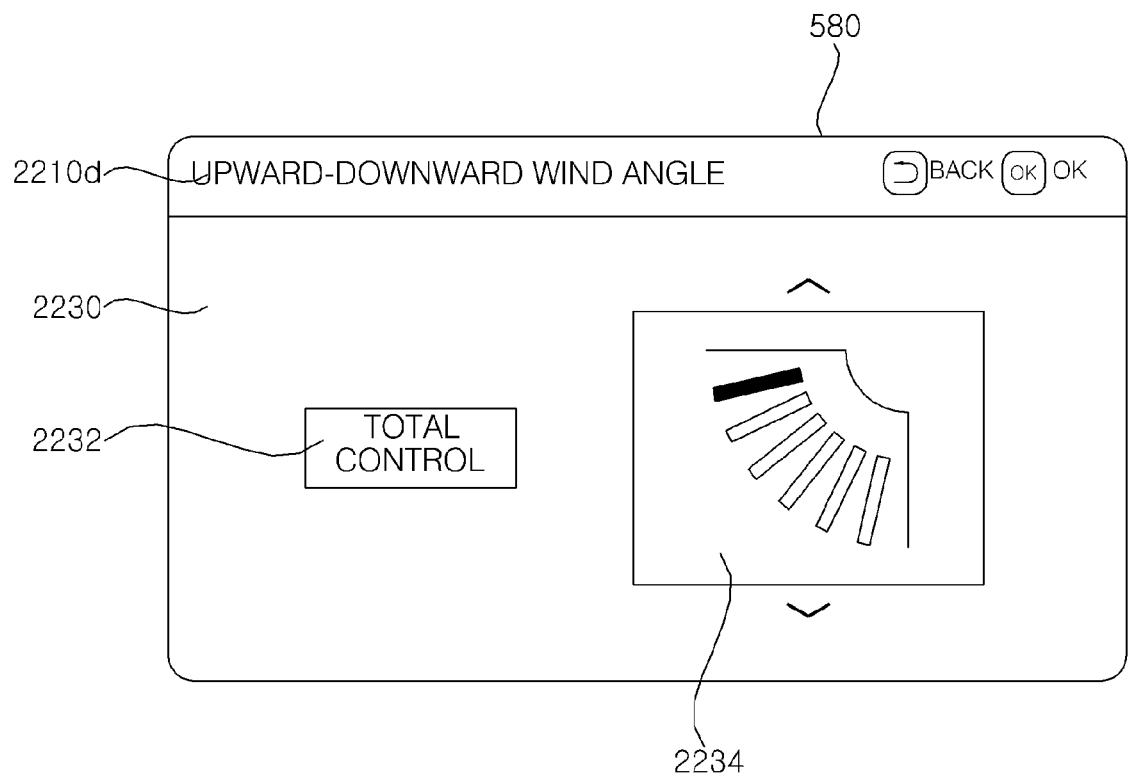
FIG. 22D illustrates another reference view of the input device in the operation mode.

For example, in the case in which the upward-downward direction item 2222*a* is selected, the controller 570 may perform control such that an upward-downward wind angle setting screen 2210*d* is displayed, such as shown in FIG. 22D.

The upward-downward wind angle setting screen 2210*d* may include a total control item 2232 and an object 2234 indicating an upward-downward wind angle.

Figure 22E:
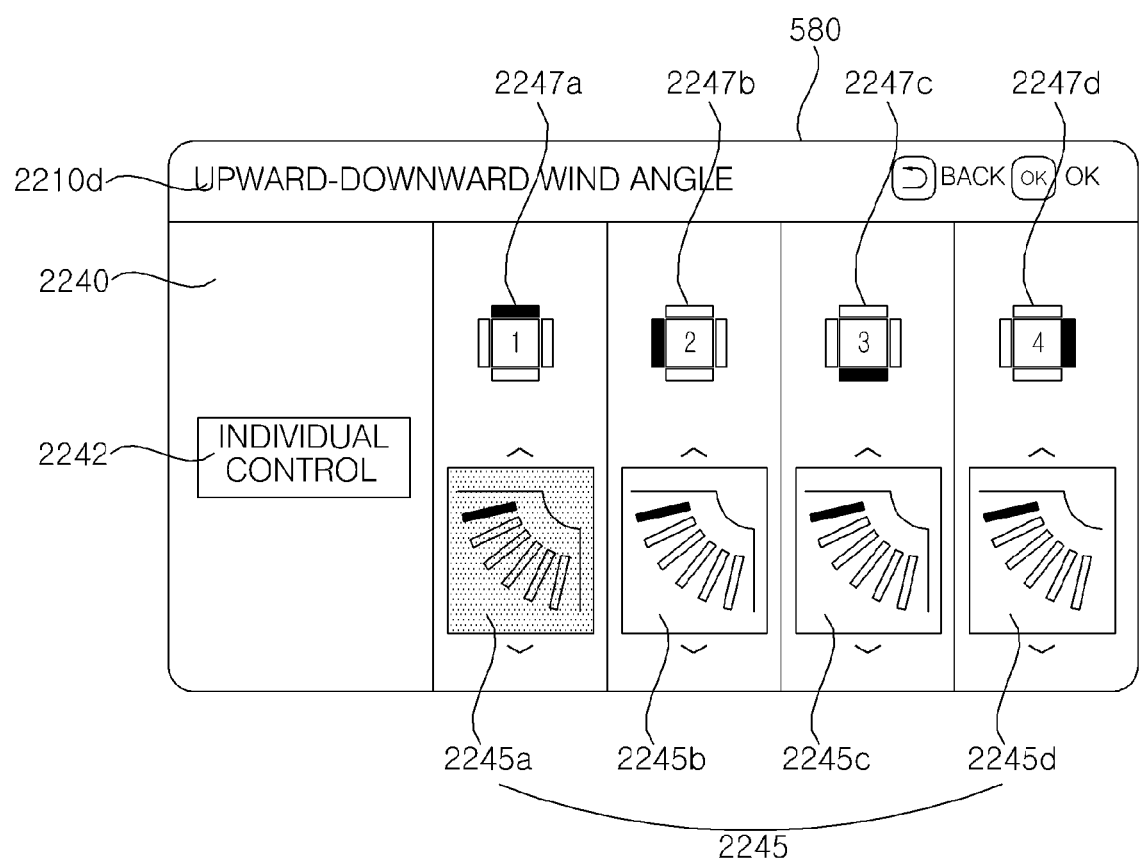
FIG. 22E illustrates another reference view of the input device in the operation mode.

For example, in the case in which the upward-downward direction item 2222*a* is selected, the controller 570 may perform control such that an upward-downward wind angle setting screen 2210*d* is displayed, such as shown in FIG. 22E.

The upward-downward wind angle setting screen 2210*d* of FIG. 22E may include, inter alia, an individual control item 2242, objects 2247*a* to 2247*d* representing respective vanes of the indoor units, and/or objects 2245*a* to 2245*d* indicating settings of the respective vanes.

Figure 22F:
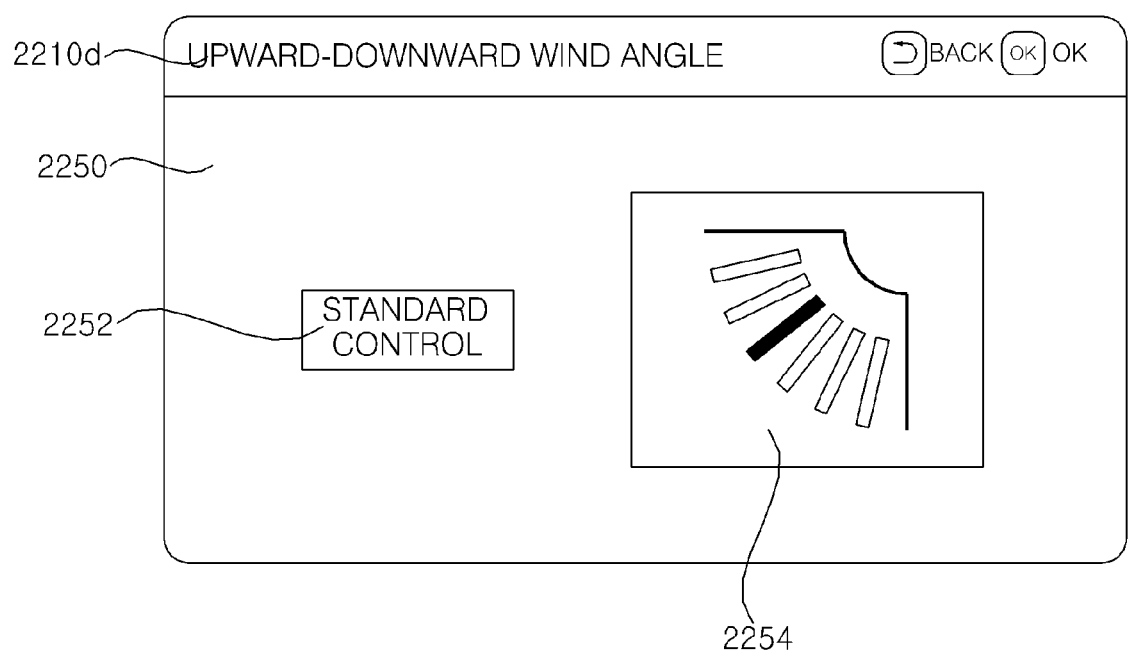
FIG. 22F illustrates another reference view of the input device in the operation mode.

An upward-downward wind angle setting screen 2210*d* of FIG. 22F may include, inter alia, a standard control item 2252 and/or an object 2254 indicating an upward-downward wind angle.

Figure 23A:
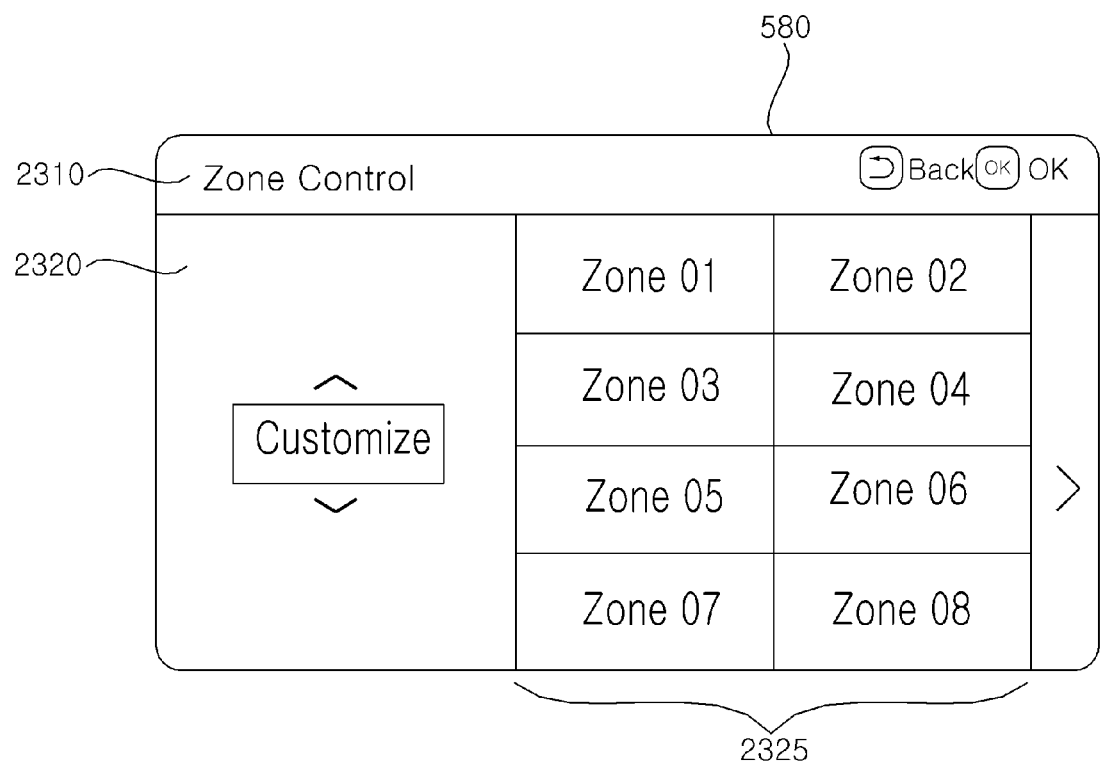
FIG. 23A illustrates a reference view of the input device in the operation mode.

Meanwhile, for example, in the case in which the zone control item (which is a sub-menu item) is selected, the controller 570 may perform control such that a zone control screen 2310 including a plurality of zones 2325 is displayed, such as shown in FIG. 23A.

Figure 23B:
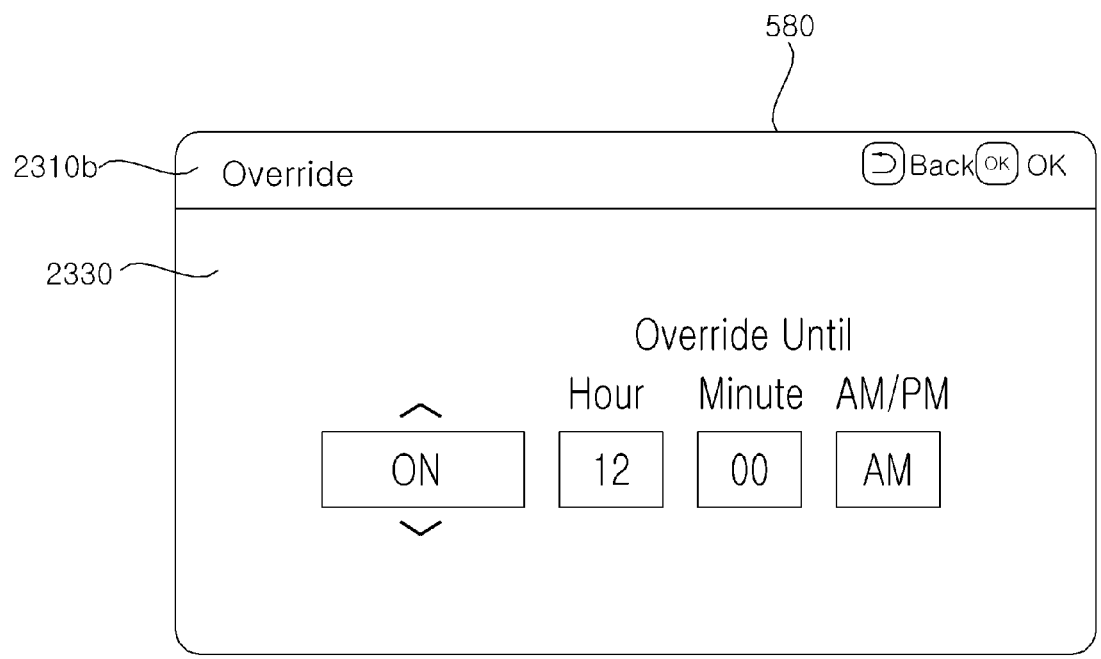
FIG. 23B illustrates another reference view of the input device in the operation mode.

Meanwhile, for example, in the case in which the override item (which is a sub-menu item) is selected, the controller 570 may perform control such that an override screen 2310*b* including a time setting item is displayed, such as shown in FIG. 23B.

Figure 24A:
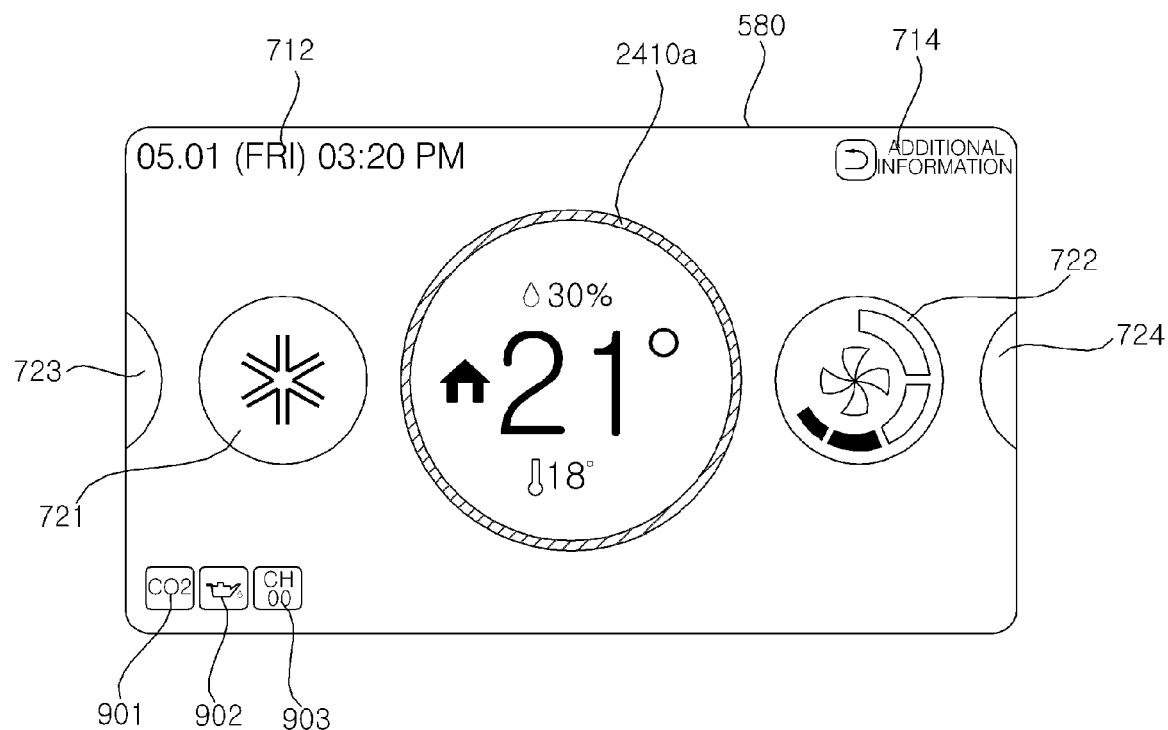
FIG. 24A illustrates a reference view of the input device in the operation mode.
Figure 24B:
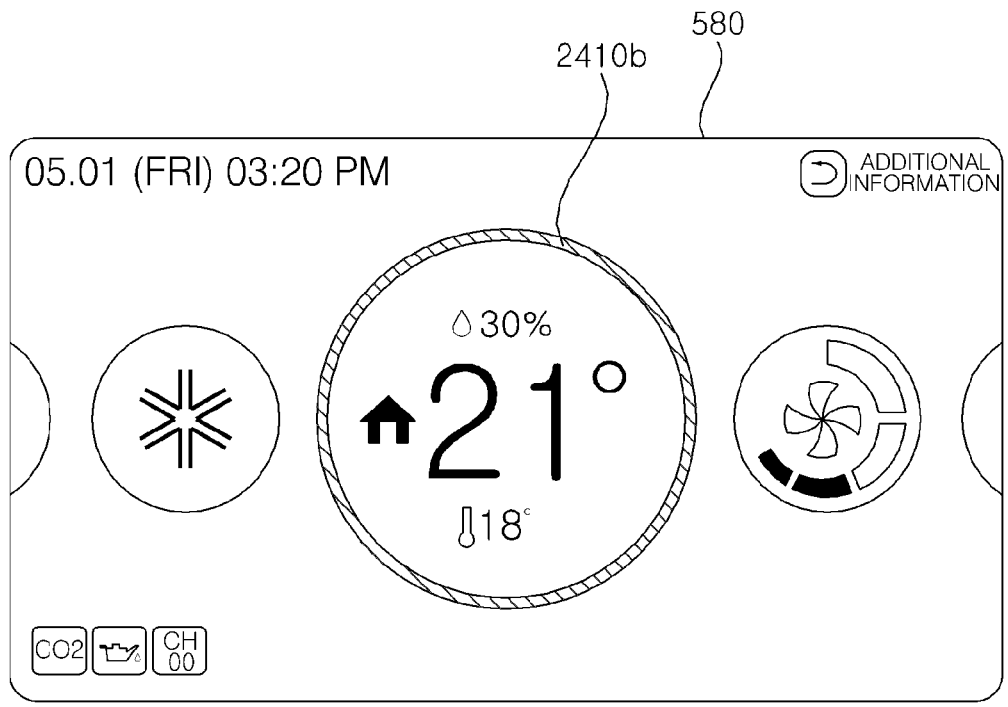
FIG. 24B illustrates another reference view of the input device in the operation mode.
Figure 24C:
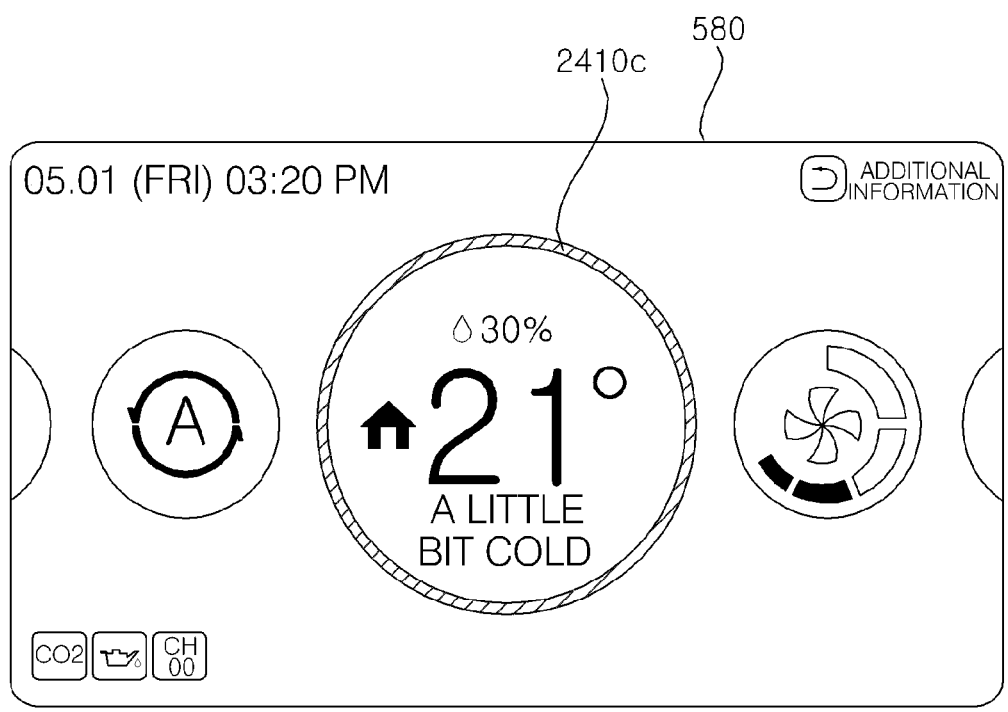
FIG. 24C illustrates another reference view of the input device in the operation mode.

FIGS. 24A to 24C illustrate various operation mode setting items displayed on the touchscreen-type display unit 580 according to embodiments of the present disclosure.

For example, in the case in which a cooling mode is selected, the controller 570 may perform control such that a blue operation mode setting item 2410*a* (or another color/visual cue) is focused and displayed, such as shown in FIG. 24A.

Meanwhile, for example, in the case in which a heating mode is selected, the controller 570 may perform control such that a red operation mode setting item 2410*b* (or another color/visual cue) is focused and displayed, such as shown in FIG. 24B.

Meanwhile, for example, in the case in which an automatic mode is selected, the controller 570 may perform control such that a blue operation mode setting item 2410*c* (or another color/visual cue) is focused and displayed, such as shown in FIG. 24C.

FIGS. 25A to 25D illustrate various sub-menu items focused and displayed on the touchscreen-type display unit 580 according to embodiments of the present disclosure.

Figure 25A:
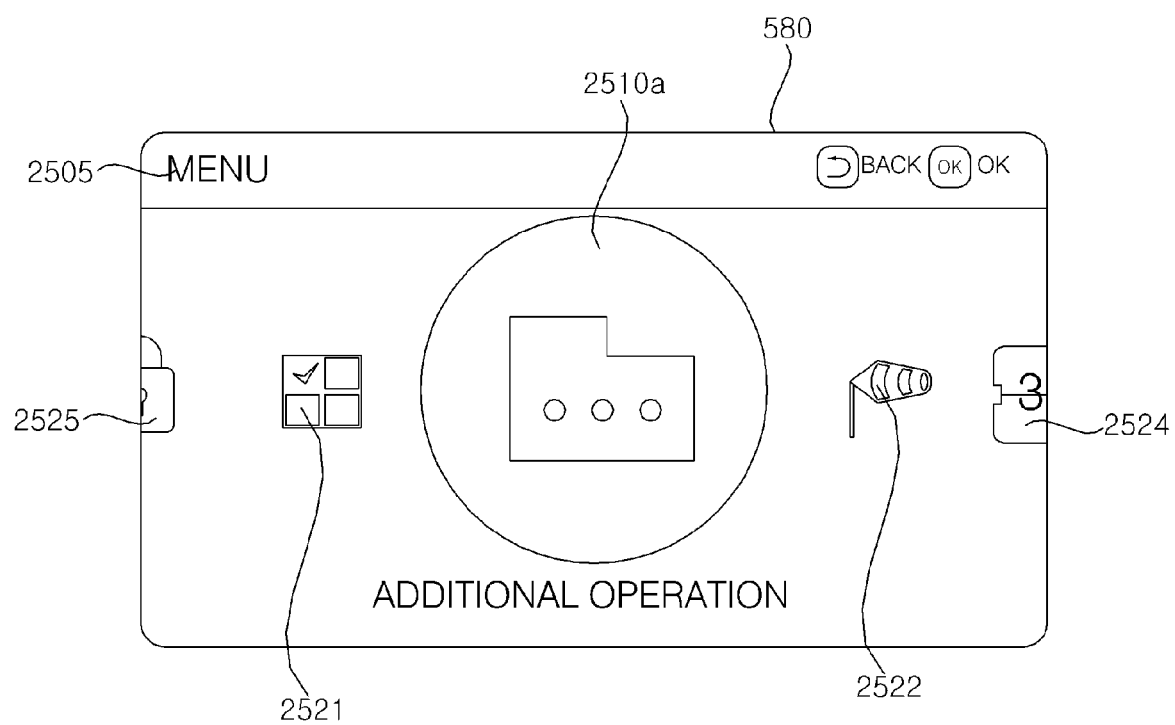
FIG. 25A illustrates a reference view of the input device in the operation mode.

For example, in the case in which an additional operation item (which is a sub-menu item) is selected after the menu item is selected, the controller 570 may perform control such that an additional operation item 2510*a* is focused and displayed, such as shown in FIG. 25A.

Figure 25B:
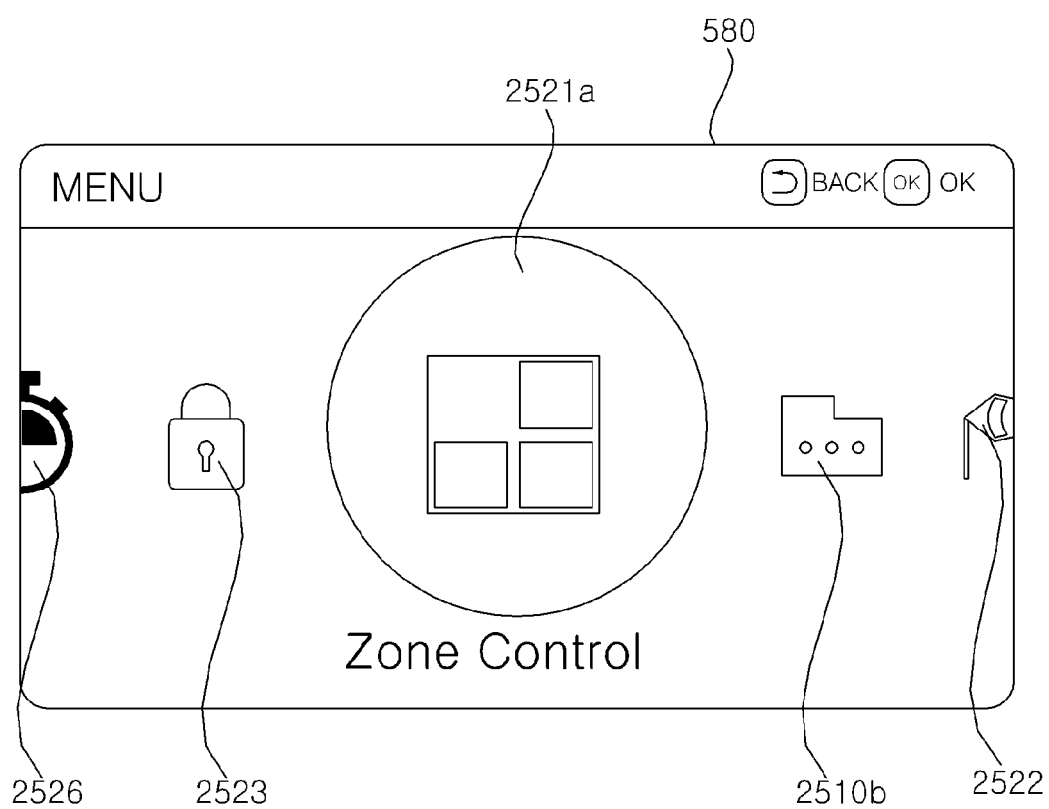
FIG. 25B illustrates another reference view of the input device in the operation mode.

Meanwhile, for example, in the case in which a zone control item (which is a sub-menu item) is selected after the menu item is selected, the controller 570 may perform control such that a zone control item 2521*a* is focused and displayed, such as shown in FIG. 25B.

For example, in the case in which rightward sweep input is executed in the state in which the additional operation item 2510*a* is focused and displayed, such as shown in FIG. 25A, the zone control item 2521*a* may be shifted rightward, focused, and displayed, such as shown in FIG. 25B.

Figure 25C:
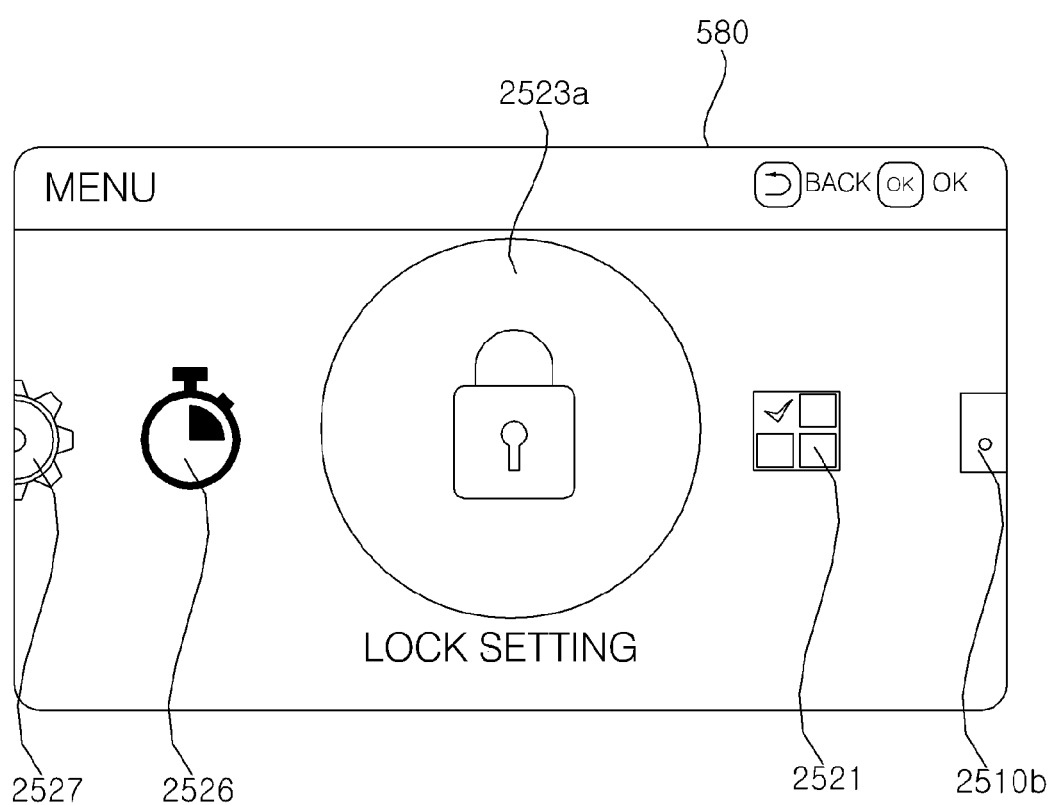
FIG. 25C illustrates another reference view of the input device in the operation mode.

Meanwhile, for example, in the case in which a lock setting item (which is a sub-menu item) is selected after the menu item is selected, the controller 570 may perform control such that a lock setting item 2523*a* is focused and displayed, such as shown in FIG. 25C.

For example, in the case in which rightward sweep input is executed in the state in which the zone control item 2521*a* is focused and displayed, such as shown in FIG. 25B, the lock setting item 2523*a* may be shifted rightward, focused, and displayed, such as shown in FIG. 25C.

Figure 25D:
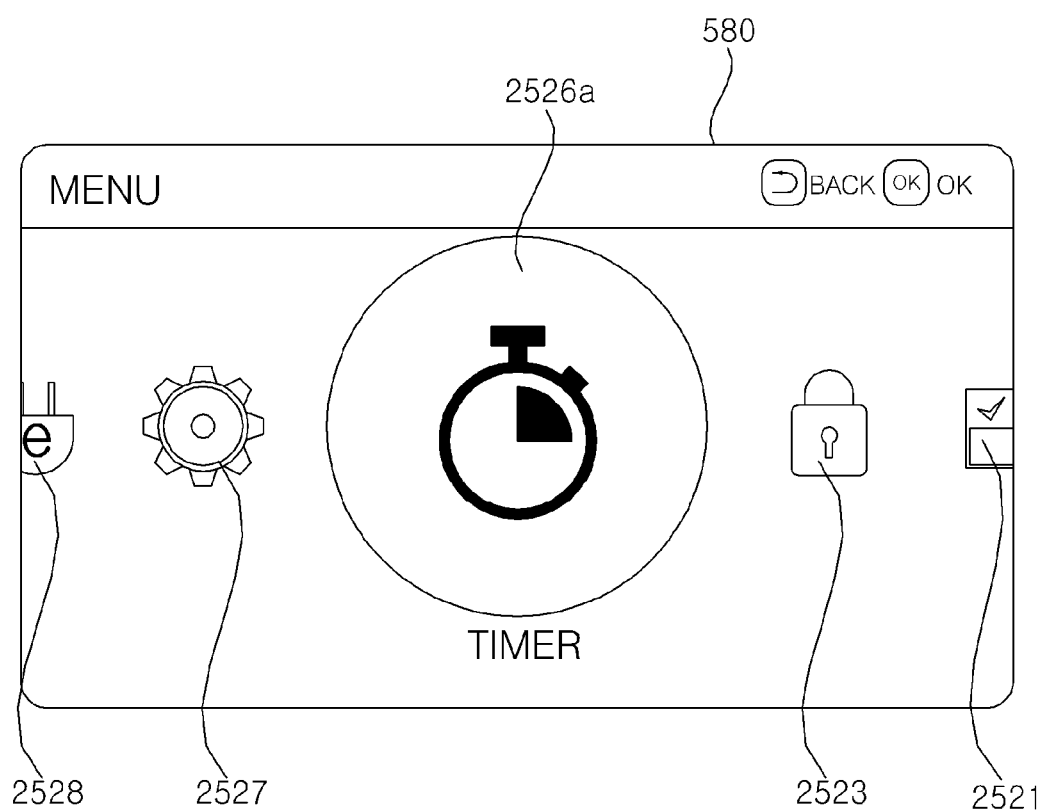
FIG. 25D illustrates another reference view of the input device in the operation mode.

Meanwhile, for example, in the case in which a timer setting item (which is a sub-menu item) is selected after the menu item is selected, the controller 570 may perform control such that a timer setting item 2526*a* is focused and displayed, such as shown in FIG. 25D.

For example, in the case in which rightward sweep input is executed in the state in which the lock setting item 2523*a* is focused and displayed, such as shown in FIG. 25C, the timer setting item 2526*a* may be shifted rightward, focused, and displayed, such as shown in FIG. 25D.

Figure 25E:
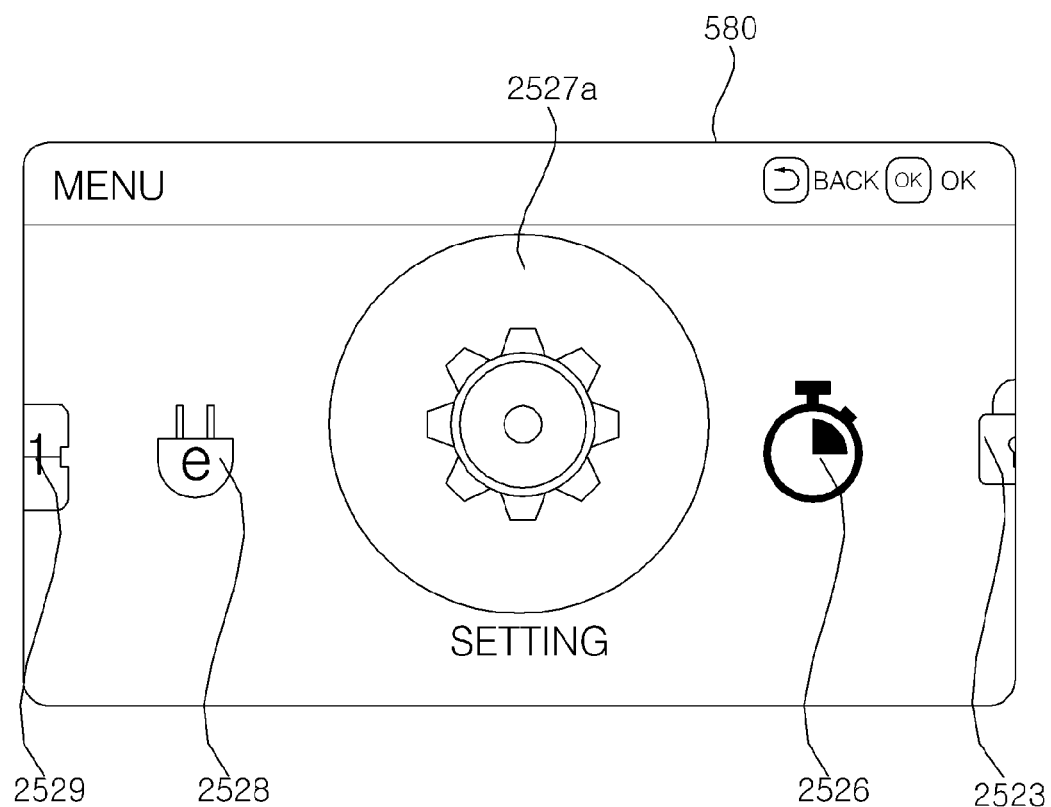
FIG. 25E illustrates another reference view of the input device in the operation mode.

Meanwhile, for example, in the case in which a setting item (which is a sub-menu item) is selected after the menu item is selected, the controller 570 may perform control such that a setting item 2527*a* is focused and displayed, such as shown in FIG. 25E.

For example, in the case in which rightward sweep input is executed in the state in which the timer setting item 2526*a* is focused and displayed, such as shown in FIG. 25D, the setting item 2527*a* may be shifted rightward, focused, and displayed, such as shown in FIG. 25E.

Figure 25F:
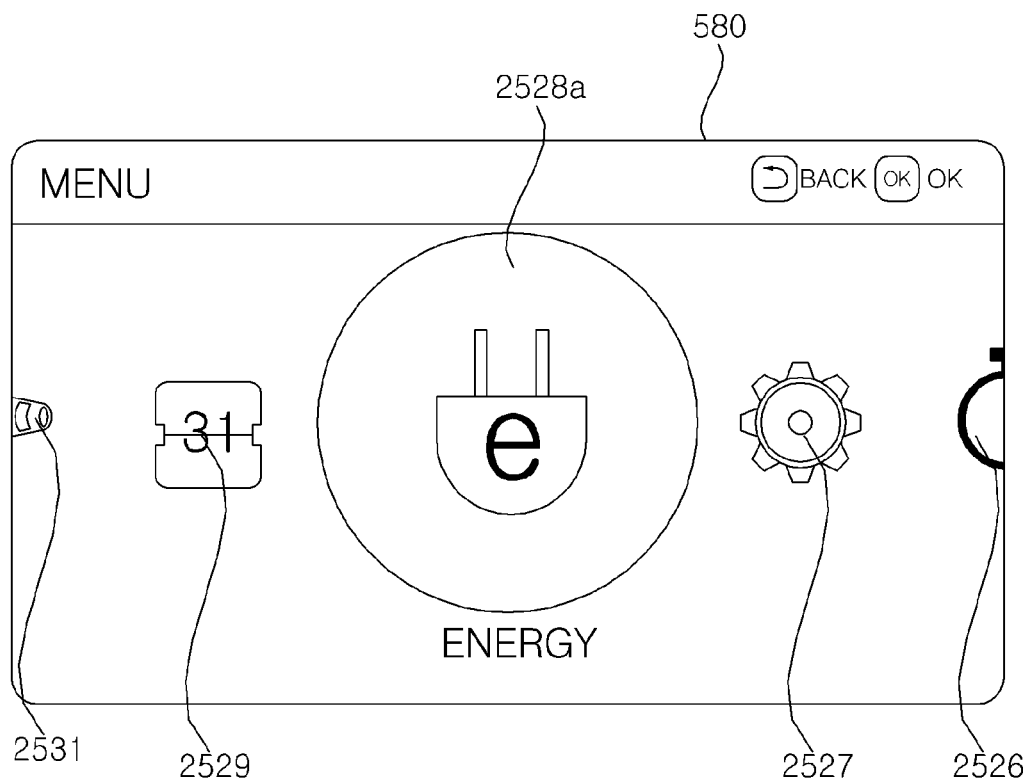
FIG. 25F illustrates another reference view of the input device in the operation mode.

Meanwhile, in the case in which an energy item (which is a sub-menu item) is selected after the menu item is selected, the controller 570 may perform control such that an energy item 2528*a* is focused and displayed, such as shown in FIG. 25F.

For example, in the case in which rightward sweep input is executed in the state in which the setting item 2527*a* is focused and displayed, such as shown in FIG. 25E, the energy item 2528*a* may be shifted rightward, focused, and displayed, such as shown in FIG. 25F.

Figure 25G:
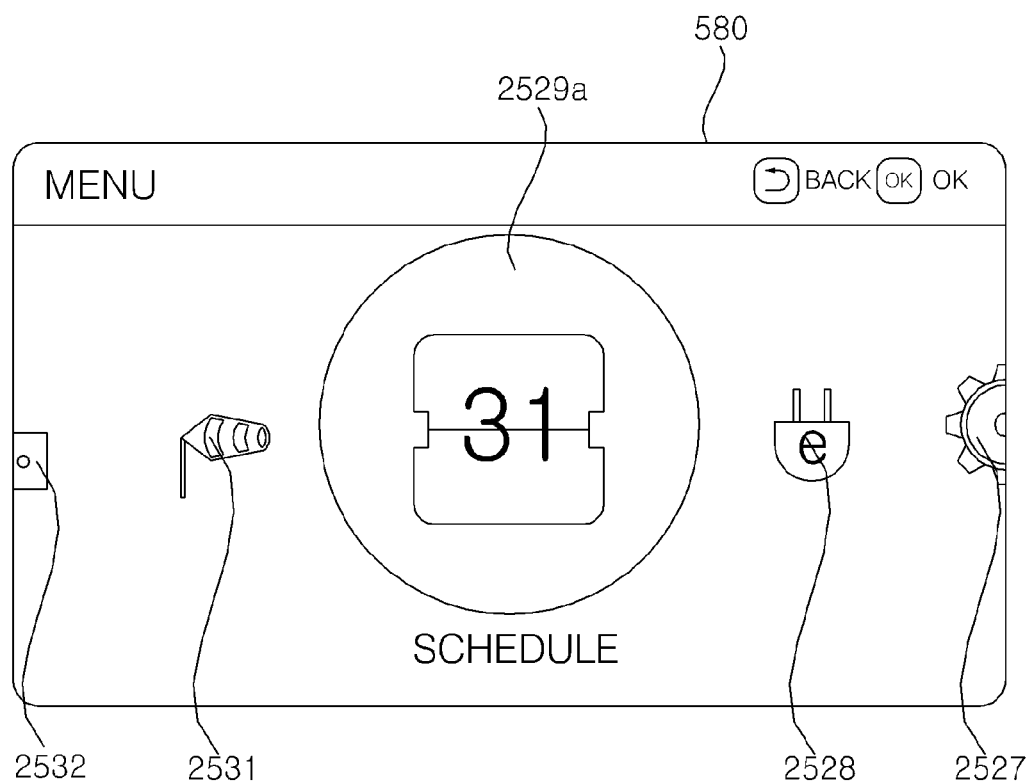
FIG. 25G illustrates another reference view of the input device in the operation mode.

Meanwhile, for example, in the case in which a schedule item (which is a sub-menu item) is selected after the menu item is selected, the controller 570 may perform control such that a schedule item 2529*a* is focused and displayed, such as shown in FIG. 25G.

For example, in the case in which rightward sweep input is executed in the state in which the energy item 2528*a* is focused and displayed, such as shown in FIG. 25F, the schedule item 2529*a* may be shifted rightward, focused, and displayed, such as shown in FIG. 25G.

Figure 25H:
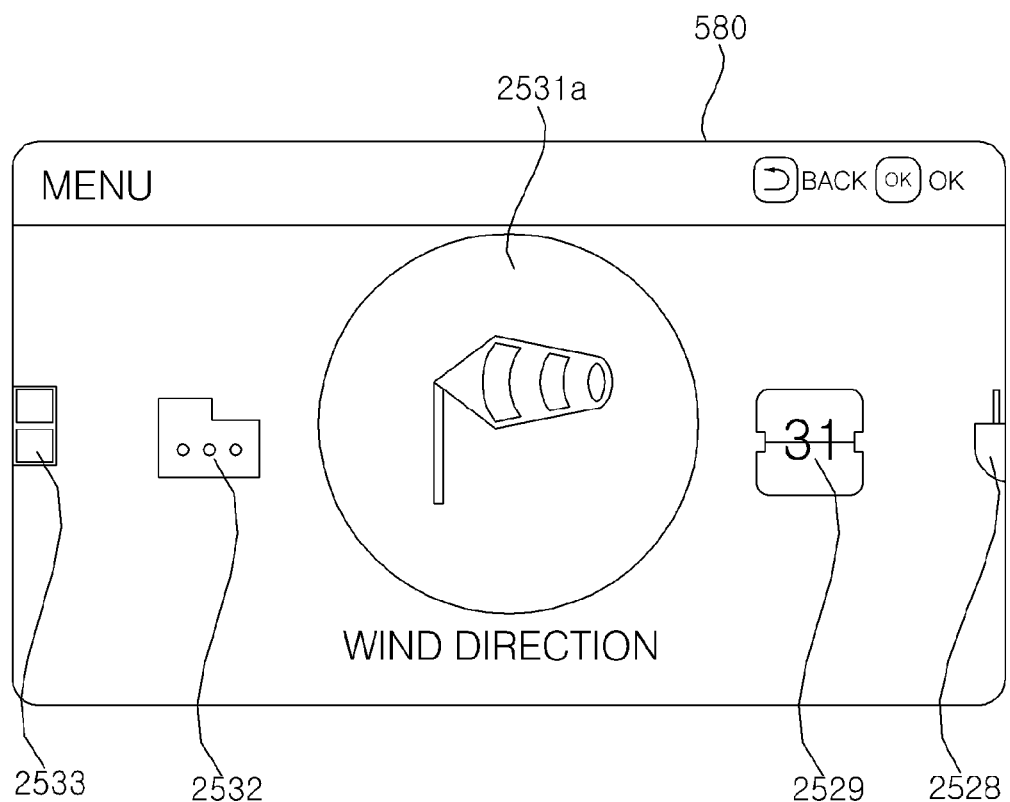
FIG. 25H illustrates another reference view of the input device in the operation mode.

Meanwhile, for example, in the case in which a wind direction setting item (which is a sub-menu item) is selected after the menu item is selected, the controller 570 may perform control such that a wind direction setting item 2531*a* is focused and displayed, such as shown in FIG. 25H.

For example, in the case in which rightward sweep input is executed in the state in which the schedule item 2529*a* is focused and displayed, such as shown in FIG. 25G, the wind direction setting item 2531*a* may be shifted rightward, focused, and displayed, such shown in FIG. 25H.

Meanwhile, for example, in the case in which the temperature setting item in the home screen is selected, the controller 570 may perform control such that both a temperature setting item for the air conditioner and a ventilation setting item for the ventilator are displayed on the display unit 580.

Alternatively, for example, the controller 570 may perform control such that, as another example of the home screen, an item for performing both temperature setting and ventilation setting is focused and displayed in the central region of the display unit 580.

Figure 26A:
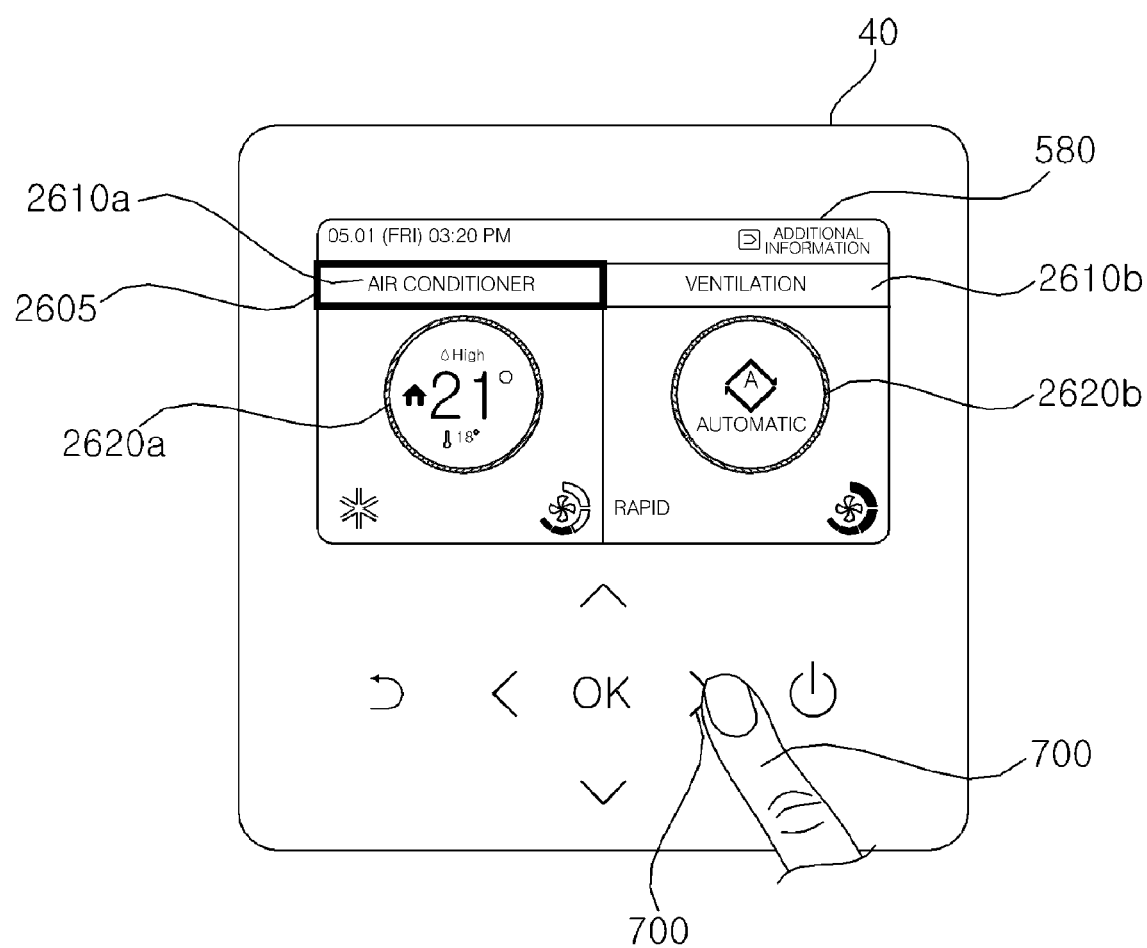
FIG. 26A illustrates a reference view of the input device in the operation mode.

For example, in the case in which the item for performing both temperature setting and ventilation setting is selected, the controller 570 may perform control such that both the temperature setting item for the air conditioner and the ventilation setting item for the ventilator are displayed on the display unit 580, such as shown in FIG. 26A.

When the four-directional buttons are operated, such as shown in FIG. 26A, the controller 570 may perform control such that the temperature setting item or the ventilation setting item is focused. Particularly, the temperature setting item or the ventilation setting item may be focused using the leftward button or the rightward button.

FIG. 26A illustrates a temperature setting item 2620*a* for the air conditioner and a ventilation setting item 2620*b* for the ventilator according to an embodiment of the invention. In addition, FIG. 26A illustrates that a temperature setting icon 2620*a* is focused.

The edge of the temperature setting item 2620*a* for the air conditioner may be displayed in blue (or another color/visual cue) in connection with temperature information. The edge of the ventilation setting item 2620*b* may be displayed in red (or another color/visual cue).

Figure 26B:
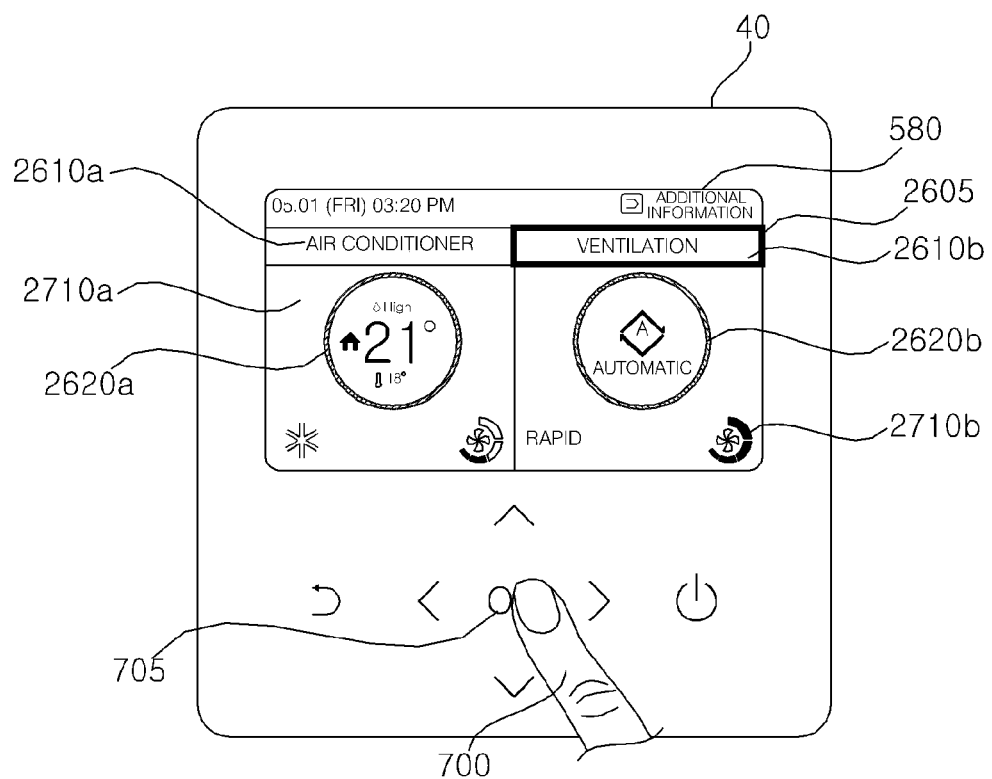
FIG. 26B illustrates another reference view of the input device in the operation mode.

Meanwhile, unlike FIG. 26A, one of the items in the home screen may include both the temperature setting item and the ventilation setting item. For example, the temperature setting item may be disposed at the left side of the one item in the home screen, and the ventilation setting item may be disposed at the right side of the one item in the home screen Meanwhile, for example, in the case in which the rightward button on the input unit 585 is operated, a ventilation setting icon 2610*b* may be focused (2605), such as shown in FIG. 26B.

Figure 26C:
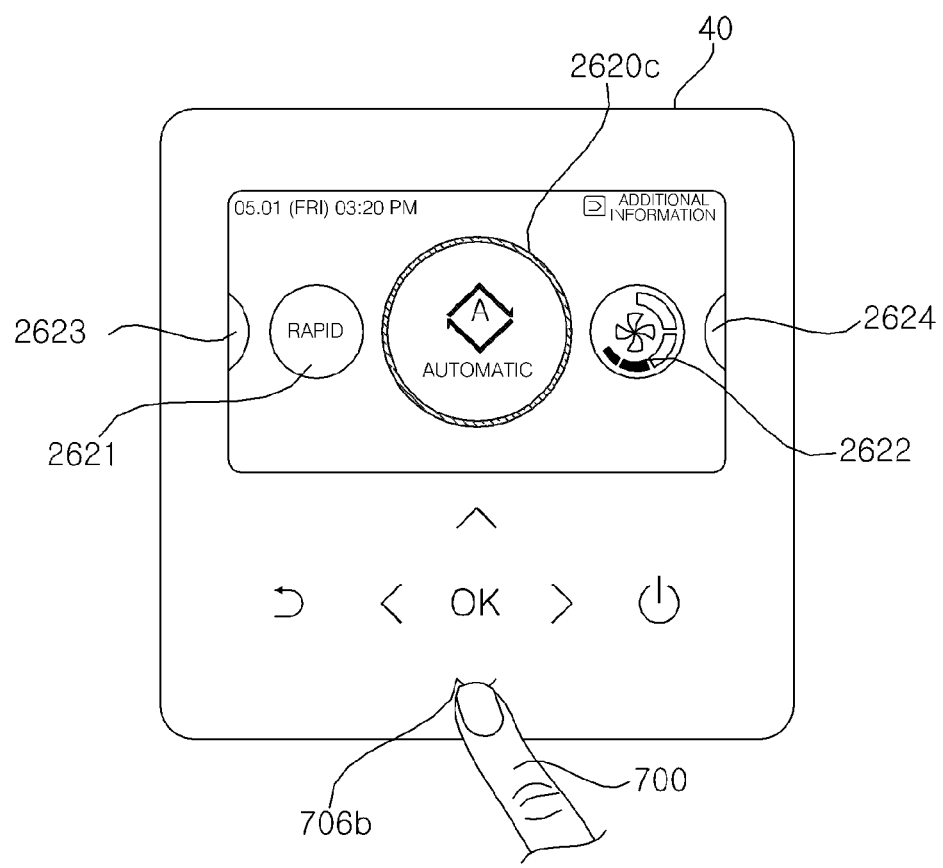
FIG. 26C illustrates another reference view of the input device in the operation mode.

Meanwhile, for example, in the case in which the OK button 705 is operated, the controller 570 may perform control such that only a ventilation setting item 2620*c* is focused and displayed, such as shown in FIG. 26C.

FIG. 26C illustrates an embodiment of the invention wherein a rapid item 2621 is displayed at the left side of the ventilation setting item 2620*c* and a wind intensity item 2622 is displayed at the right side of the ventilation setting item 2620*c* (not limited to this particular arrangement).

Figure 26D:
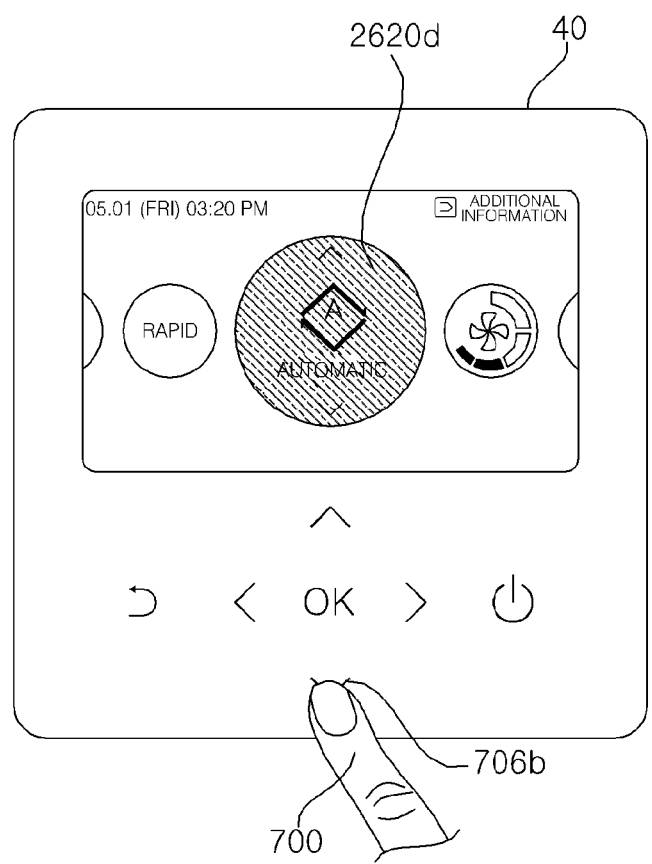
FIG. 26D illustrates another reference view of the input device in the operation mode.

Meanwhile, for example, in the case in which the downward button 706*b* or the OK button 705 on the input unit 585 is operated in the state in which the ventilation setting item 2620*c* is focused, the controller 570 may perform control such that a ventilation setting item 2620*d* indicating an automatic mode is displayed, such as shown in FIG. 26D.

The controller 570 may perform control such that the entirety of the ventilation setting item 2620*d* indicating the automatic mode is displayed in violet (or another color/visual cue) in order to indicate that ventilation setting is possible.

Figure 26E:
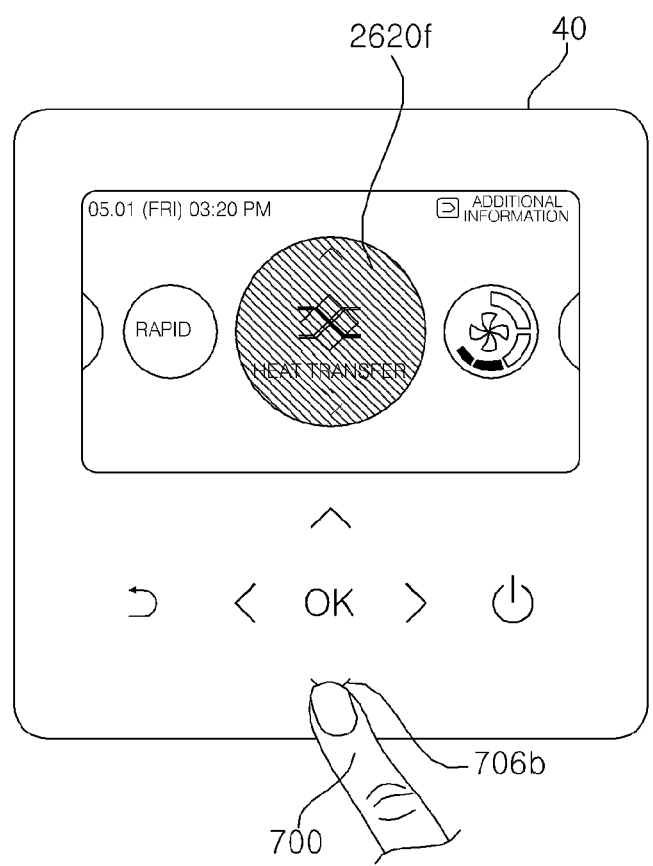
FIG. 26E illustrates another reference view of the input device in the operation mode.

For example, in the case in which the downward button 706*b* on the input unit 585 is operated, the controller 570 may perform control such that a ventilation setting item 2620*e* indicating a heat transfer mode is displayed, such as shown in FIG. 26E.

The controller 570 may perform control such that the entirety of the ventilation setting item 2620*e* indicating the heat transfer mode is displayed in orange (or another color/visual cue) in order to indicate that ventilation setting is possible.

Figure 26F:
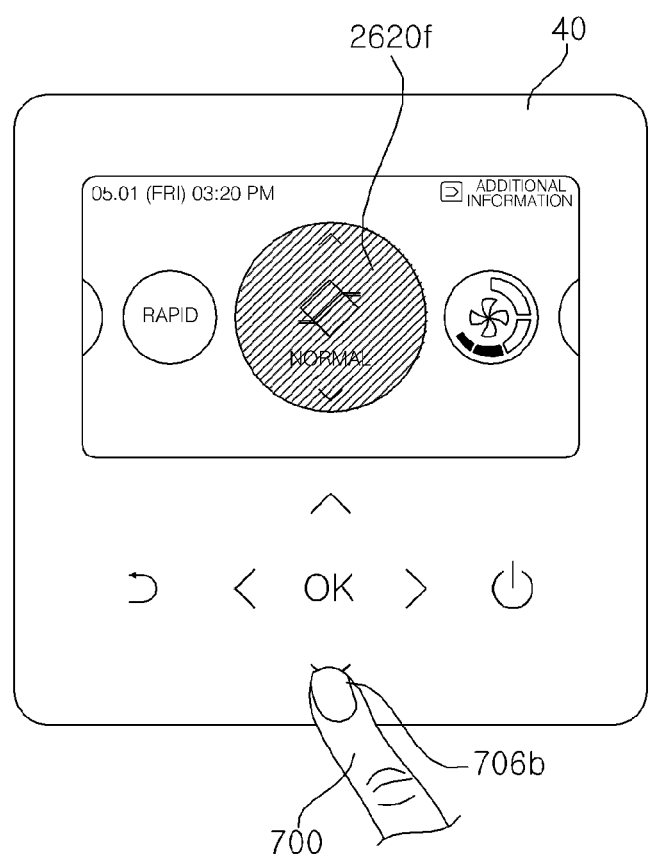
FIG. 26F illustrates another reference view of the input device in the operation mode.

For example, in the case in which the downward button 706*b* on the input unit 585 is operated, the controller 570 may perform control such that a ventilation setting item 2620*f* indicating a normal mode is displayed, such as shown in FIG. 26F.

The controller 570 may perform control such that the entirety of the ventilation setting item 2620*f* indicating the normal mode is displayed in blue (or another color/visual cue) in order to indicate that ventilation setting is possible.

Figure 26G:
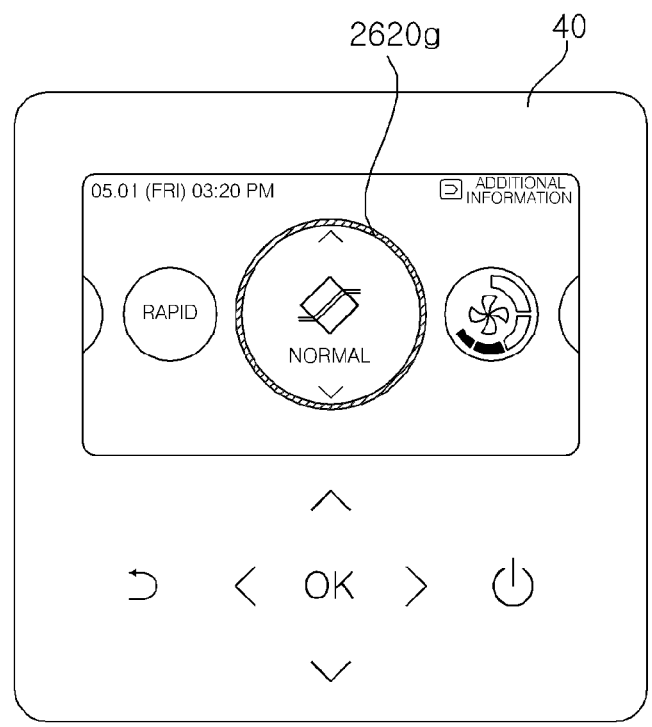
FIG. 26G illustrates another reference view of the input device in the operation mode.
Figure 27A:
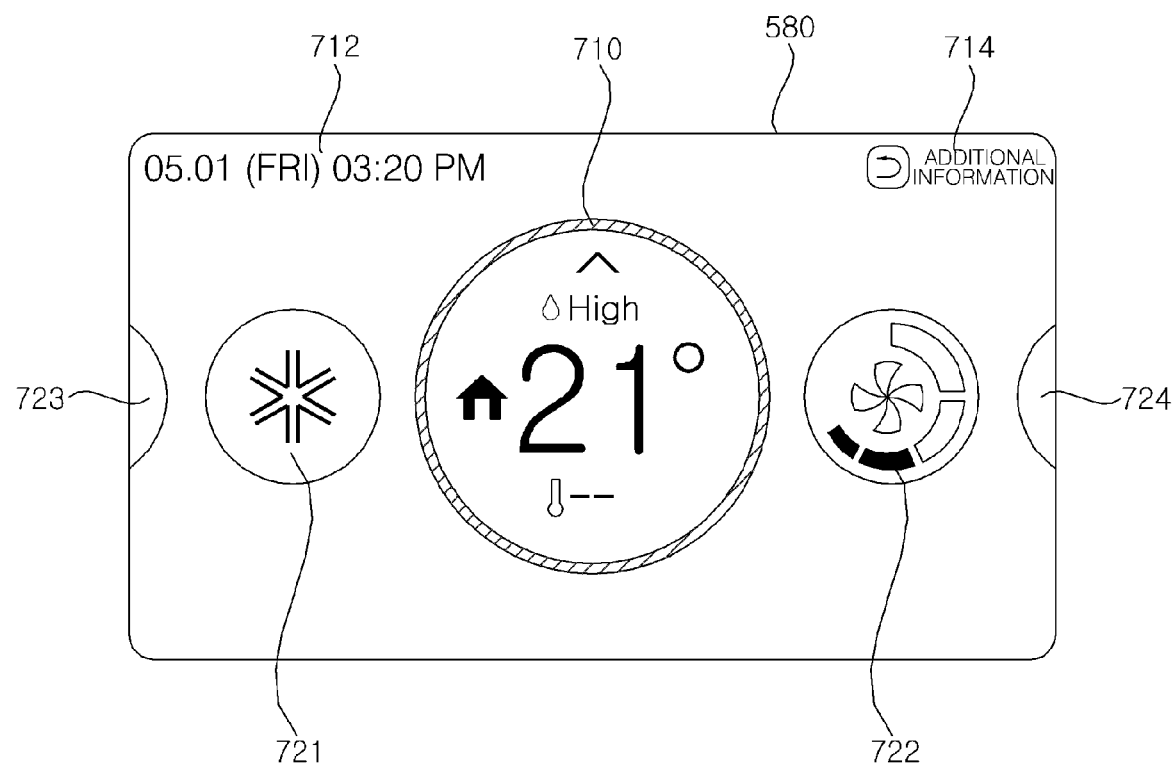
FIG. 27A illustrates a reference view of the input device in the operation mode.
Figure 27B:
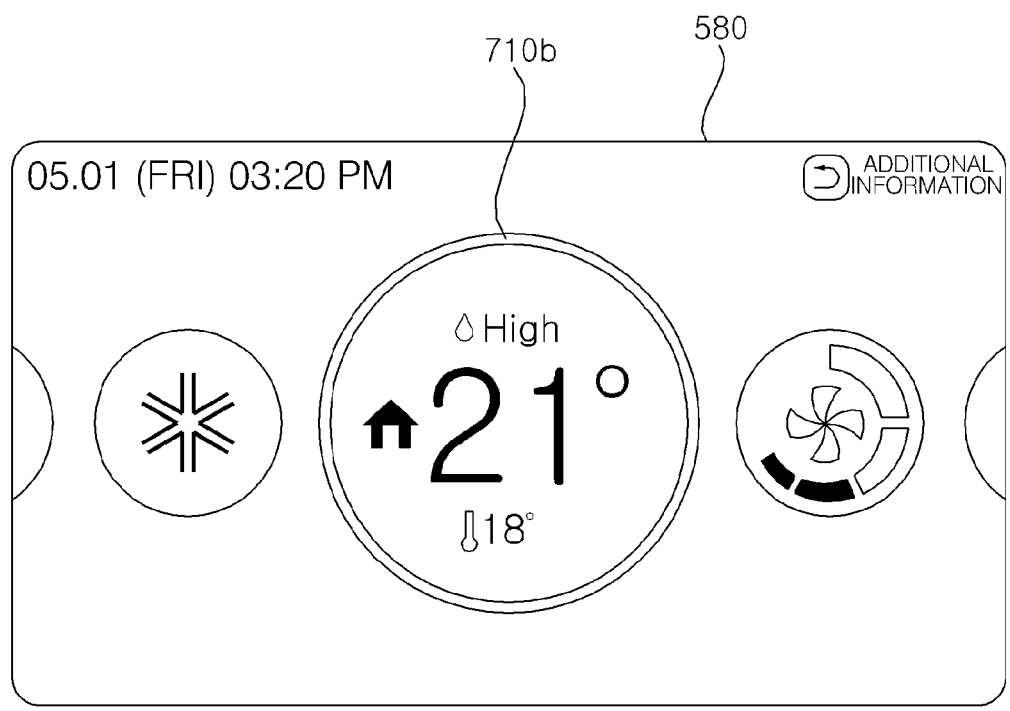
FIG. 27B illustrates another reference view of the input device in the operation mode.
Figure 27C:
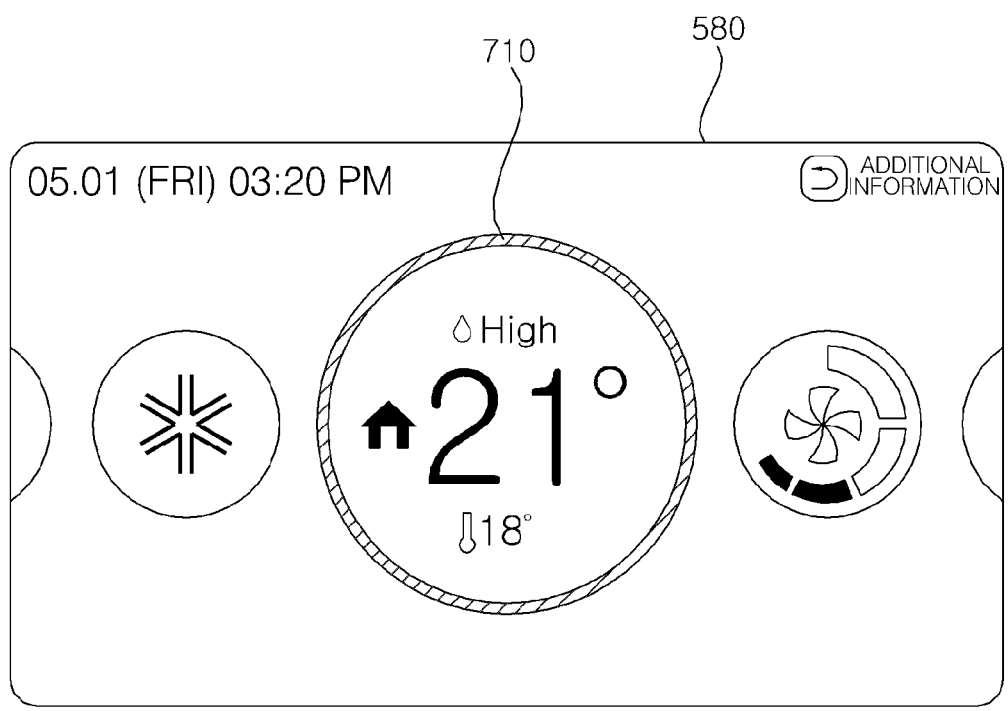
FIG. 27C illustrates another reference view of the input device in the operation mode.
Figure 27D:
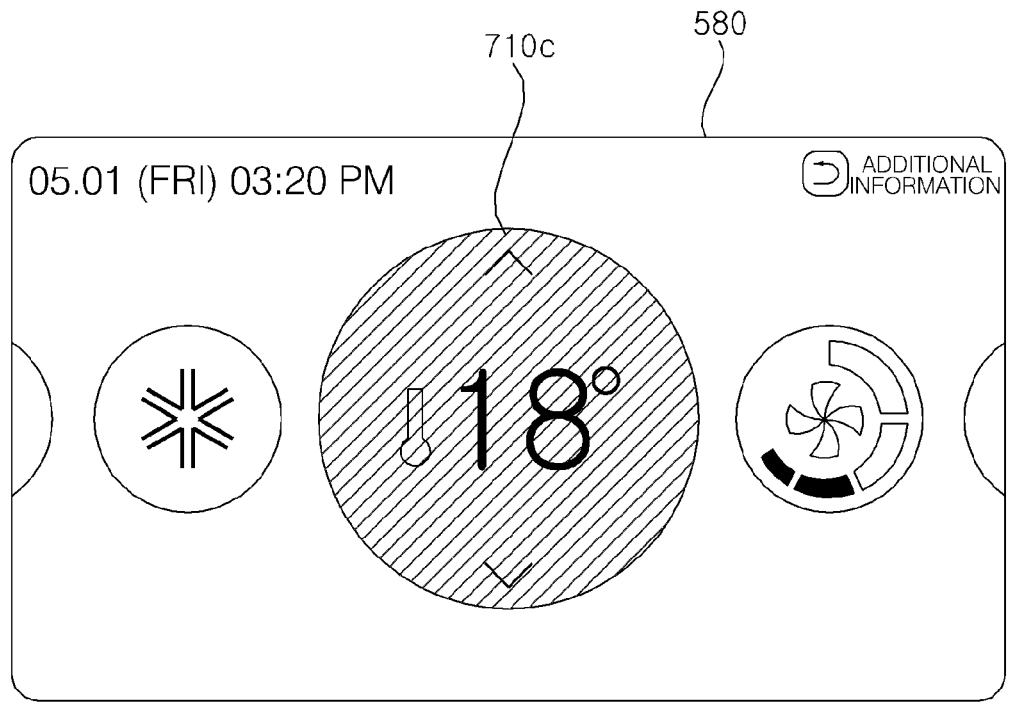
FIG. 27D illustrates another reference view of the input device in the operation mode.
Figure 27E:
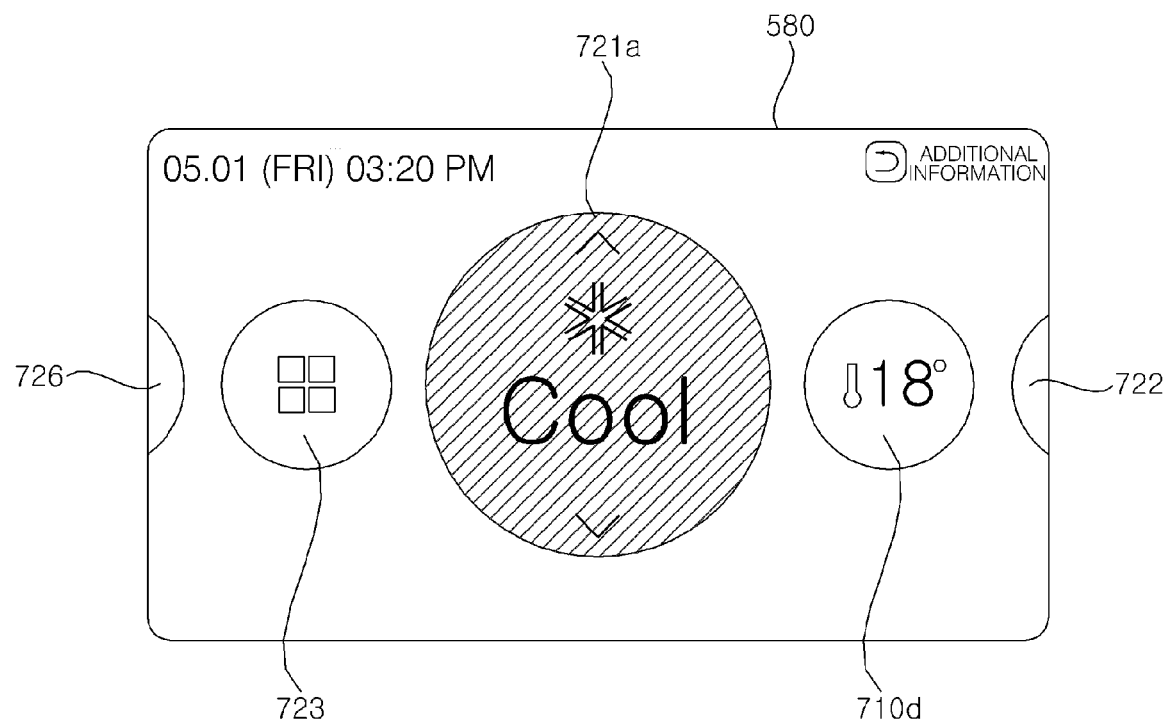
FIG. 27E illustrates another reference view of the input device in the operation mode.
Figure 27F:
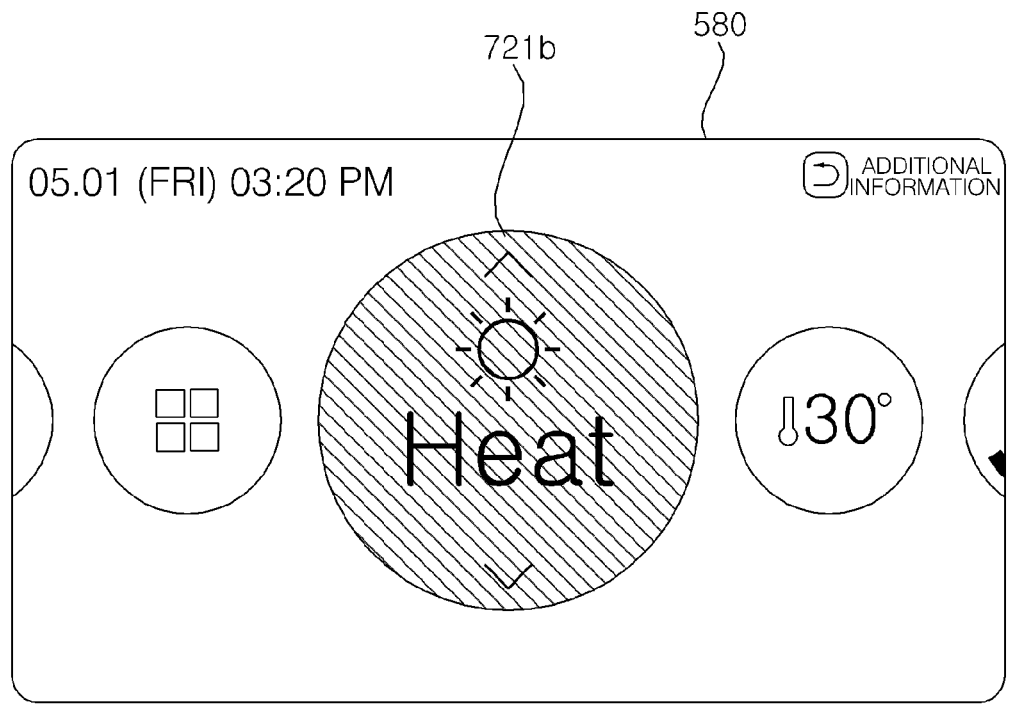
FIG. 27F illustrates another reference view of the input device in the operation mode.
Figure 27G:
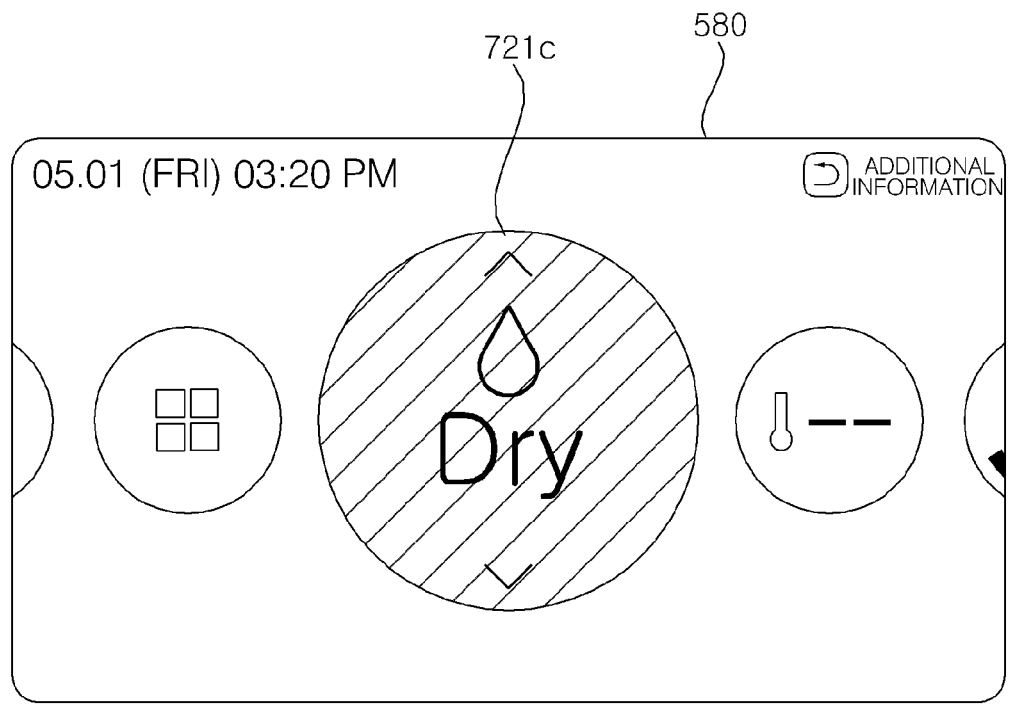
FIG. 27G illustrates another reference view of the input device in the operation mode.
Figure 27H:
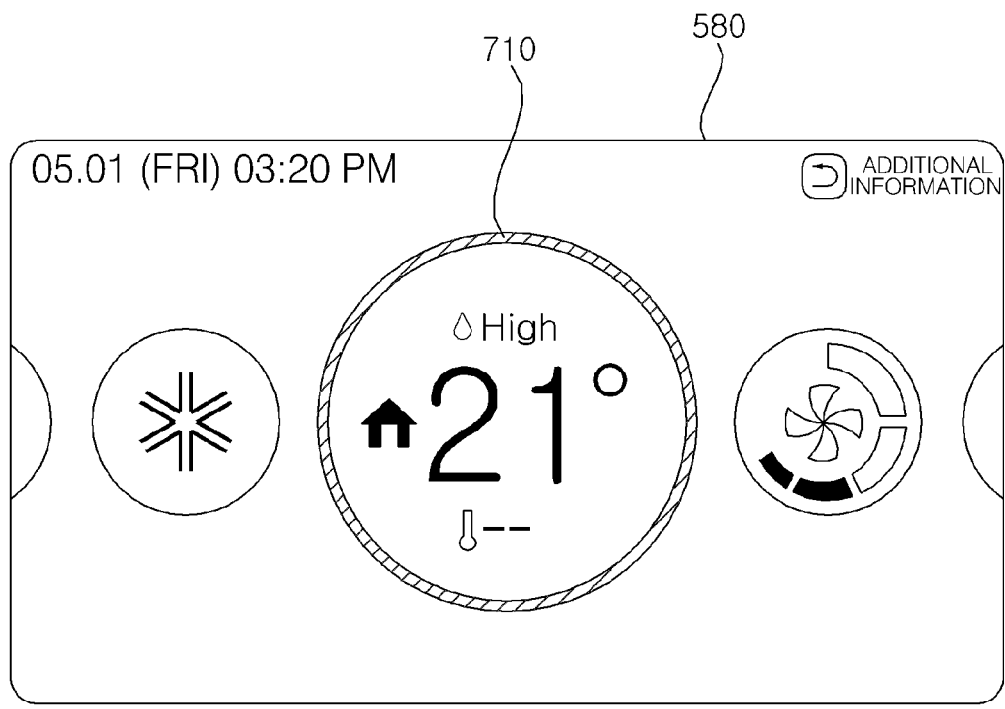

For example, in the case in which the downward button 706*b* on the input unit 585 is operated, the controller 570 may perform control such that a ventilation setting item 2620*g* indicating a normal mode is displayed, such as shown in FIG. 26G.

FIGS. 27A to 27H correspond to FIGS. 7A to 7H, respectively. FIGS. 27A to 27H are different from FIGS. 7A to 7H in that a touchscreen-type display unit 580 is used in place of the separate input unit 585, and therefore for convenience purposes a description of FIGS. 27A to 27H will be omitted.

The operation method of the input device or the air conditioner according to an embodiment of the present invention may be implemented as code that can be written on a processor-readable recording medium and thus read by a processor provided in the input device or the air conditioner. The processor-readable recording medium may be any type of recording device in which data are stored in a processor-readable manner. The processor-readable recording medium may include, for example, a read only memory (ROM), a random access memory (RAM), a compact disk read only memory (CD-ROM), a magnetic tape, a floppy disk, and an optical data storage device, or may be implemented in the form of a carrier wave transmitted over the Internet. In addition, the processor-readable recording medium can be distributed over a plurality of computer systems connected to a network such that processor-readable code is written thereto and executed therefrom in a distributed manner.

As is apparent from the above description, according to the present invention, an input device, which is configured to receive operation input of an air conditioner including an outdoor unit and an indoor unit, includes a display unit, a communication unit to communicate with the indoor unit, an interface unit to provide an interface for exchanging data with an external device, and a controller to perform control such that a home screen including a plurality of icon items is displayed on the display unit and to perform control such that temperature information set through a temperature setting item in the home screen is transmitted to the external device through the interface unit. Consequently, the external device may be remotely controlled using the set temperature information.

In particular, the controller performs control such that the set temperature information is transmitted to an external lighting device, whereby the color of light emitted by the lighting device is changed.

Meanwhile, the communication unit wirelessly transmits the set temperature information to an external audio output device or an external image display device such that audio or an image is output based on the set temperature information. Consequently, content related to the operation of the air conditioner may be reproduced.

Meanwhile, the controller performs control such that the color of some of the icon items in the home screen is changed depending on a set temperature or a set mode.

Consequently, a user may intuitively recognize the set temperature or the set mode.

Meanwhile, the controller performs control such that the icon items are shifted in response to sweep input on a touchscreen-type display unit.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

What is claimed is:

1. An input device for receiving operation input of an air conditioner comprising an outdoor unit and a plurality of indoor units, the input device comprising:
    a display unit;
    an input unit comprising a power button;
    a communication unit to communicate with each of the plurality of indoor units;
    an interface unit to provide an interface for exchanging data with an external device; and
    a controller to perform control such that a home screen comprising a plurality of icon items is displayed on the display unit and to perform control such that temperature information set through a temperature setting item in the home screen is transmitted to the external device through the interface unit, wherein the home screen is displayed as RGB color-based home screen in an operation mode,
    wherein when the power button is operated in a state in which the RGB color-based home screen is displayed in the operation mode, the controller is configured to enter the input device into a standby mode and display a part region of the home screen in the standby mode as a gray-based home screen,
    wherein the temperature setting item of the home screen in the standby mode is displayed as an RGB-based image, and luminance of the RGB-based image of the temperature setting item is lower than in the operation mode,
    wherein the controller further performs a control to display a wind direction setting screen including an upward-downward direction item,
    wherein when the upward-downward direction item is selected, the controller performs a control to display an upward-downward wind angle setting screen,
    wherein the upward-downward wind angle setting screen includes an individual control item, objects representing respective vanes of each of the plurality of indoor units, and objects indicating settings of the respective vanes.

2. The input device according to claim 1, wherein the controller controls operation of the external device through the interface unit.

3. The input device according to claim 1, wherein the external device comprises a lighting device, and
    the controller performs control such that the set temperature information is transmitted to the lighting device, whereby a color of light emitted by the lighting device is changed.

4. The input device according to claim 3, wherein the controller performs control such that: a color of the temperature setting item in the home screen is changed depending on a target temperature set by the temperature setting item; and
    information about the set target temperature is transmitted to the lighting device, whereby the color of the light emitted by the lighting device is changed based on the information about the set target temperature.

5. The input device according to claim 1, wherein the interface unit comprises a connection part for controlling contact with the external device.

6. The input device according to claim 1, wherein the communication unit wirelessly transmits the set temperature information to an external audio output device or an external image display device such that audio or an image is output based on the set temperature information.

7. The input device according to claim 1, wherein the icon items in the home screen comprise the temperature setting item, an operation mode setting item, a wind intensity setting item, and a menu item, and
    when the menu item is selected, the controller performs control such that a screen related to any one selected from among an override item, an additional operation item, a zone control item, a lock setting item, a timer item, a setting item, an energy storage item, a schedule item, and a wind direction item is displayed.

8. The input device according to claim 1 wherein the input unit further comprises an OK button and four-directional buttons.

9. The input device according to claim 1, wherein, when the power button is further operated in the standby mode, the controller performs control such that the input device is operated in an off mode, in which the home screen is not displayed.

10. The input device according to claim 9, wherein, when the power button is further operated in the off mode, the controller performs control such that the home screen is displayed and performs control such that the temperature setting item, among the icon items, is located and displayed in the central region of the home screen.

11. The input device according to claim 1, wherein the display unit comprises a touchscreen-type display unit, on which touch input is possible, and
the controller performs control such that the icon items in the home screen are shifted and displayed in response to sweep input.

12. An air conditioner comprising:
an outdoor unit and a plurality of indoor units; and
an input device connected to each of the plurality of indoor units,
wherein the input device comprises:
a display unit;
an input unit comprising a power button;
a communication unit to communicate with the indoor unit;
an interface unit to provide an interface for exchanging data with an external device; and
a controller to perform control such that a home screen comprising a plurality of icon items is displayed on the display unit and to perform control such that temperature information set through a temperature setting item in the home screen is transmitted to the external device through the interface unit,
wherein the home screen is displayed as RGB color-based home screen in an operation mode,
wherein when the power button is operated in a state in which the RGB color-based home screen is displayed in the operation mode, the controller is configured to enter the input device into a standby mode and display a part region of the home screen in the standby mode as a gray-based home screen,
wherein the temperature setting item of the home screen in the standby mode is displayed as an RGB-based image, and luminance of the RGB-based image of the temperature setting item is lower than in the operation mode,
wherein the controller further performs a control to display a wind direction setting screen including an upward-downward direction item,
wherein when the upward-downward direction item is selected, the controller performs a control to display an upward-downward wind angle setting screen,
wherein the upward-downward wind angle setting screen includes an individual control item, objects representing respective vanes of each of the plurality of indoor units, and objects indicating settings of the respective vanes.

13. The air conditioner according to claim 12, wherein the external device comprises a lighting device, and
the controller performs control such that the set temperature information is transmitted to the lighting device, whereby a color of light emitted by the lighting device is changed.

14. The air conditioner according to claim 13, wherein the controller performs control such that: a color of the temperature setting item in the home screen is changed depending on a target temperature set by the temperature setting item; and
information about the set target temperature is transmitted to the lighting device, whereby the color of the light emitted by the lighting device is changed based on the information about the set target temperature.

15. The air conditioner according to claim 12, wherein the interface unit comprises a connection part for controlling contact with the external device.

16. The air conditioner according to claim 12, wherein the communication unit wirelessly transmits the set temperature information to an external audio output device or an external image display device such that audio or an image is output based on the set temperature information.

17. The air conditioner according to claim 12, wherein the icon items in the home screen comprise the temperature setting item, an operation mode setting item, a wind intensity setting item, and a menu item, and
when the menu item is selected, the controller performs control such that a screen related to any one selected from among an override item, an additional operation item, a zone control item, a lock setting item, a timer item, a setting item, an energy storage item, a schedule item, and a wind direction item is displayed.

18. The air conditioner according to claim 12, wherein the input unit further comprises an OK button and four-directional buttons.

19. The air conditioner according to claim 12, wherein, when the power button is further operated in the standby mode, the controller performs control such that the input device is operated in an off mode, in which the home screen is not displayed.

20. The air conditioner according to claim 19, wherein, when the power button is further operated in the off mode, the controller performs control such that the home screen is displayed and performs control such that the temperature setting item, among the icon items, is located and displayed in a central region of the home screen.

* * * * *